United States Patent
Heaton et al.

(10) Patent No.: US 11,946,320 B2
(45) Date of Patent: Apr. 2, 2024

(54) POLYCRYSTALLINE DIAMOND ELEMENTS AND SYSTEMS AND METHODS FOR FABRICATING THE SAME

(71) Applicant: US Synthetic Corporation, Orem, UT (US)

(72) Inventors: Daren Nathaniel Heaton, Spanish Fork, UT (US); Jeremy Brett Lynn, Nephi, UT (US)

(73) Assignee: US Synthetic Corporation, Orem, UT (US)

( * ) Notice: Subject to any disclaimer, the term of this patent is extended or adjusted under 35 U.S.C. 154(b) by 666 days.

(21) Appl. No.: 17/145,285

(22) Filed: Jan. 9, 2021

(65) Prior Publication Data

US 2021/0131188 A1 May 6, 2021

Related U.S. Application Data

(62) Division of application No. 16/133,643, filed on Sep. 17, 2018, now Pat. No. 10,900,291.

(Continued)

(51) Int. Cl.
*E21B 10/55* (2006.01)
*B24D 3/10* (2006.01)
(Continued)

(52) U.S. Cl.
CPC .............. *E21B 10/55* (2013.01); *B24D 3/10* (2013.01); *B24D 3/348* (2013.01); *B32B 18/00* (2013.01);
(Continued)

(58) Field of Classification Search
CPC .......... E21B 10/46; E21B 10/55; E21B 10/52; E21B 10/5676; E21B 10/5735; E21B 10/5673
See application file for complete search history.

(56) References Cited

U.S. PATENT DOCUMENTS 3,136,615 A ‡ 6/1964 Wentorf, Jr. ........ C04B 35/5831
51/307
3,141,746 A ‡ 7/1964 De Lai ..................... B01J 3/062
51/309
(Continued)

FOREIGN PATENT DOCUMENTS

DE 4141900 A1 6/1993
DE 4141900 A1 ‡ 6/1993
(Continued)

OTHER PUBLICATIONS

Song, J.F., et al., "Surface Texture", National Institute of Standards and Technology (6 pages).‡

(Continued)

*Primary Examiner* — Pegah Parvini
(74) *Attorney, Agent, or Firm* — BKRIP LLC

(57) ABSTRACT

Polycrystalline diamond may include a working surface and a peripheral surface extending around an outer periphery of the working surface. The polycrystalline diamond includes a first volume including an interstitial material and a second volume having a leached region that includes boron and titanium. A method of fabricating a polycrystalline diamond element may include positioning a first volume of diamond particles adjacent to a substrate, the first volume of diamond particles including a material that includes a group 13 element, and positioning a second volume of diamond particles adjacent to the first volume of diamond particles such that the first volume of diamond particles is disposed between the second volume of diamond particles and the substrate, the second volume of diamond particles having a lower concentration of material including the group 13 element than the first volume of diamond particles.

20 Claims, 35 Drawing Sheets

Related U.S. Application Data

(60) Provisional application No. 62/691,530, filed on Jun. 28, 2018, provisional application No. 62/560,185, filed on Sep. 18, 2017.

(51) Int. Cl.

| | | |
|---|---|---|
| *B24D 3/34* | (2006.01) | |
| *B32B 18/00* | (2006.01) | |
| *C04B 35/528* | (2006.01) | |
| *C04B 35/645* | (2006.01) | |
| *C04B 37/00* | (2006.01) | |
| *C04B 41/00* | (2006.01) | |
| *C22C 26/00* | (2006.01) | |
| *E21B 10/52* | (2006.01) | |
| *E21B 10/567* | (2006.01) | |
| *E21B 10/573* | (2006.01) | |
| *B22F 7/06* | (2006.01) | |
| *B22F 7/08* | (2006.01) | |
| *B24D 18/00* | (2006.01) | |

(52) U.S. Cl.
CPC .......... *C04B 35/528* (2013.01); *C04B 35/645* (2013.01); *C04B 37/001* (2013.01); *C04B 41/00* (2013.01); *C22C 26/00* (2013.01); *E21B 10/52* (2013.01); *E21B 10/5676* (2013.01); *E21B 10/5735* (2013.01); *B22F 7/062* (2013.01); *B22F 7/08* (2013.01); *B24D 18/0009* (2013.01); *C04B 2235/3813* (2013.01); *C04B 2235/3821* (2013.01); *C04B 2235/404* (2013.01); *C04B 2235/405* (2013.01); *C04B 2235/407* (2013.01); *C04B 2235/427* (2013.01); *C04B 2237/363* (2013.01); *C04B 2237/401* (2013.01); *C04B 2237/582* (2013.01); *C22C 2026/005* (2013.01); *C22C 2026/006* (2013.01); *C22C 2026/008* (2013.01); *E21B 10/5673* (2013.01)

(56) References Cited

U.S. PATENT DOCUMENTS

| | | | | |
|---|---|---|---|---|
| 3,233,988 A ‡ | 2/1966 | Wentorf, Jr. | ............. | B01J 3/065 51/307 |
| 3,670,380 A ‡ | 6/1972 | Moore | .................... | B23C 5/207 407/40 |
| 3,745,623 A ‡ | 7/1973 | Wentorf, Jr. | ............ | B23B 27/20 407/11 |
| 4,108,614 A ‡ | 8/1978 | Mitchell | .................... | B22F 7/06 51/295 |
| 4,109,737 A ‡ | 8/1978 | Bovenkerk | ......... | E21B 10/5735 175/43 |
| 4,151,686 A ‡ | 5/1979 | Lee | .......................... | B01J 3/062 264/33 |
| 4,211,508 A ‡ | 7/1980 | Dill | ........................ | B23P 15/28 175/42 |
| 4,224,380 A ‡ | 9/1980 | Bovenkerk | .............. | B01J 3/062 428/54 |
| 4,255,165 A ‡ | 3/1981 | Dennis | ..................... | B01J 3/062 175/42 |
| 4,268,276 A ‡ | 5/1981 | Bovenkerk | .............. | B01J 3/062 175/42 |
| 4,288,248 A ‡ | 9/1981 | Bovenkerk | .............. | B01J 3/062 419/11 |
| 4,303,442 A ‡ | 12/1981 | Hara | ....................... | B01J 3/062 419/10 |
| 4,311,490 A ‡ | 1/1982 | Bovenkerk | .............. | B01J 3/062 51/307 |
| 4,373,593 A ‡ | 2/1983 | Phaal | ..................... | B23B 27/145 175/43 |
| 4,387,287 A ‡ | 6/1983 | Marazzi | .................... | B23H 9/00 219/69 |
| 4,410,054 A ‡ | 10/1983 | Nagel | ..................... | E21B 4/003 175/10 |
| 4,412,980 A ‡ | 11/1983 | Tsuji | ....................... | B01J 3/062 423/44 |
| 4,468,138 A ‡ | 8/1984 | Nagel | ..................... | F16C 17/04 384/30 |
| 4,478,297 A ‡ | 10/1984 | Radtke | .................... | E21B 10/61 175/43 |
| 4,481,016 A ‡ | 11/1984 | Campbell | ............... | B21C 3/025 51/293 |
| 4,486,286 A ‡ | 12/1984 | Lewin | ................... | A61L 27/303 204/19 |
| 4,504,519 A ‡ | 3/1985 | Zelez | ..................... | C03C 17/22 204/17 |
| 4,522,633 A ‡ | 6/1985 | Dyer | ........................ | C09K 3/14 51/307 |
| 4,525,179 A ‡ | 6/1985 | Gigl | ........................ | B01J 3/062 219/69 |
| 4,533,004 A ‡ | 8/1985 | Ecer | ....................... | E21B 10/006 175/37 |
| 4,534,773 A ‡ | 8/1985 | Phaal | ....................... | B01J 3/062 175/40 |
| 4,539,018 A ‡ | 9/1985 | Whanger | .................. | B24D 7/06 51/295 |
| 4,556,403 A ‡ | 12/1985 | Almond | ..................... | B24D 3/14 51/308 |
| 4,560,014 A ‡ | 12/1985 | Geczy | ....................... | E21B 4/00 175/10 |
| 4,566,426 A ‡ | 1/1986 | Schleich | ................. | B24B 53/00 125/11 |
| 4,570,726 A ‡ | 2/1986 | Hall | ...................... | E21B 10/5735 175/42 |
| 4,572,722 A ‡ | 2/1986 | Dyer | ........................ | B24D 3/10 51/309 |
| 4,604,106 A ‡ | 8/1986 | Hall | ........................ | B28D 1/121 51/293 |
| 4,605,343 A ‡ | 8/1986 | Hibbs, Jr. | .............. | B24D 99/00 125/39 |
| 4,606,418 A ‡ | 8/1986 | Thompson | ............ | E21B 10/567 175/33 |
| 4,606,738 A ‡ | 8/1986 | Hayden | .................. | F01D 9/042 51/295 |
| 4,621,031 A ‡ | 11/1986 | Scruggs | .................. | B23K 35/001 148/40 |
| 4,629,373 A ‡ | 12/1986 | Hall | ...................... | B23B 27/146 175/43 |
| 4,636,253 A ‡ | 1/1987 | Nakai | ...................... | B01J 3/062 75/239 |
| 4,645,977 A ‡ | 2/1987 | Kurokawa | ............... | C23C 16/26 118/50 |
| 4,646,857 A ‡ | 3/1987 | Thompson | .......... | E21B 10/5735 175/43 |
| 4,662,348 A ‡ | 5/1987 | Hall | ........................ | B24B 1/00 125/30 |
| 4,664,705 A ‡ | 5/1987 | Horton | .................... | B01J 3/062 264/12 |
| 4,670,025 A ‡ | 6/1987 | Pipkin | ..................... | B24D 3/08 51/295 |
| 4,693,035 A ‡ | 9/1987 | Doyle | ..................... | B24B 19/226 451/27 |
| 4,694,918 A ‡ | 9/1987 | Hall | ........................ | E21B 10/56 175/43 |
| 4,707,384 A ‡ | 11/1987 | Schachner | .......... | C23C 16/0272 427/24 |
| 4,726,718 A ‡ | 2/1988 | Meskin | ................ | E21B 10/5676 125/39 |
| 4,731,296 A ‡ | 3/1988 | Kikuchi | ................ | B22F 7/06 125/39 |
| 4,738,322 A ‡ | 4/1988 | Hall | ........................ | E21B 10/20 175/37 |
| 4,766,040 A ‡ | 8/1988 | Hillert | .................... | C22C 27/00 428/55 |
| 4,776,861 A ‡ | 10/1988 | Frushour | .................. | B24D 3/00 51/293 |
| 4,784,023 A ‡ | 11/1988 | Dennis | ..................... | B22F 7/06 175/42 |

(56) References Cited

U.S. PATENT DOCUMENTS

| | | | | |
|---|---|---|---|---|
| 4,792,001 A ‡ | 12/1988 | Zijsling | E21B 10/5673 | 175/43 |
| 4,793,828 A ‡ | 12/1988 | Burnand | B01J 3/062 | 51/293 |
| 4,797,241 A ‡ | 1/1989 | Peterson | B01J 3/062 | 264/12 |
| 4,802,539 A ‡ | 2/1989 | Hall | E21B 10/20 | 175/37 |
| 4,805,586 A ‡ | 2/1989 | Borse | B24B 53/12 | 125/11 |
| 4,807,402 A ‡ | 2/1989 | Rai | B24D 3/00 | 51/293 |
| 4,811,801 A ‡ | 3/1989 | Salesky | E21B 10/56 | 175/43 |
| 4,828,582 A ‡ | 5/1989 | Frushour | B24D 3/00 | 51/293 |
| 4,844,185 A ‡ | 7/1989 | Newton, Jr. | E21B 10/43 | 175/43 |
| 4,852,671 A ‡ | 8/1989 | Southland | E21B 10/5673 | 175/43 |
| 4,854,405 A ‡ | 8/1989 | Stroud | E21B 10/52 | 175/37 |
| 4,858,707 A ‡ | 8/1989 | Jones | E21B 10/5673 | 175/43 |
| 4,861,350 A ‡ | 8/1989 | Phaal | B23P 15/28 | 51/307 |
| 4,871,377 A ‡ | 10/1989 | Frushour | B24D 3/007 | 51/309 |
| 4,872,520 A ‡ | 10/1989 | Nelson | E21B 10/5673 | 175/43 |
| 4,883,132 A ‡ | 11/1989 | Tibbitts | E21B 10/602 | 175/65 |
| 4,884,476 A ‡ | 12/1989 | Okuzumi | B23B 27/145 | 76/101 |
| 4,899,922 A ‡ | 2/1990 | Slutz | B23K 35/322 | 228/12 |
| 4,919,220 A ‡ | 2/1990 | Fuller | E21B 10/567 | 175/43 |
| 4,913,244 A ‡ | 4/1990 | Trujillo | E21B 10/60 | 175/65 |
| 4,913,247 A ‡ | 4/1990 | Jones | E21B 10/54 | 175/43 |
| 4,954,139 A ‡ | 4/1990 | Cerutti | B01J 3/062 | 51/293 |
| 4,940,180 A ‡ | 7/1990 | Martell | C04B 37/021 | 228/12 |
| 4,943,488 A ‡ | 7/1990 | Sung | B22F 7/06 | 125/30 |
| 4,944,772 A ‡ | 7/1990 | Cho | B24D 3/06 | 51/293 |
| 4,976,324 A ‡ | 12/1990 | Tibbitts | E21B 10/5673 | 175/42 |
| 4,984,642 A ‡ | 1/1991 | Renard | E21B 10/5673 | 175/43 |
| 4,988,421 A ‡ | 1/1991 | Drawl | C23C 14/06 | 204/19 |
| 4,992,082 A ‡ | 2/1991 | Drawl | C23C 14/06 | 51/295 |
| 4,997,049 A ‡ | 3/1991 | Tank | B23B 27/141 | 175/43 |
| 5,011,509 A ‡ | 4/1991 | Frushour | B24D 3/02 | 51/293 |
| 5,011,514 A ‡ | 4/1991 | Cho | B24D 3/08 | 51/295 |
| 5,011,515 A ‡ | 4/1991 | Frushour | B22F 7/06 | 175/42 |
| 5,016,718 A ‡ | 5/1991 | Tandberg | E21B 10/04 | 175/33 |
| 5,025,874 A ‡ | 6/1991 | Barr | B23P 5/00 | 175/37 |
| 5,027,912 A ‡ | 7/1991 | Juergens | E21B 10/5676 | 175/42 |
| 5,030,276 A ‡ | 7/1991 | Sung | C04B 41/5057 | 75/237 |
| 5,035,771 A ‡ | 7/1991 | Borse | C04B 41/53 | 216/81 |
| 5,037,451 A ‡ | 8/1991 | Burnand | E21B 10/5735 | 51/293 |
| 5,054,246 A ‡ | 10/1991 | Phaal | B24D 99/00 | 451/54 |
| 5,092,687 A ‡ | 3/1992 | Hall | E21B 4/003 | 384/30 |
| 5,096,465 A ‡ | 3/1992 | Chen | B23B 27/148 | 51/293 |
| 5,115,873 A ‡ | 5/1992 | Pastusek | E21B 10/60 | 175/65 |
| 5,116,568 A ‡ | 5/1992 | Sung | B22F 7/06 | 419/11 |
| 5,120,327 A ‡ | 6/1992 | Dennis | B22F 7/06 | 407/11 |
| 5,127,923 A ‡ | 7/1992 | Bunting | B24D 3/007 | 51/293 |
| 5,135,061 A ‡ | 8/1992 | Newton, Jr. | B23B 27/148 | 175/42 |
| 5,154,245 A ‡ | 10/1992 | Waldenstrom | E21B 10/5676 | 175/42 |
| 5,172,778 A ‡ | 12/1992 | Tibbitts | E21B 10/5673 | 175/42 |
| 5,176,720 A ‡ | 1/1993 | Martell | B22F 7/06 | 51/293 |
| 5,184,433 A ‡ | 2/1993 | Maack | B24B 19/226 | 451/16 |
| 5,186,725 A ‡ | 2/1993 | Martell | C09K 3/1418 | 51/293 |
| 5,199,832 A ‡ | 4/1993 | Meskin | E21B 10/5676 | 175/37 |
| 5,205,684 A ‡ | 4/1993 | Meskin | E21B 10/5676 | 175/37 |
| 5,213,248 A ‡ | 5/1993 | Horton | B23K 20/025 | 228/44 |
| 5,215,415 A ‡ | 6/1993 | Fukuoka | B23B 27/143 | 407/11 |
| 5,217,081 A ‡ | 6/1993 | Waldenstrom | C22C 29/08 | 175/42 |
| 5,238,074 A ‡ | 8/1993 | Tibbitts | E21B 10/46 | 175/42 |
| 5,264,283 A ‡ | 11/1993 | Waldenstrom | E21B 10/5676 | 428/40 |
| 5,304,342 A ‡ | 4/1994 | Hall, Jr. | B01J 3/062 | 419/11 |
| 5,335,738 A ‡ | 8/1994 | Waldenstrom | E21B 10/5735 | 175/42 |
| 5,337,844 A ‡ | 8/1994 | Tibbitts | E21B 10/567 | 175/43 |
| 5,355,969 A ‡ | 10/1994 | Hardy | B23B 27/146 | 175/43 |
| 5,364,192 A ‡ | 11/1994 | Damm | F16C 33/043 | 384/42 |
| 5,368,398 A ‡ | 11/1994 | Damm | F16C 33/043 | 384/30 |
| 5,370,195 A ‡ | 12/1994 | Keshavan | E21B 10/5673 | 175/42 |
| 5,379,853 A ‡ | 1/1995 | Lockwood | E21B 10/5673 | 175/42 |
| 5,379,854 A ‡ | 1/1995 | Dennis | E21B 10/5673 | 175/42 |
| 5,439,492 A ‡ | 8/1995 | Anthony | C23C 16/01 | 51/295 |
| 5,447,208 A ‡ | 9/1995 | Lund | B24B 53/02 | 175/42 |
| 5,460,233 A ‡ | 10/1995 | Meany | E21B 10/5673 | 175/42 |
| 5,464,068 A ‡ | 11/1995 | Najafi-Sani | E21B 10/445 | 175/37 |
| 5,468,268 A ‡ | 11/1995 | Tank | B22F 7/04 | 51/293 |
| 5,469,927 A ‡ | 11/1995 | Griffin | E21B 10/52 | 175/43 |

(56) References Cited

U.S. PATENT DOCUMENTS

| | | | | |
|---|---|---|---|---|
| 5,480,233 A ‡ | 1/1996 | Cunningham | ............ | E21B 4/003 384/30 |
| 5,496,638 A ‡ | 3/1996 | Waldenstrom | ...... | C23C 14/5806 428/40 |
| 5,496,639 A ‡ | 3/1996 | Connell | ............... | H01Q 15/141 343/89 |
| 5,504,303 A ‡ | 4/1996 | Nagy | ................... | B23K 26/032 219/12 |
| 5,505,748 A ‡ | 4/1996 | Tank | ................ | B01J 3/062 51/293 |
| 5,510,193 A ‡ | 4/1996 | Cerutti | ................... | B01J 3/062 428/55 |
| 5,523,121 A ‡ | 6/1996 | Anthony | ................ | C23C 16/01 427/24 |
| 5,524,719 A ‡ | 6/1996 | Dennis | ..................... | B22F 7/06 175/43 |
| 5,544,713 A ‡ | 8/1996 | Dennis | ............... | E21B 10/5673 175/42 |
| 5,560,716 A ‡ | 10/1996 | Tank | ..................... | E21B 4/003 384/49 |
| 5,607,024 A ‡ | 3/1997 | Keith | .................... | E21B 10/43 175/43 |
| 5,620,302 A ‡ | 4/1997 | Garrison | ............... | F23L 17/005 415/16 |
| 5,620,382 A ‡ | 4/1997 | Cho | .................. | A63B 53/0466 473/33 |
| 5,624,068 A ‡ | 4/1997 | Waldenstrom | .......... | B23P 15/28 228/26 |
| 5,645,617 A ‡ | 7/1997 | Frushour | .................. | B22F 7/06 125/39 |
| 5,648,119 A ‡ | 7/1997 | Grab | ..................... | C23C 16/56 427/24 |
| 5,653,300 A ‡ | 8/1997 | Lund | .................. | E21B 10/5673 175/42 |
| 5,667,028 A ‡ | 9/1997 | Truax | .................. | B23P 15/28 175/42 |
| 5,669,271 A ‡ | 9/1997 | Griffin | .................. | C04B 37/021 175/42 |
| 5,706,906 A ‡ | 1/1998 | Jurewicz | ............ | E21B 10/5673 175/42 |
| 5,718,948 A ‡ | 2/1998 | Ederyd | ................. | C23C 16/271 427/24 |
| 5,722,497 A ‡ | 3/1998 | Gum | ...................... | E21B 10/16 175/37 |
| 5,722,499 A ‡ | 3/1998 | Nguyen | ............... | E21B 10/567 175/43 |
| 5,759,216 A ‡ | 6/1998 | Kanada | ................... | B01J 3/062 51/309 |
| 5,776,615 A ‡ | 7/1998 | Wong | ................. | C23C 14/0021 428/21 |
| 5,823,277 A ‡ | 10/1998 | Delwiche | ............. | E21B 10/573 175/42 |
| 5,833,021 A ‡ | 11/1998 | Mensa-Wilmot | ..... | E21B 10/567 175/43 |
| 5,875,862 A ‡ | 3/1999 | Jurewicz | ............. | E21B 10/5735 175/43 |
| 5,897,942 A ‡ | 4/1999 | Karner | ................... | C23C 16/27 428/21 |
| 5,944,129 A ‡ | 8/1999 | Jensen | ................ | E21B 10/567 175/43 |
| 5,954,147 A ‡ | 9/1999 | Overstreet | ........... | E21B 10/567 175/37 |
| 5,967,250 A ‡ | 10/1999 | Lund | .................... | E21B 10/567 175/42 |
| 5,979,578 A ‡ | 11/1999 | Packer | ................. | E21B 10/567 175/43 |
| 5,992,549 A ‡ | 11/1999 | Fuller | ................... | E21B 10/567 175/43 |
| 6,009,963 A ‡ | 1/2000 | Chaves | ............... | E21B 10/5676 175/43 |
| 6,063,333 A ‡ | 5/2000 | Dennis | .................... | B22F 3/105 419/6 |
| 6,123,612 A ‡ | 9/2000 | Goers | ................... | B24B 53/017 451/54 |
| 6,126,741 A ‡ | 10/2000 | Jones | ...................... | C30B 29/04 117/7 |
| 6,145,608 A ‡ | 11/2000 | Lund | .................... | B23B 27/145 175/42 |
| 6,193,001 B1 ‡ | 2/2001 | Eyre | .................... | E21B 10/5735 175/42 |
| 6,234,261 B1 ‡ | 5/2001 | Evans | ..................... | E21B 10/46 156/15 |
| 6,248,447 B1 ‡ | 6/2001 | Griffin | .................. | C04B 37/021 175/43 |
| 6,269,894 B1 ‡ | 8/2001 | Griffin | .................. | E21B 10/567 175/43 |
| 6,290,726 B1 ‡ | 9/2001 | Pope | ....................... | A61L 27/08 623/22 |
| 6,315,065 B1 ‡ | 11/2001 | Yong | .................... | E21B 10/573 175/42 |
| 6,332,503 B1 ‡ | 12/2001 | Pessier | ................... | E21B 10/16 175/33 |
| 6,338,754 B1 ‡ | 1/2002 | Cannon | ................... | C04B 28/26 106/62 |
| 6,344,149 B1 ‡ | 2/2002 | Oles | .................... | C04B 41/5338 216/10 |
| 6,367,568 B2 ‡ | 4/2002 | Steinke | ............... | E21B 10/16 175/33 |
| 6,410,085 B1 ‡ | 6/2002 | Griffin | ...................... | B22F 7/06 427/24 |
| 6,435,058 B1 ‡ | 8/2002 | Matthias | ................... | B22F 7/06 76/108 |
| 6,481,511 B2 ‡ | 11/2002 | Matthias | ................... | B22F 7/06 175/43 |
| 6,528,159 B1 ‡ | 3/2003 | Kanada | ................. | C04B 41/009 427/30 |
| 6,544,308 B2 ‡ | 4/2003 | Griffin | ................... | C04B 37/021 428/40 |
| 6,550,556 B2 ‡ | 4/2003 | Middlemiss | ............ | B23C 5/202 175/43 |
| 6,562,462 B2 ‡ | 5/2003 | Griffin | .................. | C04B 37/021 428/21 |
| 6,585,064 B2 ‡ | 7/2003 | Griffin | .................. | C04B 37/021 175/32 |
| 6,589,640 B2 ‡ | 7/2003 | Griffin | .................. | C04B 37/021 428/21 |
| 6,592,985 B2 ‡ | 7/2003 | Griffin | .................. | C04B 37/021 428/21 |
| 6,601,662 B2 ‡ | 8/2003 | Matthias | .................... | B22F 7/06 175/37 |
| 6,739,214 B2 ‡ | 5/2004 | Griffin | .................. | C04B 37/021 428/21 |
| 6,749,033 B2 ‡ | 6/2004 | Griffin | .................. | C04B 37/021 175/42 |
| 6,793,681 B1 ‡ | 9/2004 | Pope | ..................... | A61F 2/30767 623/22 |
| 6,797,326 B2 ‡ | 9/2004 | Griffin | .................. | C04B 37/021 216/10 |
| 6,861,098 B2 ‡ | 3/2005 | Griffin | ................... | E21B 10/567 216/10 |
| 6,878,447 B2 ‡ | 4/2005 | Griffin | .................. | C04B 37/021 428/21 |
| 6,892,836 B1 ‡ | 5/2005 | Eyre | .................... | E21B 10/5735 175/42 |
| 6,904,984 B1 ‡ | 6/2005 | Estes | .................. | E21B 10/5673 175/43 |
| 6,935,444 B2 ‡ | 8/2005 | Lund | ..................... | E21B 10/567 175/42 |
| 6,962,214 B2 ‡ | 11/2005 | Hughes | ................... | C04B 41/53 175/10 |
| 6,991,049 B2 ‡ | 1/2006 | Eyre | ..................... | E21B 10/5735 175/43 |
| 7,350,601 B2 ‡ | 4/2008 | Belnap | ...................... | B22F 7/06 175/37 |
| 7,377,341 B2 ‡ | 5/2008 | Middlemiss | ............ | B22F 7/062 175/37 |
| 7,493,973 B2 ‡ | 2/2009 | Keshavan | ................... | B24D 3/10 175/43 |

(56) References Cited

U.S. PATENT DOCUMENTS

| | | | | |
|---|---|---|---|---|
| 7,506,698 B2 ‡ | 3/2009 | Eyre | E21B 10/006 | 175/42 |
| 7,517,589 B2 ‡ | 4/2009 | Eyre | C22C 26/00 | 407/11 |
| 7,568,534 B2 ‡ | 8/2009 | Griffin | E21B 10/567 | 175/43 |
| 7,608,333 B2 ‡ | 10/2009 | Eyre | C22C 26/00 | 428/40 |
| 7,635,035 B1 * | 12/2009 | Bertagnolli | C04B 35/645 | 51/307 |
| 7,730,977 B2 ‡ | 6/2010 | Achilles | B23B 27/148 | 175/43 |
| 7,740,673 B2 ‡ | 6/2010 | Eyre | C22C 26/00 | 51/309 |
| 7,753,143 B1 ‡ | 7/2010 | Miess | E21B 10/5735 | 175/37 |
| 7,754,333 B2 ‡ | 7/2010 | Eyre | C22C 26/00 | 428/40 |
| 7,757,785 B2 ‡ | 7/2010 | Zhang | E21B 10/55 | 175/57 |
| 7,757,791 B2 ‡ | 7/2010 | Belnap | B22F 7/06 | 175/43 |
| 7,845,438 B1 ‡ | 12/2010 | Vail | B22F 3/16 | 175/43 |
| 7,866,418 B2 ‡ | 1/2011 | Bertagnolli | G01N 27/72 | 175/42 |
| 8,020,642 B2 ‡ | 9/2011 | Lancaster | E21B 10/46 | 175/43 |
| 8,074,748 B1 ‡ | 12/2011 | Miess | C04B 37/026 | 175/37 |
| 8,147,572 B2 ‡ | 4/2012 | Eyre | E21B 10/567 | 51/307 |
| 8,172,012 B2 ‡ | 5/2012 | Achilles | C23C 30/005 | 175/43 |
| 8,236,074 B1 ‡ | 8/2012 | Bertagnolli | E21B 10/567 | 51/307 |
| 8,297,382 B2 ‡ | 10/2012 | Bertagnolli | E21B 10/36 | 175/42 |
| 8,309,050 B2 ‡ | 11/2012 | Keshavan | E21B 10/55 | 423/44 |
| 8,323,367 B1 ‡ | 11/2012 | Bertagnolli | B24D 3/007 | 51/307 |
| 8,328,891 B2 ‡ | 12/2012 | Zhang | C22C 26/00 | 51/293 |
| 8,469,121 B2 ‡ | 6/2013 | Lancaster | B24D 99/005 | 175/43 |
| 8,596,387 B1 ‡ | 12/2013 | Sani | C22C 26/00 | 175/43 |
| 8,766,628 B2 ‡ | 7/2014 | Bertagnolli | B24D 18/0009 | 324/22 |
| 9,037,430 B1 ‡ | 5/2015 | Wiggins | G01N 27/041 | 702/65 |
| 9,062,505 B2 ‡ | 6/2015 | Chapman | B23K 26/364 | |
| 9,315,881 B2 ‡ | 4/2016 | Bertagnolli | F16C 33/26 | |
| 9,316,060 B1 ‡ | 4/2016 | Bertagnolli | E21B 10/567 | |
| 2005/0115744 A1 ‡ | 6/2005 | Griffin | E21B 10/567 | 175/43 |
| 2005/0129950 A1 ‡ | 6/2005 | Griffin | C04B 37/021 | 428/40 |
| 2005/0139397 A1 ‡ | 6/2005 | Achilles | B22F 7/02 | 175/43 |
| 2005/0230156 A1 ‡ | 10/2005 | Belnap | C22C 1/058 | 175/37 |
| 2005/0263328 A1 ‡ | 12/2005 | Middlemiss | B22F 7/06 | 175/43 |
| 2006/0060390 A1 ‡ | 3/2006 | Eyre | B24D 3/10 | 175/43 |
| 2006/0060391 A1 ‡ | 3/2006 | Eyre | E21B 10/567 | 175/43 |
| 2006/0086540 A1 ‡ | 4/2006 | Griffin | E21B 10/567 | 175/42 |
| 2006/0162969 A1 ‡ | 7/2006 | Belnap | B22F 7/06 | 175/43 |
| 2007/0039762 A1 ‡ | 2/2007 | Achilles | B23B 27/148 | 175/43 |
| 2007/0046120 A1 ‡ | 3/2007 | Cooley | F16C 33/26 | 310/90 |
| 2007/0181348 A1 ‡ | 8/2007 | Lancaster | E21B 10/46 | 175/43 |
| 2007/0187155 A1 ‡ | 8/2007 | Middlemiss | E21B 10/5676 | 175/42 |
| 2008/0206576 A1 ‡ | 8/2008 | Qian | C04B 35/52 | 428/44 |
| 2009/0152016 A1 ‡ | 6/2009 | Eyre | E21B 10/006 | 175/42 |
| 2010/0266816 A1 ‡ | 10/2010 | Eyre | C22C 26/00 | 428/15 |
| 2011/0023375 A1 ‡ | 2/2011 | Sani | C04B 35/645 | 51/297 |
| 2011/0056141 A1 ‡ | 3/2011 | Miess | F16C 33/26 | 51/295 |
| 2012/0247029 A1 ‡ | 10/2012 | Eyre | E21B 10/567 | 51/309 |
| 2013/0092451 A1 ‡ | 4/2013 | Mukhopadhyay | B01J 3/062 | 175/428 |
| 2014/0069726 A1 ‡ | 3/2014 | Mumma | B24D 99/005 | 175/43 |
| 2014/0166371 A1 ‡ | 6/2014 | Whittaker | E21B 10/573 | 175/43 |
| 2014/0246253 A1 ‡ | 9/2014 | Patel | E21B 10/5673 | 175/43 |
| 2015/0135603 A1 ‡ | 5/2015 | Can | B01J 3/062 | 51/309 |
| 2015/0136495 A1 ‡ | 5/2015 | Knuteson | B22F 3/14 | 175/428 |
| 2015/0144407 A1 ‡ | 5/2015 | Khabashesku | B24D 18/0009 | 175/42 |
| 2015/0209745 A1 * | 7/2015 | Mukhopadhyay | E21B 10/567 | 51/297 |
| 2015/0284827 A1 ‡ | 10/2015 | Can | B22F 7/06 | 51/309 |
| 2016/0312541 A1 ‡ | 10/2016 | Feehily | E21B 10/5735 | |

FOREIGN PATENT DOCUMENTS

| | | | |
|---|---|---|---|
| DE | 4240053 A1 | | 6/1993 |
| DE | 4240053 A1 | ‡ | 6/1993 |
| EP | 0149530 A3 | ‡ | 7/1985 |
| EP | 0149530 A3 | | 7/1985 |
| EP | 0196777 B1 | ‡ | 10/1986 |
| EP | 0196777 B1 | | 10/1986 |
| EP | 0282 0298729 A | ‡ | 1/1989 |
| EP | 0298729 A1 | | 1/1989 |
| EP | 0300699 A2 | ‡ | 1/1989 |
| EP | 0300699 A2 | | 1/1989 |
| EP | 0322214 B1 | | 6/1989 |
| EP | 0322214 B1 | ‡ | 6/1989 |
| EP | 0329954 B1 | | 8/1989 |
| EP | 0329954 B1 | ‡ | 8/1989 |
| EP | 0480394 A2 | | 4/1992 |
| EP | 0480394 A2 | ‡ | 4/1992 |
| EP | 0500253 B2 | | 8/1992 |
| EP | 0500253 B2 | ‡ | 8/1992 |
| EP | 0541071 A1 | | 5/1993 |
| EP | 0541071 A1 | ‡ | 5/1993 |
| EP | 0585631 A1 | | 3/1994 |
| EP | 0585631 A1 | ‡ | 3/1994 |
| EP | 0595630 B1 | | 5/1994 |
| EP | 0595630 B1 | ‡ | 5/1994 |
| EP | 0612868 B1 | ‡ | 8/1994 |
| EP | 0612868 B1 | | 8/1994 |
| EP | 0617207 B1 | ‡ | 9/1994 |
| EP | 0617207 B1 | | 9/1994 |
| EP | 0787820 A3 | | 8/1997 |
| EP | 0787820 A3 | ‡ | 8/1997 |
| EP | 0860515 A1 | | 8/1998 |
| EP | 0860515 A1 | ‡ | 8/1998 |
| EP | 1190791 A2 | ‡ | 3/2002 |

(56) References Cited

FOREIGN PATENT DOCUMENTS

| | | | |
|---|---|---|---|
| EP | 1190791 | A2 | 3/2002 |
| GB | 1349385 | ‡ | 4/1974 |
| GB | 2048927 | ‡ | 12/1980 |
| GB | 2268768 | ‡ | 1/1994 |
| GB | 2323398 | ‡ | 9/1998 |
| GB | 2418215 | ‡ | 3/2006 |
| GB | 2422394 | ‡ | 7/2006 |
| GB | 1321991.0 | A1 ‡ | 12/2013 |
| GB | 1321991.0 | A1 | 12/2013 |
| GB | 2540482 | ‡ | 1/2017 |
| GB | 2540482 | A | 1/2017 |
| JP | 59-35066 | ‡ | 2/1984 |
| JP | 61-67740 | ‡ | 10/1984 |
| JP | 59-219500 | A2 ‡ | 12/1984 |
| JP | 59-219500 | A2 | 12/1984 |
| JP | 07-62468 | ‡ | 3/1985 |
| JP | 61-125739 | A2 | 6/1986 |
| JP | 61-125739 | A2 ‡ | 6/1986 |
| JP | 63-069971 | ‡ | 9/1986 |
| JP | 63-55161 | ‡ | 8/1987 |
| JP | 07-156003 | ‡ | 11/1993 |
| JP | 11-245103 | ‡ | 9/1999 |
| JP | 2000-087112 | ‡ | 3/2000 |
| RU | 2034937 | ‡ | 5/1995 |
| RU | 566439 | ‡ | 7/2000 |
| WO | 93/23204 | A1 | 11/1993 |
| WO | WO-93/23204 | A1 ‡ | 11/1993 |
| WO | 96/34131 | A1 | 10/1996 |
| WO | WO-96/34131 | A1 ‡ | 10/1996 |
| WO | 00/28106 | A1 | 5/2000 |
| WO | WO-00/28106 | A1 ‡ | 5/2000 |
| WO | 2018/147959 | A1 | 8/2001 |
| WO | 2004/040095 | A1 | 5/2004 |
| WO | WO-2004/040095 | A1 ‡ | 5/2004 |
| WO | 2004/106003 | A1 | 12/2004 |
| WO | 2004/106004 | A1 | 12/2004 |
| WO | WO-2004/106003 | A1 ‡ | 12/2004 |
| WO | WO-2004/106004 | A1 ‡ | 12/2004 |
| WO | 2012/145586 | A1 | 10/2012 |
| WO | WO-2012/145586 | A1 ‡ | 10/2012 |
| WO | 2015086767 | A1 | 6/2015 |
| WO | WO-2015086767 | A1 ‡ | 6/2015 |
| WO | WO-2018/147959 | A1 ‡ | 8/2018 |

OTHER PUBLICATIONS

Teale, R., "The Concept of Specific Energy in Rock Drilling", Int. J. Rock Mech. Mining Set., vol. 2, 1965, pp. 57-73.‡
Wampler, Charles, et al., "Methodology for selecting PDC bits cuts drilling costs", Oil & Gas Journal, Jan. 15, 1990, pp. 39-44.‡
Warren, T.M., et al., "Bottomhold Stress Factors Affecting Drilling Rate at Depth", Journal of Petroleum Technology, Aug. 1985, pp. 1523-1533.‡
Simon, R., "Energy Balance in Rock Drilling", (SPE Paper No. 499) Society of Petroleum Engineers Journal, Dec. 1963, pp. 298-306.‡
Smith, R.H., et al., "Drilling Plastics Formations Using Highly Polished PDC Cutters", (SPE Paper No. 30476) Society of Petroleum Engineers, Inc., 1995, pp. 29-44.‡
Schey, John A., "Tribology in Metalworking—Friction, Lubrication and Wear", American Society for Metals, 1983, pp. 573-616.‡
Three pages of photocopied photographs of hammers.‡

Mark Pehrson Chapman, et al.; Energy Machined Polycrystalline Diamond Compacts and Related Methods; U.S. Appl. No. 62/456,785, filed Feb. 9, 2017.‡
Mark Pehrson Chapman, et al.; Energy Machined Polycrystalline Diamond Compacts and Related Methods; U.S. Appl. No. 16/084,469, filed Sep. 12, 2018.‡
Joshua Adam Hawks, et al.; Leached Superabrasive Elements and Leaching Systems Methods and Assemblies for Processing Superabrasive Elements; U.S. Appl. No. 14/178,251, filed Feb. 11, 2014.‡
Wilks, E.M., "The resistance of diamond and other gem stones to abrasion", Clarendon Laboratory University of Oxford UK.‡
Wilks, John, et al., "Properties and Applications of Diamond", Butterworth-Heinemann Ltd., 1991, pp. 290-309.‡
Warren, T.M., et al., "Laboratory Drilling Performance of PDC Bits", (SPE Paper No. 15617) SPE Drilling Engineering, Jun. 1988, pp. 125-135.‡
Field, J.E., "The Properties of Diamond", pp. 359, 645 & 646.‡
Hemphill, Terry, et al., Effects of PDC-Bit Selection and Mud Chemistry on Drilling Rates in Shale, (SPE Paper No. 22579) SPE Drilling & Completion, Sep. 1994, pp. 176-184.‡
Davis, J.R., "Technical Brief 51: Superabrasives", ASM Materials Engineering Dictionary, p. 465, 1992.‡
Moore, D.T., "Tutorials in Optics", Ch. 8, Methods for Characterizing Surface Topograph, (8 pages).‡
Pessier, R.C., et al., "Quantifying Common Drilling Problems With Mechanical Specific Energy and a Bit-Specific Coeffcient of Sliding Friction", (SPE Paper No. 24584) Society of Petroleum Engineers Inc., 1992, pp. 373-388.‡
Hibbs, L.E., et al., "Wear Mechanisms for Polycrystalline Diamond Compacts as Utilized for Drilling in Geothermal Environments", General Electric Company, Corporate Research and Development, Contract Period Nov. 1979 to Sep. 1982, pp. 89-99.‡
Kuru, E., et al., "An Experimental Study of Sliding Friction Between PDC Drill Cutters and Rocks", Int. J. Rock Mech. Min. Sci. & Geomech. Abstr., vol. 32, No. 3, pp. 227-283, 1995.‡
Argon, Ali S., et al., "Mechanical Behavior of Materials", Massachusetts Institute of Technology, pp. 445 & 46.‡
Clark, D.A., et al., Comparison of Laboratory and Field Data for a PDC Bit, (SPE/IADC Paper No. 13459) SPE/IADC 1985 Drilling Conference, pp. 323-325.‡
A letter dated Nov. 15, 1995 from Bill Short of Bit & Tool to David Hall of Novate.‡
Letter with attachments from Mark R. Benenti of Hommell America Inc. to Gerald Angst of Hycalog, dated Dec. 18, 1995, 8 pages.‡
Hong, S. et al.; "Dissolution Behavior of Fine Particles of Diamond Under High Pressure Sintering Conditions;" Journal of Material Science Letters 10; pp. 164-166; 1991.‡
Andersen, E.E., et al., "PDC-Bit Performance Under Simulated Borehole Conditions", (SPE Paper No. 20412) SPE Drilling & Completion, Sep. 1993, pp. 184-188.‡
Nakamura, T. et al.; Study on th eHeat Deterioration Mechanism of Sintered Diamond; Program and Abstracts of the 27th High Pressure Conference of Japan; Oct. 13-15, 1986; Sapporo.‡
Argon, Ali S., et al., "Mechanical Behavior of Materials", Massachusetts Institute of Technology, pp. 445 & 461.
A letter dated Nov. 15, 1995 from Bill Short of Bit & Tool to David Hall of Novatek.
International Search Report and Written Opinion dated Feb. 20, 2019 in corresponding International Application No. PCT/US2018/051583 with the International Filing Date of Sep. 18, 2018.

\* cited by examiner
‡ imported from a related application

Standard Working Example 17

Working Example 16

POLYCRYSTALLINE DIAMOND ELEMENTS AND SYSTEMS AND METHODS FOR FABRICATING THE SAME

CROSS REFERENCE TO RELATED APPLICATIONS

This application is a divisional of U.S. patent application Ser. No. 16/133,643, filed Sep. 17, 2018, for "POLYCRYSTALLINE DIAMOND ELEMENTS AND SYSTEMS AND METHODS FOR FABRICATING THE SAME," which application claims the benefit of U.S. Provisional Patent Application No. 62/691,530, titled "POLYCRYSTALLINE DIAMOND ELEMENTS AND SYSTEMS AND METHODS FOR FABRICATING THE SAME" and filed Jun. 28, 2018, and U.S. Provisional Patent Application No. 62/560,185, titled "POLYCRYSTALLINE DIAMOND ELEMENTS AND SYSTEMS AND METHODS FOR FABRICATING THE SAME" and filed Sep. 18, 2017, the disclosure of each of which is hereby incorporated herein in its entirety by this reference.

BACKGROUND

Wear-resistant, superabrasive materials are traditionally utilized for a variety of mechanical applications. For example, polycrystalline diamond compacts ("PDCs"), which are formed of polycrystalline diamond ("PCD") materials are often used in drilling tools (e.g., cutting elements, gage trimmers, etc.), machining equipment, bearing apparatuses, wire-drawing machinery, and in other mechanical systems. Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

As mentioned above, conventional superabrasive materials have found utility as bearing elements, which may include bearing elements utilized in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron, that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst. In addition to dissolving carbon and graphite, the metal-solvent catalyst may also carry tungsten, tungsten carbide, and/or other materials from the substrate into the PCD layer of the cutting element, or from a lower layer of diamond-additive to an upper PCD layer.

Despite the availability of a number of different PCD materials, manufacturers and users of PCD materials continue to seek improved PCD materials.

SUMMARY

The instant disclosure is directed to exemplary polycrystalline diamond and polycrystalline diamond elements and systems, methods, and assemblies for fabricating polycrystalline diamond elements. According to at least one embodiment, polycrystalline diamond may include polycrystalline diamond having a working surface and a peripheral surface extending around an outer periphery of the working surface. The polycrystalline diamond may include a first volume including an interstitial material, and a second volume including a leached region that includes boron and titanium.

In some embodiments, the leached region may include a compound including two or more of boron, titanium, cobalt, molybdenum, and tungsten. The compound in the leached region may include at least one of a tungsten-cobalt compound, a titanium-cobalt compound, a cobalt-boron compound, a tungsten-cobalt-boron compound, and a titanium-cobalt-boron compound. The compound including two or more of boron, titanium, cobalt, molybdenum, and tungsten may be an intermetallic compound. The leached region may include non-elemental cobalt.

In at least one embodiment, the second volume may be disposed between the working surface and the first volume. A portion of the second volume may be defined by at least a portion of at least one of the working surface and the peripheral surface. At least one of the boron and the titanium in the leached region may be located at the at least one of the working surface and the peripheral surface. In some embodiments, a substrate may be bonded to the polycrystalline diamond.

In some embodiments, the interstitial material of the first volume may include at least one of boron, titanium, copper, chromium, molybdenum, cobalt, and tungsten. Concentration of the at least one of the boron, the titanium, the cobalt, and the tungsten of the interstitial material in the first volume may decrease along a direction from a portion of the first volume disposed away from the second volume toward the second volume. The second volume may have a higher concentration of at least one of boron, titanium, copper, chromium, molybdenum, cobalt, and tungsten than the first volume. The second volume may have a lower concentration of at least one of cobalt and tungsten than the first volume. In some embodiments, concentration of at least one of boron and titanium in the second volume may increase along a direction from a portion of the second volume adjacent the first volume toward the working surface of the polycrystalline diamond.

In at least one embodiment, the interstitial material of the first volume may include a boride material. The boride material may include at least one of a cobalt boride and a titanium boride material. In some embodiments, the interstitial material of the first volume may include a boron carbide material. The polycrystalline diamond may include an interstitial transition metal material. The interstitial transition metal material includes at least one of a group 4 (group IVB) element, a group 6 (group VIB) element, a group 9 (group VIII) element, and a group 11 (group 1B) element. According to at least one embodiment, the interstitial transition metal material may include at least one of chromium, copper, titanium, tungsten, cobalt, and molybdenum. According to some embodiments, the interstitial material of the first volume may include at least one of cobalt-titanium intermetallic, cobalt boride, cobalt tungsten boride, and khamrabaevite. In at least one embodiment, the interstitial material of the first volume may include at least one of $BCo$, $BCo_2$, $B_2Co_3$, $Co_2B$, $Co_{23}B_6$, $Co_3Ti$, $TiCo_2$, $CoW_2B_2$, $Co_{21}W_2B_6$, WC, and TiC.

According to some embodiments, the polycrystalline diamond may exhibit a magnetic coercivity of approximately 140 Oe or less. The polycrystalline diamond may exhibit a magnetic coercivity of between approximately 100 Oe and approximately 135 Oe. In at least one embodiment, the polycrystalline diamond may exhibit a magnetic saturation value of approximately 10 Gauss*ccm/g or less. The polycrystalline diamond may exhibit a magnetic saturation value of between approximately 6 Gauss*ccm/g and approximately 9 Gauss*ccm/g. According to at least one embodiment, the leached region may be electrically conductive. The leached region may exhibit an electrical surface conductivity of at least approximately 1700 S/m. The leached region may exhibit an electrical surface conductivity of between approximately 2000 S/m and approximately 7000 S/m. The polycrystalline diamond may exhibit an average electrical conductivity of at least approximately 700 S/m. The polycrystalline diamond may exhibit an average electrical conductivity of between approximately 1000 S/m and approximately 5000 S/m.

According to at least one embodiment, the polycrystalline diamond may exhibit a first crack load limit of at least approximately 6900 lb. The polycrystalline diamond may exhibit a first crack load limit of between approximately 7000 lb and approximately 10,000 lb. In some embodiments, the polycrystalline diamond may exhibit a $G_{ratio}$ of at least approximately $4.5 \times 10^6$. The polycrystalline diamond may exhibit a $G_{ratio}$ of between approximately $5.0 \times 10^6$ and approximately $2.0 \times 10^7$.

In some embodiments, the polycrystalline diamond may include a third volume that is substantially free of boron and titanium. In at least one embodiment, the polycrystalline diamond may include a third volume that includes the interstitial material at a different concentration than the first volume. The second volume may include an unleached region between the first volume and the second volume. According to some embodiments, the polycrystalline diamond may include an arcuate boundary between the leached region and the unleached region. A boundary between the leached region and the unleached region may generally follow a boundary between the unleached region and the first volume. In at least one embodiment, the second volume may extend along a majority of the peripheral surface. The polycrystalline diamond may include an arcuate boundary between the second volume and the first volume.

A method of fabricating a polycrystalline diamond element may include positioning a first volume of diamond particles adjacent to a substrate, the first volume of diamond particles including a material including a group 13 (group IIIA) element, and positioning a second volume of diamond particles adjacent to the first volume of diamond particles such that the first volume of diamond particles is disposed between the second volume of diamond particles and the substrate, the second volume of diamond particles having a lower concentration of the material including the group 13 element than the first volume of diamond particles. The method may also include enclosing the substrate, the first volume of diamond particles, and the second volume of diamond particles in a pressure transmitting medium to form a cell assembly, and subjecting the cell assembly to a high-pressure/high-temperature process to form a polycrystalline diamond table coupled to the substrate.

According to some embodiments, the second volume of diamond particles may be substantially free of the group 13 element. The group 13 element may include at least one of boron, aluminum, gallium, indium, and thallium. The material included in the first volume of diamond particles may include a boride material. In at least one embodiment, the material included in the first volume of diamond particles may include at least one of a cobalt boride material, a titanium boride material, and a boron carbide material. The material included in the first volume of diamond particles may include a compound that includes the group 13 element. In some embodiments, the first volume of diamond particles may include the compound that includes the group 13 element at a concentration of approximately 10% or less by weight. The first volume of diamond particles may include the compound that includes the group 13 element at a concentration of approximately 0.1% to approximately 8% by weight. The method may further include exposing at least a portion of the polycrystalline diamond table to a leaching agent.

In various embodiments, a method of fabricating a polycrystalline diamond element may include (i) positioning a first volume of diamond particles adjacent to a substrate, the first volume of diamond particles including at least one of a titanium material and a boron material, (ii) positioning a second volume of diamond particles adjacent to the first volume of diamond particles such that the first volume of diamond particles is disposed between the second volume of diamond particles and the substrate, the second volume of diamond particles having a lower concentration of the at least one of the titanium material and the boron material than the first volume, (iii) enclosing the substrate, the first volume of diamond particles, and the second volume of diamond particles in a pressure transmitting medium to form a cell assembly, and (iv) subjecting the cell assembly to a high-pressure/high-temperature process to form a polycrystalline diamond element.

In one embodiment, the second volume of diamond particles may be substantially free of the at least one of the titanium material and the boron material. The interstitial boron material may include a boride material. In some embodiments, the interstitial boron material may include, for example, at least one of a cobalt boride material, a titanium boride material, and a boron carbide material.

In at least one embodiment, the first volume of diamond particles may include the at least one of the titanium material and the boron material at a concentration of approximately 10% or less by weight. The first volume of diamond particles may, for example, include the at least one of the titanium material and the boron material at a concentration of approximately 0.1% to approximately 8% by weight. In some embodiments, the first volume of diamond particles may include the at least one of the titanium material and the boron material at a concentration of approximately 0.5% to approximately 5% by weight. In certain embodiments, the first volume of diamond particles may include the at least one of the titanium material and the boron material at a concentration of approximately 1% to approximately 3% by weight. The method may further include exposing at least a portion of the polycrystalline diamond element to a leaching agent.

In some embodiments, a polycrystalline diamond element, may include a polycrystalline diamond table including a nonplanar working surface, the polycrystalline diamond table including an interstitial material that includes a group 13 element, and a substrate bonded to the polycrystalline diamond table. The nonplanar working surface may have a central, apical region. The central, apical region may, for example, be domed. In at least one embodiment, the nonplanar working surface may have a substantially conical shape. The polycrystalline diamond table may further include a peripheral surface extending around an outer periphery of the nonplanar working surface. An interface between the polycrystalline diamond table and the substrate may be substantially planar or nonplanar. In some embodiments, the interface may surround a portion of the substrate abutting the polycrystalline diamond table. In at least one embodiment, the interface may generally follow the nonplanar working surface.

According to various embodiments, the group 13 element may include at least one of boron, aluminum, gallium, indium, and thallium. The group 13 element may include at least one of boron, aluminum, gallium, indium, and thallium. The material including the group 13 element may include a boride material. In at least one embodiment, the material including the group 13 element may include at least one of a cobalt boride material, a titanium boride material, a cobalt tungsten boride material, a boron carbide material, and a cobalt-titanium intermetallic material. In some examples, the material including the group 13 element may include at least one of BCo, $BCo_2$, $B_2Co_3$, $Co_2B$, $Co_{23}B_6$, $CoW_2B_2$, and $Co_{21}W_2B_6$. The polycrystalline diamond table may include a compound comprising the group 13 element at a concentration of approximately 10% or less by weight. In some embodiments, the polycrystalline diamond table may include a compound including the group 13 element at a concentration of approximately 0.1% to approximately 8% by weight.

According to some embodiments, the polycrystalline diamond table may include a leached region adjacent to at least a portion of the nonplanar working surface. The leached region may include a compound having two or more of boron, copper, titanium, cobalt, molybdenum, and tungsten. The compound may include at least one of a tungsten-cobalt compound, a titanium-cobalt compound, a cobalt-boron compound, a tungsten-cobalt-boron compound, and a titanium-cobalt-boron compound. In at least one embodiment, the compound may include an intermetallic compound. The leached region include the interstitial material including the group 13 element. The leached region may include boron and titanium. The leached region include non-elemental cobalt.

In various embodiments, the polycrystalline diamond table may include a first volume including the interstitial material that includes the group 13 element and a second volume disposed between the nonplanar working surface and the first volume, the second volume including a different concentration of the interstitial material that includes the group 13 element than the first volume.

According to certain embodiments, a method of fabricating a polycrystalline diamond element may include (1) positioning a volume of diamond particles adjacent to a substrate, the volume of diamond particles including a material comprising a group 13 element, (2) enclosing the substrate and the volume of diamond particles in a pressure transmitting medium to form a cell assembly, and (3) subjecting the cell assembly to a high-pressure/high-temperature process to form a polycrystalline diamond table coupled to the substrate. The group 13 element may include at least one of boron, aluminum, gallium, indium, and thallium. The material included in the volume of diamond particles may include a boride material. The material included in the volume of diamond particles may include at least one of a cobalt boride material, a titanium boride material, and a boron carbide material. The material included in the volume of diamond particles may include a compound that includes the group 13 element. The volume of diamond particles may include the compound comprising the group 13 element at a concentration of approximately 10% or less by weight.

In some embodiments, a surface portion of the pressure transmitting medium abutting the volume of diamond particles may have a non-linear shape. The non-linear shape may include a substantially conical shape. An interface between the volume of diamond particles and the substrate may be nonplanar. The interface may surround a portion of the substrate abutting the volume of diamond particles. In at least one embodiment, the method may further include exposing at least a portion of the polycrystalline diamond table to a leaching agent.

According to various embodiments, a method of fabricating a polycrystalline diamond element may include (1) positioning a first volume of diamond particles adjacent to a substrate, (2) positioning a second volume of diamond particles adjacent to the first volume of diamond particles such that the first volume of diamond particles is disposed between the second volume of diamond particles and the substrate, the second volume of diamond particles having a higher concentration of a material comprising a group 13 element than the first volume of diamond particles, (3) enclosing the substrate, the first volume of diamond particles, and the second volume of diamond particles in a pressure transmitting medium to form a cell assembly, and (4) subjecting the cell assembly to a high-pressure/high-temperature process to form a polycrystalline diamond table coupled to the substrate.

In some embodiments, the first volume of diamond particles may be substantially free of the group 13 element. The group 13 element may include at least one of boron, aluminum, gallium, indium, and thallium. The material included in the second volume of diamond particles may include a boride material. The material included in the second volume of diamond particles may include at least one of a cobalt boride material, a titanium boride material, and a boron carbide material. The material included in the second volume of diamond particles may include a compound that includes the group 13 element. The second volume of diamond particles may include the compound that includes the group 13 element at a concentration of approximately 10% or less by weight. The method may further include exposing at least a portion of the polycrystalline diamond table to a leaching agent.

Features from any of the disclosed embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
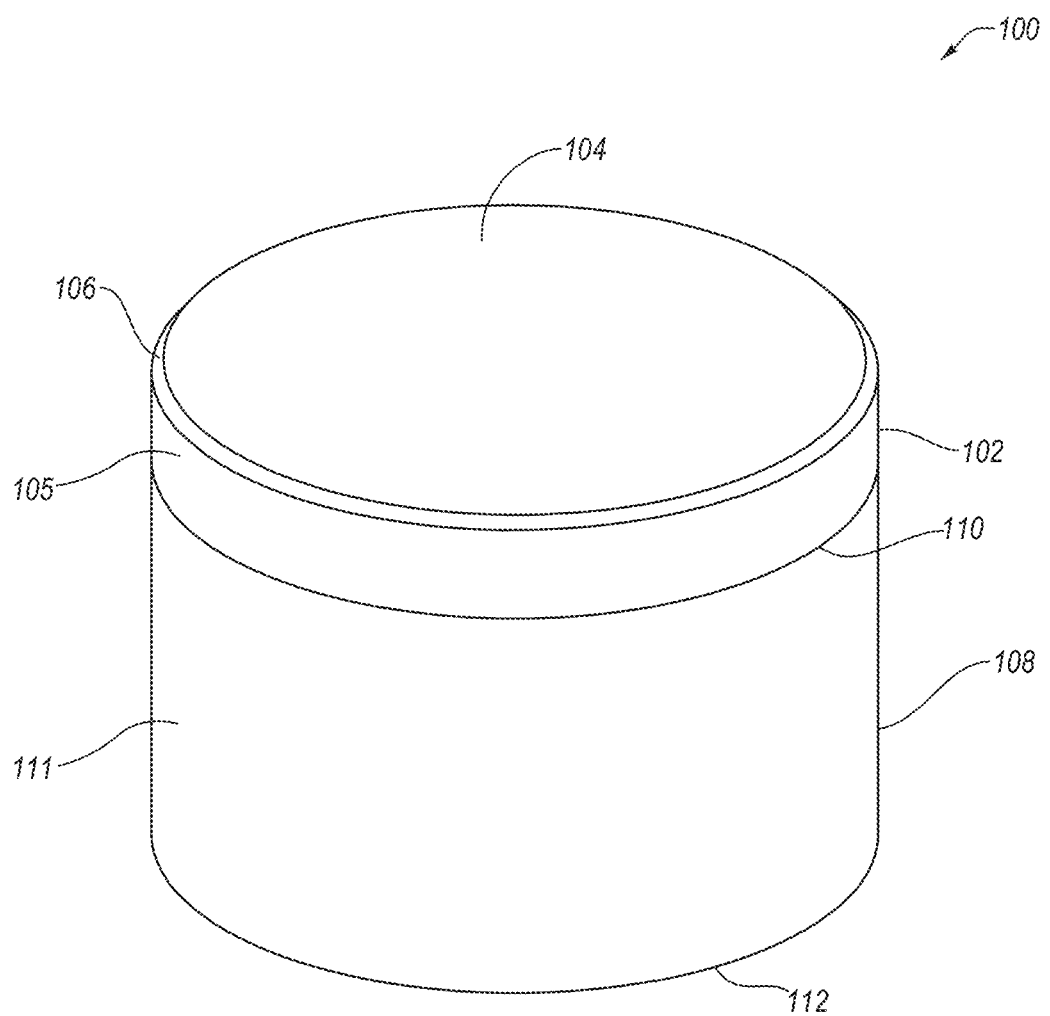
FIG. 1 is a perspective view of an exemplary PCD element according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary PCD elements and systems, methods, and assemblies for fabricating PCD elements. The PCD elements disclosed herein may be used as cutting elements for use in a variety of applications, such as drilling tools, machining equipment, cutting tools, and other apparatuses, without limitation. The disclosed PCD elements may also be used as bearing elements in a variety of bearing applications, such as thrust bearings, radial bearings, and other bearing apparatuses, without limitation.

FIG. 1 is an isometric view of a PCD element 100 including a PCD body/table 102 according to one embodiment. PCD table 102 may include a plurality of diamond grains exhibiting diamond-to-diamond bonding (e.g., sp3 bonding) therebetween, the diamond grains defining a plurality of interstitial regions. According to some embodiments, PCD table 102 may include cubic boron nitride, silicon carbide, polycrystalline diamond, and/or mixtures or composites including one or more of the foregoing materials, without limitation. PCD table 102 may include an upper, working surface 104, at least one peripheral surface 105, and an optional chamfer 106 extending therebetween. As used herein, the phrase "working surface" may refer, without limitation, to a portion of a PCD element configured to be exposed to and/or in contact with an external feature, such as a portion of a cutting element that is configured to be exposed to and/or in contact with a subterranean formation during drilling, a portion of a bearing element that is configured to contact an opposing bearing surface, et cetera. Although FIG. 1 shows working surface 104 as being substantially planar, working surface 104 may exhibit any selected nonplanar topography, such as grooves and/or a curved concave and/or convex surface, without limitation.

PCD element 100 may further include a substrate 108 having an interfacial surface 110 that is bonded to PCD table 102. Interfacial surface 110 may exhibit any suitable planar topography or nonplanar topography, such as a grooved, ridged, and/or other nonplanar interfacial surface, without limitation. Substrate 108 may have at least one side surface 111 and a bottom, or rear surface 112 located away from interfacial surface 110. Substrate 108 may include any suitable material. For example, substrate 108 may include a cemented carbide material, such as tungsten carbide, titanium carbide, chromium carbide, niobium carbide, tantalum carbide, vanadium carbide, or combinations thereof that may be cemented with iron, nickel, cobalt, or alloys thereof. Substrate 108 may, for example, be a cobalt-cemented tungsten carbide substrate.

As illustrated in FIG. 1, PCD element 100 may exhibit a generally cylindrical shaped geometry. However, in other embodiments, PCD element 100 may exhibit a generally rounded rectangular geometry, a generally oval-shaped geometry, a generally wedge-shaped geometry, and/or any other suitable geometry, without limitation.

PCD table 102 may be formed using any suitable technique. As will be described in greater detail below, PCD table 102 may be fabricated by subjecting a plurality of diamond particles to a HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., $sp^3$-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution. Polycrystalline diamond elements, such as those disclosed in U.S. Pat. Nos. 7,866,418 and 8,297,382, the disclosure of each of which is incorporated herein, in its entirety, by this reference, may have magnetic properties in at least some regions as disclosed therein and leached regions in other regions as disclosed herein.

Following sintering, various materials, such as a metal-solvent catalyst (e.g., cobalt, nickel, iron, and/or alloys thereof), tungsten, boron and/or other group 13 elements (e.g., aluminum, gallium, indium, thallium), various other metals (e.g., copper, nickel, iron, chromium, molybdenum, etc.), and/or any other material, remaining in interstitial regions within the as-sintered PCD body may reduce the thermal stability of PCD table 102 at elevated temperatures. In some examples, differences in thermal expansion coefficients between diamond grains in the as-sintered PCD body and a metal-solvent catalyst in interstitial regions between the diamond grains may weaken portions of PCD table 102 that are exposed to elevated temperatures, such as temperatures developed during drilling and/or cutting operations. The weakened portions of PCD table 102 may be worn and/or damaged during the drilling and/or cutting operations.

Removing the metal-solvent catalyst and/or other materials from the as-sintered PCD body may improve the heat resistance and/or thermal stability of PCD table 102, particularly in situations where the PCD material may be exposed to elevated temperatures. A metal-solvent catalyst and/or other materials may be removed from the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of PCD table 102. Removing a metal-solvent catalyst and/or other materials from the as-sintered PCD body may reduce damage to the PCD material of PCD table 102 caused by expansion of the metal-solvent catalyst. As will be discussed in greater detail below, at least a portion of a metal-solvent catalyst, such as cobalt, and/or as other materials, may be removed from at least a portion of the as-sintered PCD body using any suitable technique, without limitation.

The plurality of diamond particles used to form PCD table 102 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger"

and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12 µm, 10 µm, 8 µm, 4 µm, 2 µm, 1 µm, 0.75 µm, 0.5 µm, less than 0.5 µm, 0.1 µm, less than 0.1 µm). In another embodiment, the plurality of diamond particles may include a portion (e.g., 5%, 10%, 15%, 20%, 25%, 30%, 35%, 40%, 45%, 50%, 55%, 60%, 65%, 70%, 75%, 80%, 85%, 90%, 95% by weight) exhibiting a relatively larger size between about 40 µm and about 15 µm and another portion exhibiting a relatively smaller size between about 12 µm and 2 µm. Such portions may be any combination of weight percent (e.g., 5%, 10%, 20%, or 30% of the relatively smaller portion, with the balance of the relatively larger portion). Of course, the plurality of diamond particles may also include three or more different sizes (e.g., one relatively larger size and two or more relatively smaller sizes) in any proportion, without limitation. Different sizes of diamond particle may be disposed in different locations within a polycrystalline diamond volume, without limitation. According to at least one embodiment, disposing different sizes of diamond particles in different locations may facilitate control of a leach depth, as will be described in greater detail below.

The diamond particle size distribution of the diamond particles used to form PCD table 102 may exhibit a single mode, or may be a bimodal or greater grain size distribution. In an embodiment, the diamond particles may comprise a relatively larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger average particle size (e.g., 50 µm, 40 µm, 30 µm, 20 µm, 15 µm, 12 µm, 10 µm, 8 µm, including ranges between any of the provided relatively larger average particle sizes) and another portion exhibiting at least one relatively smaller average particle size (e.g., 6 µm, 5 µm, 4 µm, 3 µm, 2 µm, 1 µm, 0.75 µm, 0.5 µm, less than 0.5 µm, 0.1 µm, less than 0.1 µm, including ranges between any of the provides relatively smaller average particle sizes). In an embodiment, the diamond particles may include a portion exhibiting a relatively larger average particle size between about 10 µm and about 40 µm and another portion exhibiting a relatively smaller average particle size between about 1 µm and 4 µm. In one or more embodiments, the diamond particles may include a relatively larger first amount or portion that is about 50 weight % to about 95 weight % of the plurality of diamond particles and a relatively smaller second amount or portion that is about 5 weight % to about 50 weight % of the plurality of diamond particles. In some embodiments, the diamond particles may comprise three or more different average particle sizes (e.g., one relatively larger average particle size and two or more relatively smaller average particle sizes), without limitation.

It is noted that the as-sintered diamond grain size may be substantially the same as the diamond particle size used to form PCD table 102 (e.g., as disclosed herein) or may differ from the average particle size of the diamond particles prior to sintering due to a variety of different reasons, such as grain growth, diamond particles fracturing, carbon provided from another carbon source (e.g., dissolved carbon in the metal-solvent catalyst), or combinations of the foregoing. The plurality of diamond grains of PCD table 102 may exhibit a selected bimodal, tri-modal, or any grain size distribution that improves PCD performance and/or leachability. It is currently believed by the inventors that the interstitial regions of PCD table 102 may be relatively more interconnected due to the selected diamond grain size distribution, which may enable relatively faster and/or more complete leaching of a metal-solvent catalyst or metallic infiltrant from PCD table 102. Further, the selected grain size distribution and more complete leaching may enable better performance (e.g., improved wear resistance) of the resulting at least partially leached PCD table 102. In some embodiments, the bonded-together diamond grains of PCD table 102 may exhibit an average grain size of about 100 µm or less, about 40 µm or less, such as about 30 µm or less, about 25 µm or less, or about 20 µm or less. For example, the average grain size of the diamond grains may be about 10 µm to about 18 µm, about 8 µm to about 15 µm, about 9 µm to about 12 µm, or about 15 µm to about 25 µm. In some embodiments, the average grain size of the diamond grains may be about 10 µm or less, such as about 2 µm to about 5 µm or submicron.

FIGS. 2A-2D are cross-sectional side views of PCD elements according to various embodiments. As shown in FIGS. 2A-2D, PCD table 102 of PCD element 100 may have a first volume 114 adjacent substrate 108 and a second volume 116 defining working surface 104, chamfer 106, and/or a portion of peripheral surface 105.

Figure 2A:
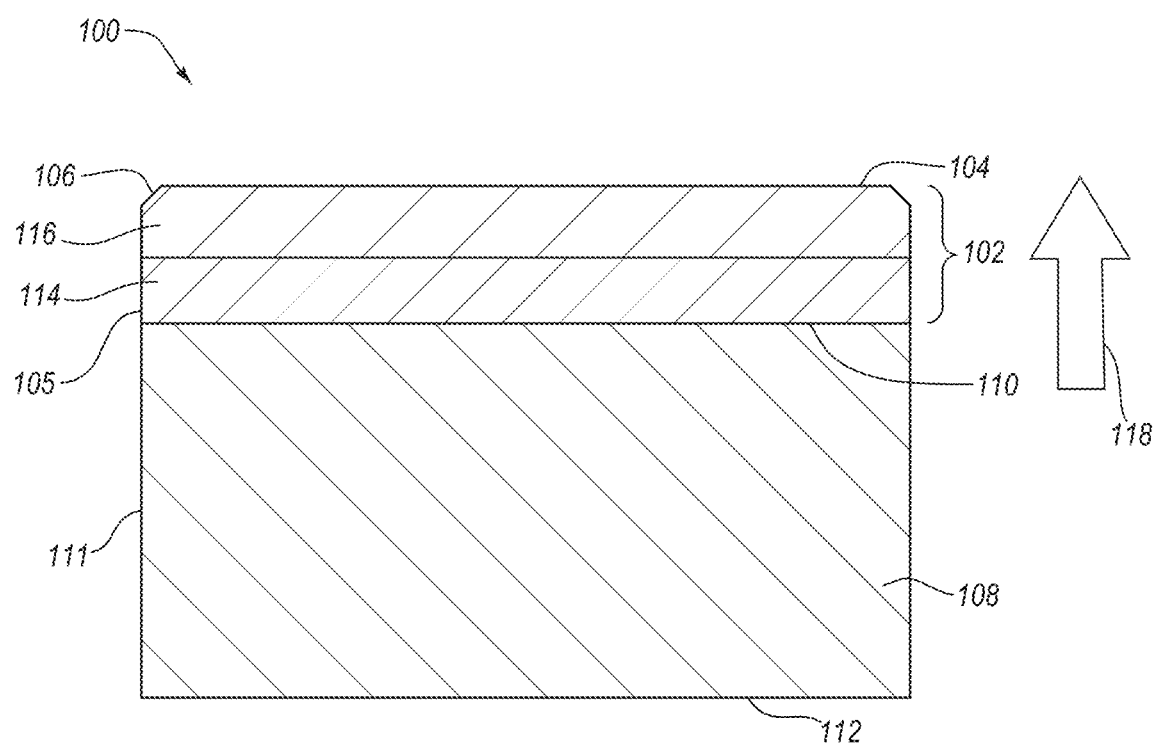
FIG. 2A is a cross-sectional side view of the exemplary PCD element illustrated in FIG. 1.

In FIG. 2A, first volume 114 and second volume 116 are illustrated as occupying layers having consistent layer thicknesses and shapes (e.g., substantially cylindrical and/or disk shapes). First volume 114 and second volume 116 may each include any suitable shape, thickness, and/or configuration, without limitation. In some embodiments, for example, an interface region or boundary between first volume 114 and substrate 108 and/or an interface region or boundary between first volume 114 and second volume 116 may be planar, concave, convex, grooved, dimpled, textured, or another selected non-planar geometry, without limitation. As shown in FIG. 2A, second volume 116 may form a portion of peripheral surface 105 extending from working surface 104 and/or chamfer 106 to an interface or boundary between first volume 114 and second volume 116, and first volume 114 may form a portion of peripheral surface 105 extending from the boundary between first volume 114 and second volume 116 to an interface or boundary between first volume 114 and substrate 108. Second volume 116 may extend along any suitable portion of peripheral surface 105, including a minority or a majority of peripheral surface 105. According to at least one embodiment, second volume 116 may extend from working surface 104 and/or chamfer 106 along a majority of peripheral surface 105. For example, second volume 116 may extend along greater than 50% of peripheral surface 105 (e.g., about 55%, about 60%, about 65%, about 70%, about 75%, about 80%, about 85%, about 90%, about 95%, about 100%).

According to at least one embodiment, first volume 114 of PCD table 102 may include an interstitial material including a group 13 (group IIIA) element (e.g., boron, aluminum, gallium, indium, and/or thallium) and second volume 116 of PCD table 102 may include the interstitial material at a different concentration than first volume 114. For example, second volume 116 of PCD table 102 may include interstitial material at a higher or lower concentration than first volume 114. In some embodiments the interstitial material may include a boride material, such as, for example, a cobalt boride material and/or a titanium boride material. In one embodiment, the interstitial material may include a boron carbide material. According to various embodiments, the concentration of the interstitial material including the group 13 element in first volume 114 may decrease along a direction from substrate 108 to second volume 116. For example, the concentration of the interstitial material including the group 13 element in first volume 114 may decrease along a direction 118, which is substantially perpendicular to working surface 104 and/or interfacial surface 110 and/or substantially parallel to peripheral surface 105, from substrate 108 to second volume 116. The concentration of the interstitial material including the group 13 element in second volume 116 may decrease along a direction from first volume 114 to working surface 104. For example, the concentration of the interstitial material including the group 13 element in second volume 116 may decrease along direction 118 from first volume 114 to working surface 104.

As will be described in greater detail below, the interstitial material including the group 13 element may be distributed in first volume 114 and/or second volume 116 during a HPHT sintering process for forming PCD table 102. In at least one embodiment, at least a portion of PCD table 102 may include an interstitial tungsten material, such as tungsten (e.g., tungsten carbide) that is swept from substrate 108 during HPHT sintering. According to at least one embodiment, at least a portion of PCD table 102 may include tungsten present in a thermally stable compound that differs from tungsten compounds in substrate 108. In some embodiments, second volume 116 may include the interstitial tungsten material at a lower concentration than first volume 114. The concentration of the interstitial tungsten material in first volume 114 may decrease along direction 118 from substrate 108 to second volume 116, and the concentration of the interstitial tungsten material in second volume 116 may decrease along direction 118 from first volume 114 to working surface 104.

In certain embodiments, PCD table 102 may include a metal material that includes one or more transition metal elements. For example, PCD table 102 may include at least one interstitial transition metal material, including at least one transition metal from groups 3-12 of the modern International Union of Pure and Applied Chemistry (IUPAC) periodic table (groups IIIB, IVB, VB, VIB, VIIB, VIIIB, IB, and/or IIB of the Chemical Abstracts Service (CAS) periodic table) (e.g., scandium, yttrium, lanthanum, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, and/or mercury). For example, PCD table 102 may include at least one group 4 (group IVB) element (e.g., titanium, zirconium, and/or hafnium), and/or group 6 (group VIB) element (e.g., chromium, molybdenum, and/or tungsten), and/or group 8, group 9, and/or group 10 (group VIII) element (e.g., iron, ruthenium, osmium, cobalt, rhodium, iridium, nickel, palladium, and/or platinum), and/or a group 11 (group IB) element (e.g., copper, silver, and/or gold). In at least one embodiment, PCD table may include an interstitial transition metal material, such as an interstitial copper, chromium, titanium, molybdenum, and/or tungsten material, in addition to or instead of an interstitial material including the group 13 (group IIIA) element (e.g., boron, aluminum, gallium, indium, and/or thallium). Second volume 116 may include the interstitial transition metal material at a different concentration than first volume 114. In some embodiments, the concentration of the interstitial transition metal material in first volume 114 may decrease along direction 118 from substrate 108 to second volume 116, and the concentration of the interstitial transition metal material in second volume 116 may decrease along direction 118 from first volume 114 to working surface 104. While concentrations of an interstitial transition metal material in PCD table 102 may generally decrease along direction 118 from substrate 108 to working surface 104, first volume 114 and/or second volume 116 of PCD table 102 may include one or more regions or pockets of increasing concentration of the interstitial transition metal material along direction 118. In at least one embodiment, concentrations of an interstitial transition metal material in at least a portion of PCD table 102 may generally increase along direction 118 from substrate 108 to working surface 104.

In some embodiments, an interstitial material in first volume 114 and/or second volume 116 of PCD table 102 may include a tungsten-cobalt compound, a titanium-cobalt compound, a cobalt-boron compound, a tungsten-cobalt-boron compound, and/or a titanium-cobalt-boron compound. For example, first volume 114 and/or second volume 116 may include a cobalt-titanium intermetallic, cobalt boride, cobalt tungsten boride, and/or khamrabaevite. In at least one embodiment, the interstitial material in first volume 114 and/or second volume 116 may include, for example, BCo, BCo$_2$, B$_2$Co$_3$, Co$_2$B, Co$_{23}$B$_6$, Co$_3$Ti, TiCo$_2$, CoW$_2$B$_2$, Co$_{21}$W$_2$B$_6$, WC, and/or TiC.

According to some embodiments, first volume 114 and second volume 116 of PCD table 102 may include different average diamond grain sizes. Examples of suitable PCD tables having separate volumes including different average diamond grain sizes, such as those disclosed in U.S. Pat. Nos. 9,316,060 and 7,753,143, the disclosure of each of which is incorporated herein, in its entirety, by this reference, may be employed according to any embodiment described herein.

Figure 2B:
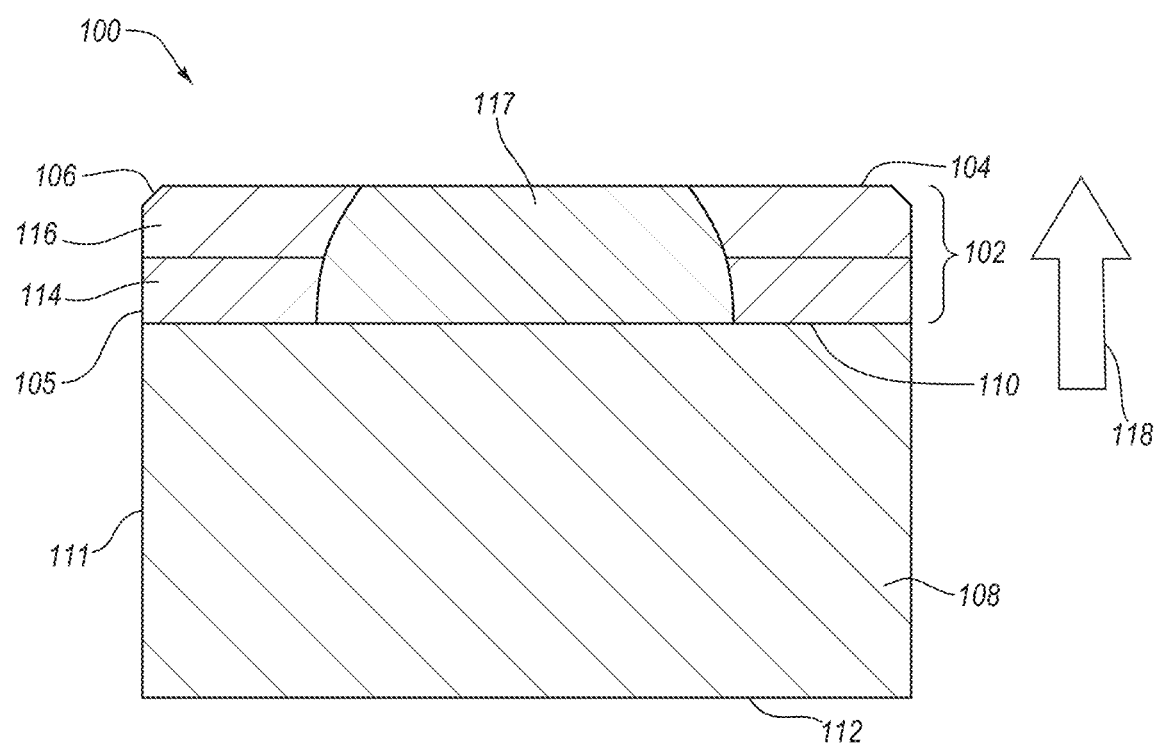
FIG. 2B is a cross-sectional side view of the exemplary PCD element according to at least one embodiment.

As shown in FIG. 2B, PCD table 102 may include a third volume 117 that is adjacent to first volume 114 and/or second volume 116. In some embodiments, third volume 117 may be located in a central region of PCD table 102 such that third volume 117 is at least partially surrounded by first volume 114 and/or second volume 116. Third volume 117 may include any suitable shape, thickness, and/or configuration, without limitation. In some embodiments, for example, an interface region or boundary between third volume 117 and first volume 114 and/or second volume 116 may have be planar, concave, convex, or another selected non-planar geometry, without limitation. For example, as shown in FIG. 2A, a boundary between third volume 117 and first volume 114 and/or second volume 116 may arcuately slope inwardly from substrate 108 to working surface 104.

In some embodiments, third volume 117 may be free or substantially free of an interstitial material that is present in first volume 114 and/or second volume 116. For example, third volume 117 may be free or substantially free of a group 13 (group IIIA) element (e.g., boron, aluminum, gallium, indium, and/or thallium) that is present in first volume 114 and/or second volume 116. In at least one embodiment, third volume 117 may be free or substantially free of an interstitial transition metal material, including a transition metal from groups 3-12 of the modern IUPAC periodic table (groups IIIB, IVB, VB, VIB, VIIB, VIIIB, IB, and/or IIB of the CAS periodic table), that is present in first volume 114 and/or second volume 116. For example, third volume 117 may be free or substantially free of a group 4 (group IVB) element (e.g., titanium, zirconium, and/or hafnium), a group 6 (group VIB) element (e.g., chromium, molybdenum, and/or tungsten), a group 8, group 9, and/or group 10 (group VIII) element (e.g., iron, ruthenium, osmium, cobalt, rhodium, iridium, nickel, palladium, and/or platinum), and/or a group 11 (group 1B) element (e.g., copper, silver, and/or gold) that is present in first volume 114 and/or second volume 116.

Figure 2C:
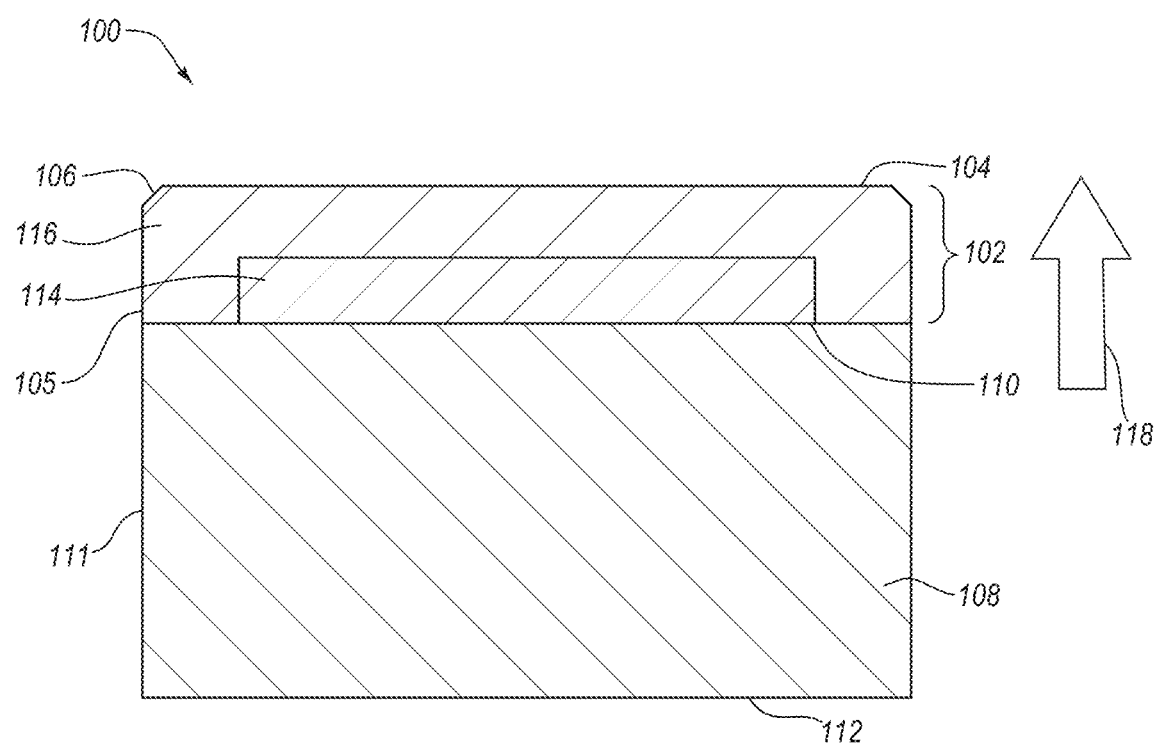
FIG. 2C is a cross-sectional side view of the exemplary PCD element according to at least one embodiment.

As shown in FIG. 2C, first volume 114 of PCD table 102 may be surrounded or at least partially surrounded by second volume 116. For example, second volume 116 may extend between substrate 108 and working surface 104 so as to at least partially surround an outer periphery of first volume 114. In some embodiments, second volume 116 may extend near to and/or adjacent to substrate 108. In at least one embodiment, second volume 116 may form a portion of peripheral surface 105 extending from working surface 104 and/or chamfer 106 to an interface or boundary between second volume 116 and substrate 108.

Figure 2D:
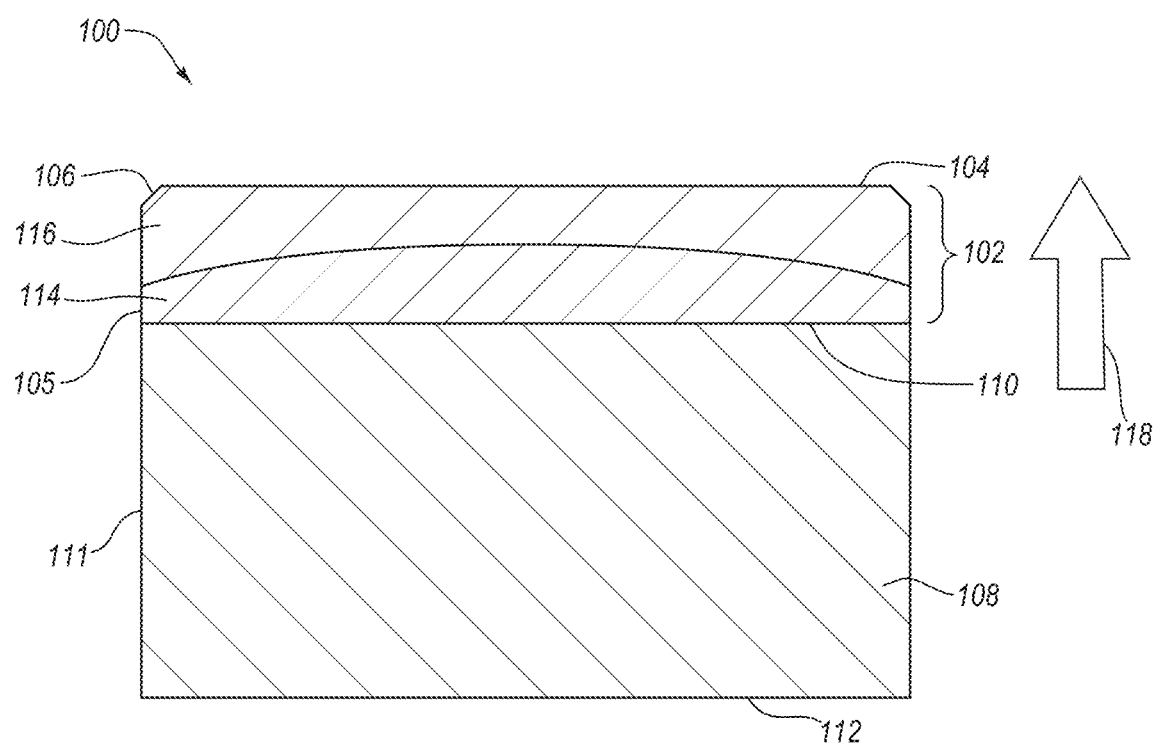
FIG. 2D is a cross-sectional side view of the exemplary PCD element according to at least one embodiment.

As shown in FIG. 2D, an interface region or boundary between first volume 114 and second volume 116 of PCD table 102 may be arcuate or generally arcuate. For example, a concave or convex boundary may extend between first volume 114 and second volume 116, intersecting peripheral surface 105 of PCD element 100. In some embodiments, second volume 116 may extend away from substrate 108 along a direction from peripheral surface 105 toward a central region of PCD table 102. In at least one embodiment, second volume 116 may form a portion of peripheral surface 105 extending from working surface 104 and/or chamfer 106 to a boundary between first volume 114 and second volume 116, and first volume 114 may form a portion of peripheral surface 105 extending from the boundary between first volume 114 and second volume 116 to a boundary between first volume 114 and substrate 108. Second volume 116 may extend along any suitable portion of peripheral surface 105, including a minority or a majority of peripheral surface 105. According to at least one embodiment, second volume 116 may extend from working surface 104 and/or chamfer 106 along a majority of peripheral surface 105. For example, second volume 116 may extend along greater than 50% of peripheral surface 105 (e.g., about 55%, about 60%, about 65%, about 70%, about 75%, about 80%, about 85%, about 90%, about 95%, about 100% of peripheral surface 105).

Figure 3A:
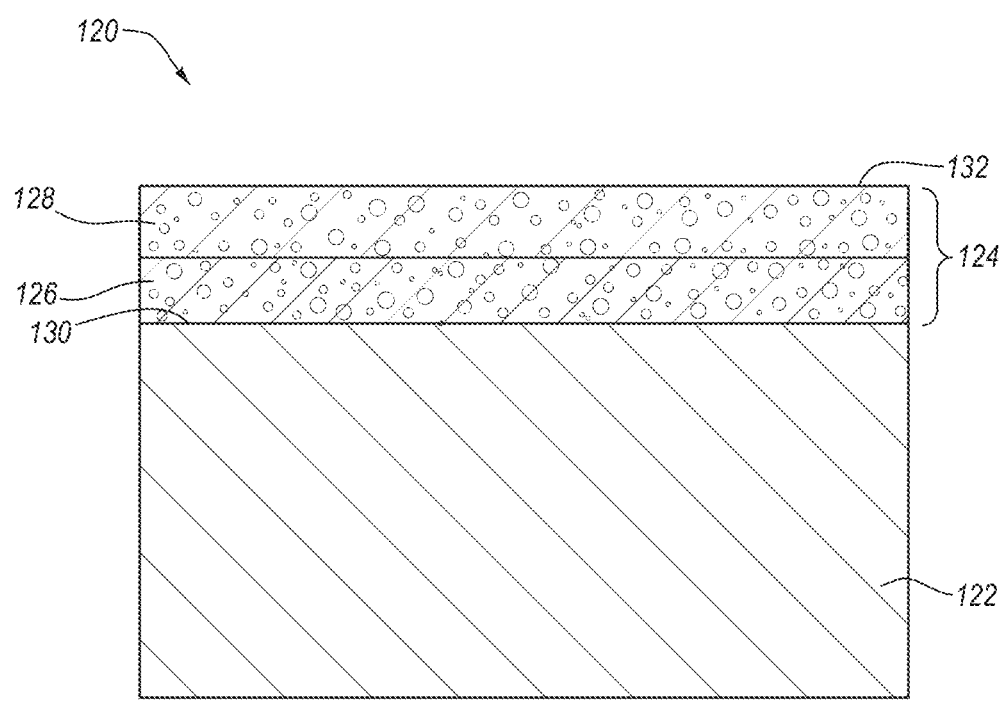
FIG. 3A is a cross-sectional side view of an exemplary PCD precursor assembly for fabricating a superabrasive element according to at least one embodiment.

FIGS. 3A-3D are cross-sectional side views of PCD precursor assemblies 120 according to various embodiments. FIG. 3A illustrates a PCD precursor assembly 120 for forming, for example, PCD element 100 shown in FIG. 2A. As shown in FIG. 3A, PCD precursor assembly 120 may include a substrate 122 and a diamond particulate volume 124 adjacent to an upper surface 130 of substrate 122. As described below, PCD precursor assembly 120 may be subjected to a sintering process, such as a HPHT sintering process, to form a PCD element (e.g., PCD element 100 including PCD table 102 bonded to substrate 108 as illustrated in FIGS. 1 and 2).

Diamond particulate volume 124 may include a first volume 126 adjacent to substrate 122 and a second volume 128 adjacent to first volume 126 such that first volume 126 is disposed between second volume 128 and substrate 122. Second volume 128 may form an upper surface 132 that is disposed away from first volume 126. In at least one embodiment, first volume 126 may include a mixture of diamond particles and one or more other materials. For example, first volume 126 may include at least one group 13 element (e.g., boron, aluminum, gallium, indium, and/or thallium), and/or group 4 (group IVB) element (e.g., titanium, zirconium, and/or hafnium), and/or group 6 (group VIB) element (e.g., chromium, molybdenum, and/or tungsten), and/or group 8, group 9, and/or group 10 (group VIII) element (e.g., iron, ruthenium, osmium, cobalt, rhodium, iridium, nickel, palladium, and/or platinum), and/or group 11 (group IB) element (e.g., copper, silver, and/or gold). In some embodiments, first volume 126 may include a boron and/or titanium material mixed with the diamond particles. The boron and/or titanium material may include, for example, a boride compound, such as a cobalt boride, titanium boride, and/or any other suitable boride compound. Additional examples of suitable boride materials may include, without limitation, zirconium boride, aluminum boride, hafnium boride, vanadium boride, boron carbide, niobium boride, tantalum boride, chromium boride, molybdenum boride, tungsten boride, iron boride, cobalt boride, and/or nickel boride compounds. In some embodiments, first volume 126 may include a boron material including a boron carbide compound mixed with the diamond particles. In some embodiments, first volume 126 may include phosphorous and/or sulfur and/or one or more compounds including phosphorous and/or sulfur.

First volume 126 may include the boron and/or titanium compound, and/or any other materials or compounds disclosed herein, at any suitable concentration prior to sintering, such as a concentration of approximately 20% or less by weight. In at least one embodiment, first volume 126 may include the boron and/or titanium compound at a concentration of approximately 10% or less by weight (e.g., approximately 0.05% to approximately 10% by weight, approximately 0.1% to approximately 8% by weight, approximately 0.5% to approximately 5% by weight, approximately 1% to approximately 3% by weight, approximately 1.5% to approximately 2.5% by weight, or approximately 2% by weight).

In at least one embodiment, second volume 128 may be free or substantially free of, and/or may include a lower concentration of, one or more of the materials and/or compounds present in first volume 126. For example, second volume 128 may be free or substantially free of, and/or may include a lower concentration of, at least one group 13 element (e.g., boron, aluminum, gallium, indium, and/or thallium), and/or group 4 (group IVB) element (e.g., titanium, zirconium, and/or hafnium), and/or group 6 (group VIB) element (e.g., chromium, molybdenum, and/or tungsten), and/or group 8, group 9, and/or group 10 (group VIII) element (e.g., iron, ruthenium, osmium, cobalt, rhodium, iridium, nickel, palladium, and/or platinum), and/or group 11 (group IB) element (e.g., copper, silver, and/or gold), and/or group 13 element (e.g., boron, aluminum, gallium, indium, and/or thallium), and/or sulfur and/or phosphorous. In some embodiments, second volume 128 may be free or substantially free of boron and/or titanium, and/or any other materials or compounds disclosed herein, prior to sintering. For example, second volume 128 may include a volume of virgin diamond (i.e., green diamond) particles that does not include boron and/or titanium. In some embodiments, second volume 128 may include boron and/or titanium, and/or any other materials or compounds disclosed herein, at a lower concentration than first volume 126 prior to sintering.

In some embodiments, diamond particulate volume 124 may include one or more additional volumes, or layers, in addition to first volume 126 and second volume 128. In some embodiments, such additional volumes may be substantially free of boron and/or titanium prior to leaching and/or may include boron and/or titanium at any suitable concentration, such as a concentration that differs from first volume 126 and second volume 128. Although first volume 126 and second volume 128 are illustrated as occupying layers having consistent layer thicknesses and shapes (e.g., substantially cylindrical and/or disk shapes), first volume 126 and second volume 128 may each include any suitable shape, thickness, and/or configuration, without limitation. In some embodiments, for example, an interface between first volume 126 and substrate 122 and/or an interface between first volume 126 and second volume 128 may be planar, concave, convex, grooved, dimpled, textured, or another selected non-planar geometry, without limitation.

In some embodiments, first volume 126 may include a material that includes one or more transition metal elements. For example, first volume 126 may include a transition metal material including a group 4 (group IVB) element (e.g., titanium, zirconium, and/or hafnium), and/or a group 6 (group VIB) element (e.g., chromium, molybdenum, and/or tungsten), and/or a group 8, group 9, and/or group 10 (group VIII) element (e.g., iron, ruthenium, osmium, cobalt, rhodium, iridium, nickel, palladium, and/or platinum), and/or a group 11 (group IB) element (e.g., copper, silver, and/or gold). In some embodiments, first volume 126 may include a copper, chromium, molybdenum, and/or tungsten material, in addition to or instead of a group 13 (group IIIA) element (e.g., boron, aluminum, gallium, indium, and/or thallium) and/or a group 4 (group IVB) element (e.g., titanium, zirconium, and/or hafnium). For example, first volume 126 may include copper and/or tungsten at any suitable concentration prior to sintering, such as a concentration of approximately 30% or less by weight. In at least one embodiment, first volume 126 may include copper and/or tungsten at a concentration of approximately 20% or less by weight (e.g., approximately 1% to approximately 20% by weight, approximately 5% to approximately 15% by weight, approximately 7% to approximately 13% by weight, approximately 8% to approximately 12% by weight, approximately 9% to approximately 11% by weight, or approximately 10% by weight).

First volume 126 may include chromium (e.g., a chromium compound) and/or molybdenum (e.g., a molybdenum compound) at any suitable concentration prior to sintering, such as a concentration of approximately 30% or less by weight. In at least one embodiment, first volume 126 may include chromium and/or molybdenum at a concentration of approximately 20% or less by weight (e.g., approximately 1% to approximately 20% by weight, approximately 2% to approximately 15% by weight, approximately 5% to approximately 10% by weight, approximately 6% to approximately 9% by weight, approximately 7% to approximately 8% by weight, or approximately 7.5% by weight).

Second volume 128 may be free or substantially free of a copper, chromium, molybdenum, and/or tungsten material, and/or any other materials or compounds disclosed herein, prior to sintering. For example, second volume 128 may include a volume of virgin diamond particles that does not include a copper, chromium, molybdenum, and/or tungsten. In some embodiments, second volume 128 may include a copper, chromium, molybdenum, and/or tungsten at a lower concentration than first volume 126 prior to sintering.

In some embodiments, first volume 126 may be free or substantially free of, and/or may include a lower concentration of, one or more of materials and/or compounds present in second volume 128. For example, first volume 126 may include a volume of virgin diamond (i.e., green diamond) particles that does not include boron and/or titanium. According to at least one embodiment, first volume 126 may include boron and/or titanium, and/or any other materials or compounds disclosed herein, at a lower concentration than second volume 128 prior to sintering. For example, second volume 128 may include a mixture of diamond particles and one or more other materials at a higher concentration (e.g., any of the concentrations discussed above in reference to first volume 126) than first volume 126, including at least one group 13 element (e.g., boron, aluminum, gallium, indium, and/or thallium), and/or group 4 (group IVB) element (e.g., titanium, zirconium, and/or hafnium), and/or group 6 (group VIB) element (e.g., chromium, molybdenum, and/or tungsten), and/or group 8, group 9, and/or group 10 (group VIII) element (e.g., iron, ruthenium, osmium, cobalt, rhodium, iridium, nickel, palladium, and/or platinum), and/or group 11 (group IB) element (e.g., copper, silver, and/or gold).

In some embodiments, a catalyst (e.g., any of the metal-solvent catalysts and/or carbonate catalysts disclosed herein) may be provided in particulate form mixed with diamond particles in first volume 126 and/or second volume 128, as a thin foil or plate placed adjacent to first volume 126 and/or second volume 128, from a cemented carbide substrate 122 including a metal-solvent catalyst (e.g., iron, nickel, cobalt, or alloys thereof), or combinations of the foregoing.

Figure 3B:
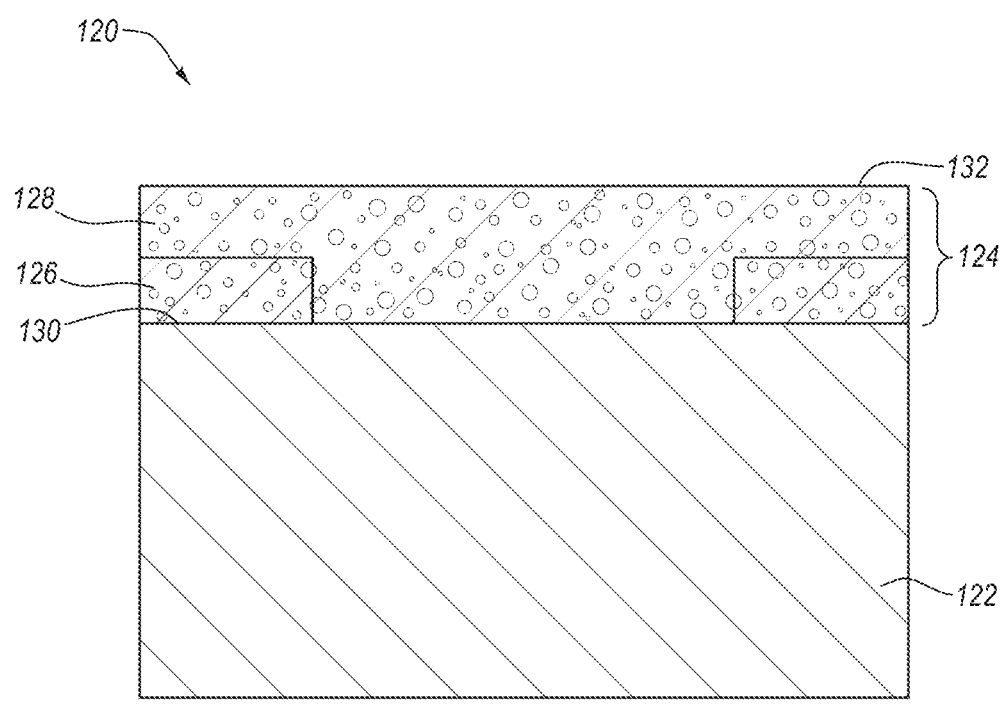
FIG. 3B is a cross-sectional side view of an exemplary PCD precursor assembly for fabricating a superabrasive element according to at least one embodiment.

FIG. 3B illustrates a PCD precursor assembly 120 for forming, for example, PCD element 100 shown in FIG. 2B. As shown in FIG. 3B, diamond particulate volume 124 may include a first volume 126 adjacent to a peripheral portion of upper surface 130 of substrate 122 and a second volume 128 adjacent to first volume 126 and an inner portion of upper surface 130 of substrate 122. In some embodiments, as shown in FIG. 3B, first volume 126 may peripherally surround at least a portion of second volume 128, such as a portion of second volume 128 disposed adjacent to substrate 122. At least a portion of first volume 126, including a peripheral portion of first volume 126, may be disposed between second volume 128 and substrate 122. Second volume 128 may form an upper surface 132 that is disposed away from first volume 126 and substrate 122.

During sintering, as described in greater detail below, it is currently believed that the direction of sweep (e.g., direction 134 shown in FIG. 5 and/or direction 118 shown in FIG. 2B) dominates where one or more materials present in first volume 126 go, and/or where one or more materials formed from reaction the materials present in first volume 126 go. Accordingly, materials present in first volume 126 shown in FIG. 3B, such as boron, copper, chromium, cobalt, titanium, and/or molybdenum materials, and/or other materials disclosed herein, may be swept generally in the direction of sweep from first volume 126 to a portion of second volume 128 adjacent to first volume 126 to form second volume 116, which includes such materials, and third volume 117, which is free or substantially free of such materials, as shown in FIG. 2B. In some embodiments, one or more materials may be soluble in cobalt. In at least one embodiment, one or more materials present in, for example, first volume 126 and/or second volume 128 may affect the solubility of one or more other materials in first volume 126 and/or second volume 128. For example, the addition of one or more materials may change (i.e., increase or decrease) the solubility of tungsten in cobalt.

Figure 3C:
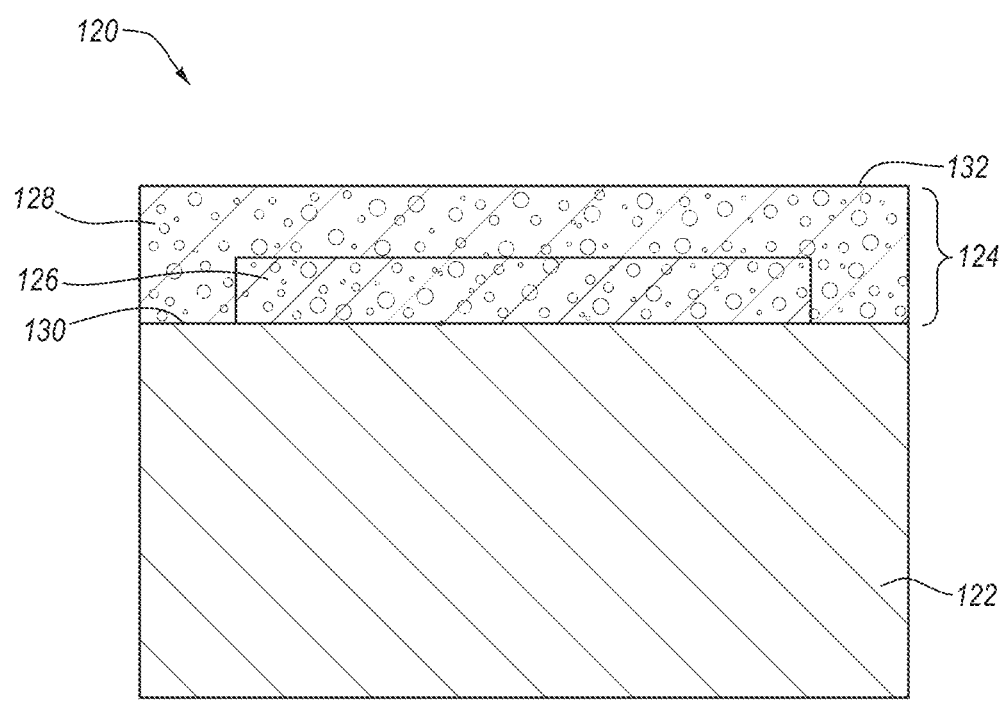
FIG. 3C is a cross-sectional side view of an exemplary PCD precursor assembly for fabricating a superabrasive element according to at least one embodiment.

FIG. 3C illustrates a PCD precursor assembly 120 for forming, for example, PCD element 100 shown in FIG. 2C. As shown in FIG. 3C, diamond particulate volume 124 may include a first volume 126 adjacent to an inner portion of upper surface 130 of substrate 122 and a second volume 128 adjacent to first volume 126 and a peripheral portion of upper surface 130 of substrate 122. In some embodiments, as shown in FIG. 3C, second volume 128 may peripherally surround at least a portion of first volume 126, such as a portion of first volume 126 disposed adjacent to substrate 122. At least a portion of first volume 126 may be disposed between second volume 128 and substrate 122. Second volume 128 may form an upper surface 132 that is disposed away from first volume 126 and substrate 122.

Figure 3D:
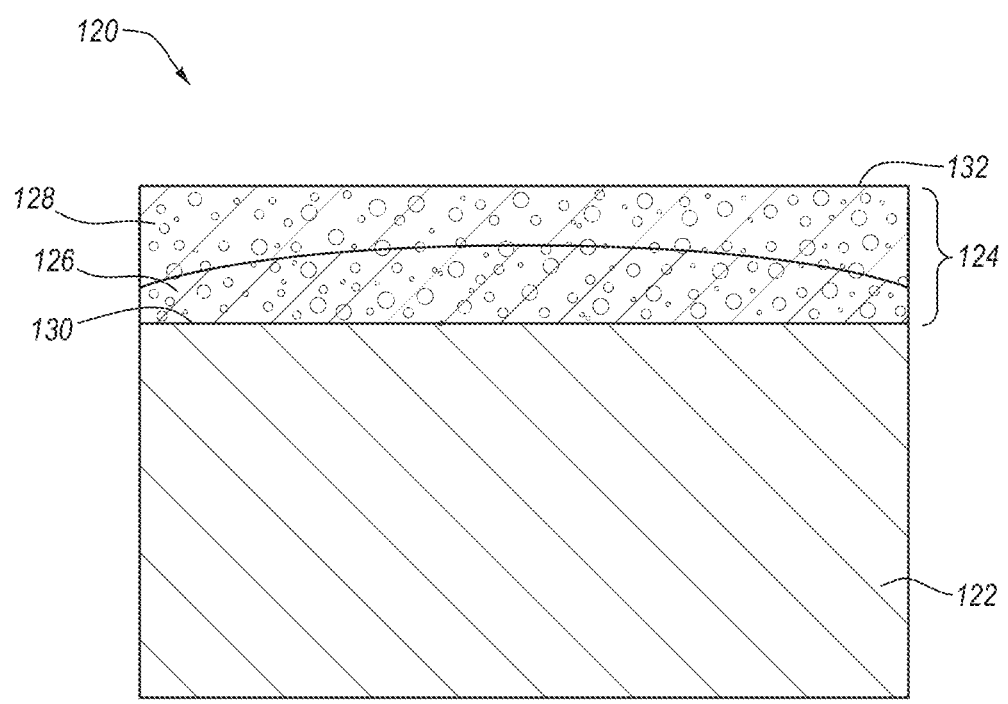
FIG. 3D is a cross-sectional side view of an exemplary PCD precursor assembly for fabricating a superabrasive element according to at least one embodiment.

FIG. 3D illustrates a PCD precursor assembly 120 for forming, for example, PCD element 100 shown in FIG. 2D. As shown in FIG. 3D, diamond particulate volume 124 may include a first volume 126 adjacent to upper surface 130 of substrate 122 and a second volume 128 adjacent to first volume 126. An interface region or boundary between first volume 126 and second volume 128 may be arcuate or substantially arcuate. For example, a concave or convex boundary may extend between first volume 126 and second volume 128. In some embodiments, second volume 128 may extend away from substrate 122 along a direction from a periphery of particulate volume 124 toward a central region of particulate volume 124. In some embodiments, as shown in FIG. 3D, at least a portion of first volume 126 may be disposed between second volume 128 and substrate 122. Second volume 128 may form an upper surface 132 that is disposed away from first volume 126 and substrate 122.

Figure 3E:
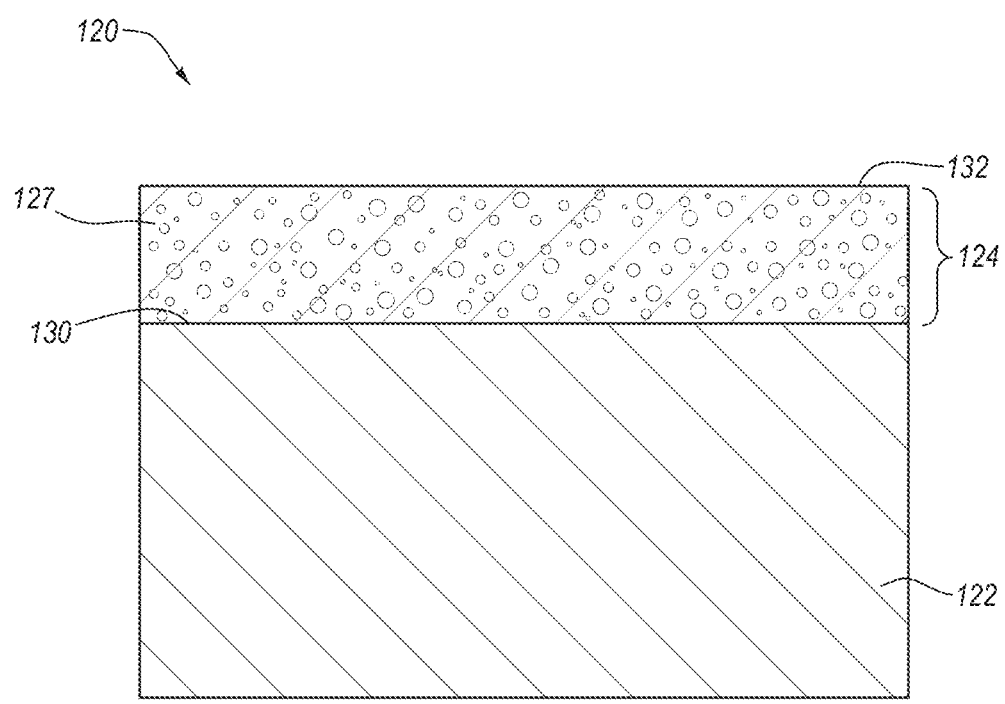
FIG. 3E is a cross-sectional side view of an exemplary PCD precursor assembly for fabricating a superabrasive element according to at least one embodiment.

FIG. 3E illustrates a PCD precursor assembly 120 for forming, for example, PCD element 100 shown in FIG. 1. As shown in FIG. 3E, diamond particulate volume 127 may be a monolithic diamond particulate volume disposed adjacent to upper surface 130 of substrate 122. In at least one embodiment, diamond particulate volume 127 may include a mixture of diamond particles and one or more other materials. For example, diamond particulate volume 127 may include at least one group 13 element (e.g., boron, aluminum, gallium, indium, and/or thallium), and/or group 4 (group IVB) element (e.g., titanium, zirconium, and/or hafnium), and/or group 6 (group VIB) element (e.g., chromium, molybdenum, and/or tungsten), and/or group 8, group 9, and/or group 10 (group VIII) element (e.g., iron, ruthenium, osmium, cobalt, rhodium, iridium, nickel, palladium, and/or platinum), and/or group 11 (group IB) element (e.g., copper, silver, and/or gold). In some embodiments, diamond particulate volume 127 may include boron and/or titanium mixed with the diamond particles. For example, a boride compound, such as a cobalt boride, titanium boride, and/or any other suitable boride compound may be mixed with the diamond particles. Additional examples of suitable boride materials may include, without limitation, zirconium boride, aluminum boride, hafnium boride, vanadium boride, boron carbide, niobium boride, tantalum boride, chromium boride, molybdenum boride, tungsten boride, iron boride, cobalt boride, and/or nickel boride compounds. In some embodiments, diamond particulate volume 127 may include a boron material including a boron carbide compound mixed with the diamond particles. In some embodiments, diamond particulate volume 127 may include phosphorous and/or sulfur and/or one or more compounds including phosphorous and/or sulfur.

Diamond particulate volume 127 may include a boron and/or a titanium compound, and/or any other materials or compounds disclosed herein, at any suitable concentration prior to sintering, such as a concentration of approximately 20% or less by weight. In at least one embodiment, diamond particulate volume 127 may include the boron and/or titanium compound at a concentration of approximately 10% or less by weight (e.g., approximately 0.05% to approximately 10% by weight, approximately 0.1% to approximately 8% by weight, approximately 0.5% to approximately 5% by weight, approximately 1% to approximately 3% by weight, approximately 1.5% to approximately 2.5% by weight, or approximately 2% by weight).

In some embodiments, diamond particulate volume 127 may include one or more transition metal elements. For example, diamond particulate volume 127 may include a transition metal including a group 4 (group IVB) element (e.g., titanium, zirconium, and/or hafnium), and/or a group 6 (group VIB) element (e.g., chromium, molybdenum, and/or tungsten), and/or a group 8, group 9, and/or group 10 (group VIII) element (e.g., iron, ruthenium, osmium, cobalt, rhodium, iridium, nickel, palladium, and/or platinum), and/or a group 11 (group IB) element (e.g., copper, silver, and/or gold). In some embodiments, diamond particulate volume 127 may include copper, chromium, molybdenum, and/or tungsten, in addition to or instead of a group 13 (group IIIA) element (e.g., boron, aluminum, gallium, indium, and/or thallium) and/or a group 4 (group IVB) element (e.g., titanium, zirconium, and/or hafnium). For example, diamond particulate volume 127 may include a copper and/or tungsten compound at any suitable concentration prior to sintering, such as a concentration of approximately 30% or less by weight. In at least one embodiment, diamond particulate volume 127 may include the copper and/or tungsten compound at a concentration of approximately 20% or less by weight (e.g., approximately 1% to approximately 20% by weight, approximately 5% to approximately 15% by weight, approximately 7% to approximately 13% by weight, approximately 8% to approximately 12% by weight, approximately 9% to approximately 11% by weight, or approximately 10% by weight).

Diamond particulate volume 127 may include chromium and/or molybdenum at any suitable concentration prior to sintering, such as a concentration of approximately 30% or less by weight. In at least one embodiment, diamond particulate volume 127 may include the chromium compound and/or a molybdenum compound at a concentration of approximately 20% or less by weight (e.g., approximately 1% to approximately 20% by weight, approximately 2% to approximately 15% by weight, approximately 5% to approximately 10% by weight, approximately 6% to approximately 9% by weight, approximately 7% to approximately 8% by weight, or approximately 7.5% by weight).

In some embodiments, a catalyst (e.g., any of the metal-solvent catalysts and/or carbonate catalysts disclosed herein) may be provided in particulate form mixed with diamond particles in diamond particulate volume 127, as a thin foil or plate placed adjacent to diamond particulate volume 127, from a cemented carbide substrate 122 including a metal-solvent catalyst (e.g., iron, nickel, cobalt, or alloys thereof), or combinations of the foregoing.

Figure 4:
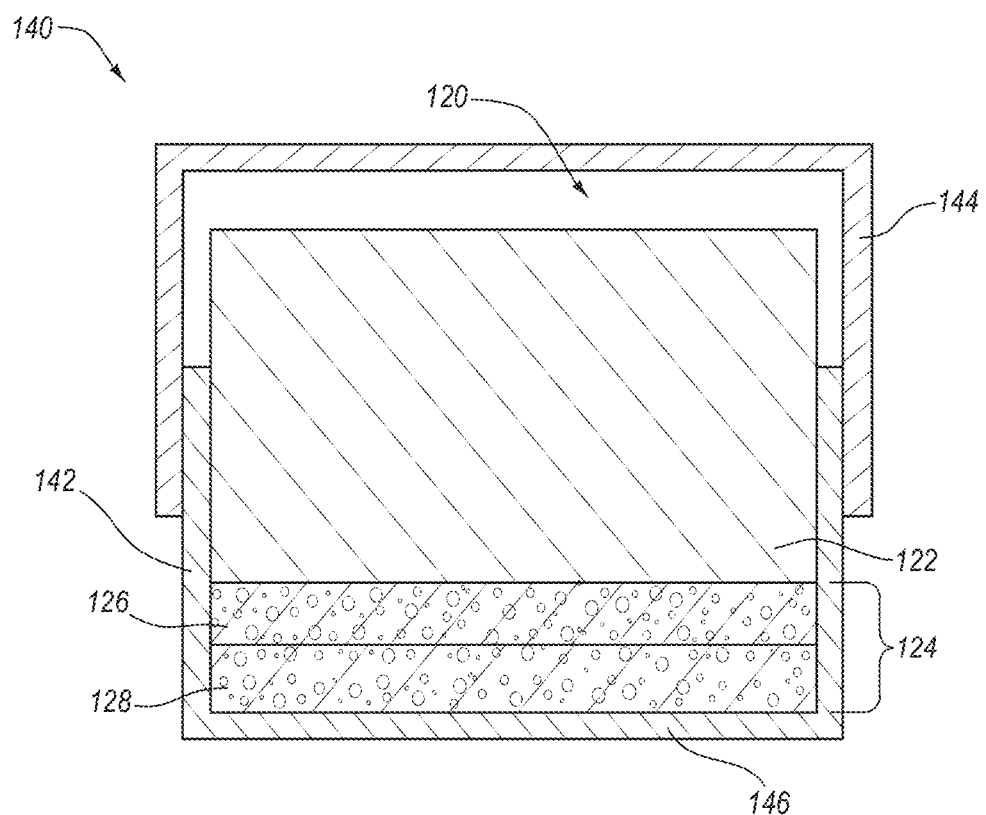
FIG. 4 is a cross-sectional side view of an exemplary PCD sintering assembly for fabricating a superabrasive element according to at least one embodiment.

FIG. 4 is a cross-sectional view of a PCD sintering assembly 140, or cell assembly, according to at least one embodiment. Diamond particulate volume 124 and substrate 122 may be placed in a pressure transmitting medium to form PDC precursor assembly 120. For example, the pressure transmitting medium may include a refractory metal can, graphite structure, pyrophyllite, other pressure transmitting structures, or combinations thereof. Examples of suitable gasket materials and cell structures for use in manufacturing PCD according to any embodiment described herein are disclosed in U.S. Pat. Nos. 6,338,754 and 8,236,074, each of which is incorporated herein, in its entirety, by this reference. Another example of a suitable pressure transmitting material is pyrophyllite, which is commercially available from Wonderstone Ltd. of South Africa.

As shown in FIG. 4, PCD sintering assembly 140 may include substrate 122 and diamond particulate volume 124 disposed within a pressure transmitting medium that includes an inner sintering can 142 and an outer sintering can 144. PCD sintering assembly 140 may be loaded into a sintering apparatus and subjected to a sintering process, such as a HPHT sintering process, to form a PCD element (e.g., PCD element 100 including PCD table 102 bonded to substrate 108 as illustrated in FIGS. 1 and 2).

As shown in FIG. 4, a PCD precursor assembly, such as PCD precursor assembly 120 illustrated in FIG. 3A, may be disposed within inner sintering can 142 such that second volume 128 of diamond particulate volume 124 is disposed adjacent to bottom wall 146 of inner sintering can 142. According to at least one embodiment, second volume 128 may first be loaded into inner sintering can 142. First volume 126 may then be loaded into inner sintering can 142 adjacent to second volume 128 such that second volume 128 is disposed between first volume 126 and bottom wall 146 of inner sintering can 142. Substrate 122 may then be positioned in inner sintering can 142 so that first volume 126 and second volume 128 of diamond particulate volume 124 are disposed between substrate 122 and bottom wall 146 of inner sintering can 142.

First volume 126 and second volume 128 of diamond particulate volume 124 may substantially conform to the inner shape of inner sintering can 142. Substrate 122 may be configured to closely fit within inner sintering can 142 so that diamond particulate volume 124 is generally held in place during sintering and so that portions of diamond particulate volume 124 are limited or prevented from migrating between substrate 122 and inner sintering can 142 during sintering. Inner sintering can 142 may have an inner surface facing diamond particulate volume 124 and substrate 122 that has a generally cylindrical shape or any other selected shape or configuration, without limitation.

Inner sintering can 142 and at least a portion of substrate 122 and/or diamond particulate volume 124 may then be loaded into outer sintering can 144 so that substrate 122 and diamond particulate volume 124 are substantially or completely surrounded by the combination of inner sintering can 142 and outer sintering can 144. An inner surface of outer sintering can 144 may closely conform to an outer surface of inner sintering can 142. Inner sintering can 142 and outer sintering can 144 may comprise any suitable material or alloy for enclosing substrate 122 and diamond particulate volume 124 and transmitting pressure and heat during sintering. For example, inner sintering can 142 and/or outer sintering can 144 may comprise, without limitation, a refractory material such as tantalum, niobium, molybdenum, tungsten, rhenium, chromium, vanadium, hafnium, and/or zirconium, and/or one or more oxides, carbides, carbon allotropes (e.g., graphite), phyllosilicate minerals (e.g., pyrophyllite), composites, and/or combinations of the foregoing. Although PCD sintering assembly 140 is illustrated in FIG. 4 as including an inner sintering can 142 and an outer sintering can 144, any other suitable can structure or other sintering enclosure may be utilized to enclose substrate 122 and diamond particulate volume 124. Examples of suitable can assemblies, and/or methods of sealing and/or cleaning thereof, which may be employed according to any embodiment described herein are disclosed in U.S. Pat. Nos. 8,236,074 and 7,845,438, the disclosure of each of which is incorporated herein, in its entirety, by this reference.

At least one PCD sintering assembly 140 may be loaded into an HPHT sintering apparatus and subjected to HPHT conditions to form PCD element 100 through sintering. The mass of diamond particles in diamond particulate volume 124 and substrate 122 may be subjected to an HPHT process effective to bond the diamond particles together via diamond-to-diamond bonding to form PCD table 102 and bond PCD table 102 so formed to interfacial surface 110 of substrate 108 (see, e.g., FIGS. 1-2D). If a catalyst is provided (e.g., metal-solvent or carbonate catalyst), the catalyst may liquefy and infiltrate the mass of diamond particles in particulate volume 124 to promote nucleation growth between adjacent diamond particles. Any infiltrated catalyst present in PCD table 102 may be interstitially disposed between bonded diamond grains of PCD table 102. In an embodiment, the infiltrated catalyst from substrate 108 may form a strong bond between PCD table 102 and substrate 108 by infiltrating the interstitial regions of PCD table 102. For example, if substrate 108 is a cobalt-cemented tungsten carbide substrate, cobalt from substrate 108 may be liquefied and infiltrate the mass of diamond particles in diamond particulate volume 124 to catalyze formation of PCD table 102 and bond PCD table 102 to substrate 108 upon cooling.

The HPHT process may use an ultra-high pressure press at a temperature of at least about 1000° C. (e.g., about 1100° C. to about 2200° C., or about 1200° C. to about 1450° C., about 1400° C., or at least about 1400° C.) and a pressure in the pressure transmitting medium of at least about 5 GPa (e.g., about 5.0 GPa to about 6.5 GPa, about 7.5 GPa to about 15 GPa, at least about 7.5 GPa, at least about 9.0 GPa, at least about 10.0 GPa, at least about 11.0 GPa, at least about 12.0 GPa, at least about 14.0, or about 7.5 GPa to about 9.0 GPa). The HPHT process may have a duration and HPHT conditions sufficient to sinter the mass of diamond particles in diamond particulate volume 124 together in the presence of any of the catalyst materials disclosed herein to form PCD table 102 that bonds to substrate 108, as shown in FIGS. 1 and 2. PCD table 102 includes bonded diamond grains exhibiting diamond-to-diamond bonding therebetween and defining interstitial regions occupied by the catalyst. Examples of suitable HPHT sintering processes conditions that may be used to practice any of the embodiments disclosed herein are disclosed in U.S. Pat. No. 7,866,418, which is incorporated herein, in its entirety, by this reference.

It should be noted that the pressure values employed in the HPHT process disclosed herein refer to the pressure in the pressure transmitting medium (i.e., cell pressure) at room temperature (e.g., about 25° C.) with application of pressure using an ultra-high pressure press and not the pressure applied to exterior of the cell assembly. In some embodiments, the actual pressure in the pressure transmitting medium at sintering temperatures may be slightly higher than the pressure in the pressure transmitting medium at room temperature.

Figure 5:
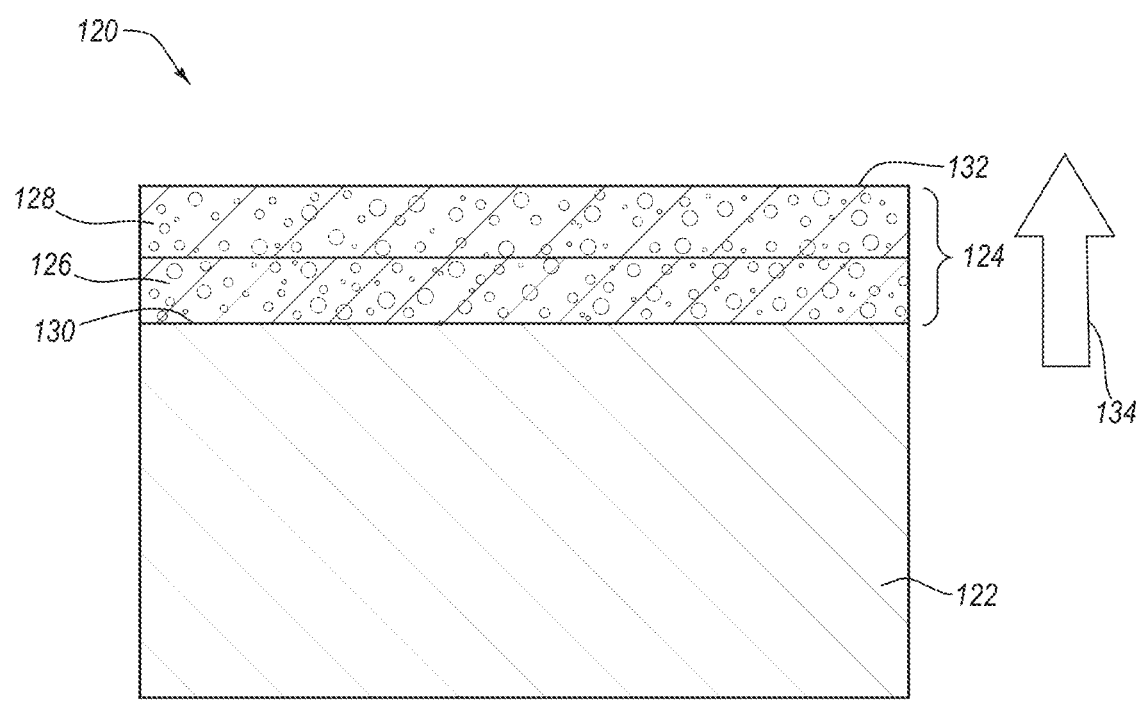
FIG. 5 is a cross-sectional side view of the exemplary PCD precursor assembly shown in FIG. 3A.

FIG. 5 is a cross-sectional view of PCD precursor assembly 120 according to at least one embodiment. In some embodiments, during HPHT sintering, one or more materials mixed with the diamond grains in diamond particulate volume 124 may be swept or transferred from first volume 126 to second volume 128. For example, the one or more materials may be swept or transferred generally in direction 134 from first volume 126 to second volume 128. In at least one embodiment, one or more materials including at least one group 4 (group IVB) element (e.g., titanium, zirconium, and/or hafnium), and/or group 6 (group VIB) element (e.g., chromium, molybdenum, and/or tungsten), and/or group 8, group 9, and/or group 10 (group VIII) element (e.g., iron, ruthenium, osmium, cobalt, rhodium, iridium, nickel, palladium, and/or platinum), and/or a group 11 (group IB)

element (e.g., copper, silver, and/or gold) may be swept or transferred generally in direction 134 from first volume 126 to second volume 128. In some embodiments, materials, such as borides, carbides, copper, chromium, titanium, molybdenum, tungsten, and/or other materials disclosed herein in first volume 126, may liquefy and infiltrate the mass of diamond particles in second volume 128 during HPHT sintering. In at least one embodiment, the one or more materials in first volume 126 may additionally or alternatively be dissolved in another liquefied material, such as a metal-solvent catalyst (e.g., cobalt, iron, and/or nickel) and carried to second volume 128. Accordingly, second volume 128 or at least a portion of second volume 128, which may be initially substantially free of a boron, copper, chromium, titanium, molybdenum, and/or tungsten material, and/or other materials disclosed herein, may be infiltrated between diamond grains with a boron, copper chromium, titanium, molybdenum, and/or tungsten material, and/or other materials disclosed herein during HPHT sintering.

In various embodiments, a tungsten material, such as tungsten from substrate 122 (e.g., tungsten from a tungsten carbide substrate), may be transferred or carried from substrate 122 to first volume 126 and/or second volume 128 by one or more other dissolved and/or liquefied materials, such as a boron, copper, chromium, cobalt, titanium, and/or molybdenum material, and/or other materials, and/or a metal-solvent catalyst. In at least one embodiment, the solubility of a tungsten compound in a metal-solvent catalyst (e.g., cobalt, nickel, iron, or alloys thereof) may be affected due to the presence of one or more of the boron, copper, chromium, titanium, and/or molybdenum material, and/or other materials, disclosed herein such that, for example, the concentration of tungsten material is greater in first volume 126 and/or second volume 128.

In some embodiments, one or more transition metal materials, such as one or more of the boron, copper, chromium, titanium, and/or molybdenum materials, and/or other materials disclosed herein, may react with a catalyst, such as a metal-solvent catalyst, used in the formation of PCD during sintering. For example, cobalt from substrate 122 (e.g., cobalt from a cobalt-cemented tungsten carbide substrate) and/or cobalt mixed with diamond grains in first volume 126 and/or second volume 128, may react with boron, copper, chromium, titanium, and/or molybdenum, and/or other materials disclosed herein in first volume 126 to form one or more cobalt materials. Boron from, for example, a boron material (e.g., titanium boride, boron carbide, etc.) may react with cobalt to form a cobalt boride and/or a cobalt-metal (e.g., cobalt alloy and/or cobalt mixture) compound in first volume 126 and/or second volume 128. In at least one embodiment, one or more sulfides and/or phosphides may be formed in first volume 126 and/or second volume 128 from phosphorous and/or sulfur present in first volume 126 and/or second volume 128 during sintering.

Following HPHT sintering, first volume 114 and/or second volume 116 of the sintered PCD table 102 of PCD element 100, as shown in FIGS. 2A-2D, may each include interstitial boron, copper, chromium, titanium, tungsten, and/or molybdenum materials, and/or other materials disclosed herein. In some embodiments, a concentration of interstitial boron, copper, chromium, titanium, tungsten, and/or molybdenum materials, and/or other materials disclosed herein in first volume 114 may differ from a concentration of the boron, copper, chromium, titanium, tungsten, and/or molybdenum materials, and/or other materials disclosed herein in second volume 116, respectively. Additionally, first volume 114 and second volume 116 of PCD table 102 may include tungsten and/or cobalt boride materials at varying concentrations. The concentration of one or more interstitial materials in at least a portion of first volume 114 and/or second volume 116 may decrease along direction 118 shown in FIGS. 2A-2D. In at least one embodiment, a concentration of one or more interstitial materials may vary (e.g., increase or decrease) along direction 118. In one embodiment, a concentration of the one or more interstitial materials in at least a portion of second volume 116 may be greater than a concentration of the one or more interstitial materials in at least a portion of first volume 114.

According to at least one embodiment, PCD elements 100 that are formed according to the disclosed methods from a first volume 126 of diamond grains that includes one or more of boron, copper, chromium, titanium, tungsten, and/or molybdenum materials, and/or other materials disclosed herein and a second volume 128 of diamond grains that is free or substantially free of boron, copper, chromium, titanium, tungsten, and/or molybdenum materials, and/or other materials disclosed herein materials, or that includes a lower concentration of boron, copper, chromium, titanium, tungsten, and/or molybdenum materials, and/or other materials disclosed herein, may exhibit superior characteristics in comparison to PCD elements formed using conventional techniques. For example, PCD elements 100 formed according to the disclosed methods may exhibit increased thermal stability, improved leaching characteristics, improved durability and/or wear resistance, increased electrical conductivity, decreased magnetic coercivity, decreased magnetic saturation, and/or increased resistance to spalling and/or cracking in comparison to conventional PCD elements.

Figure 6A:
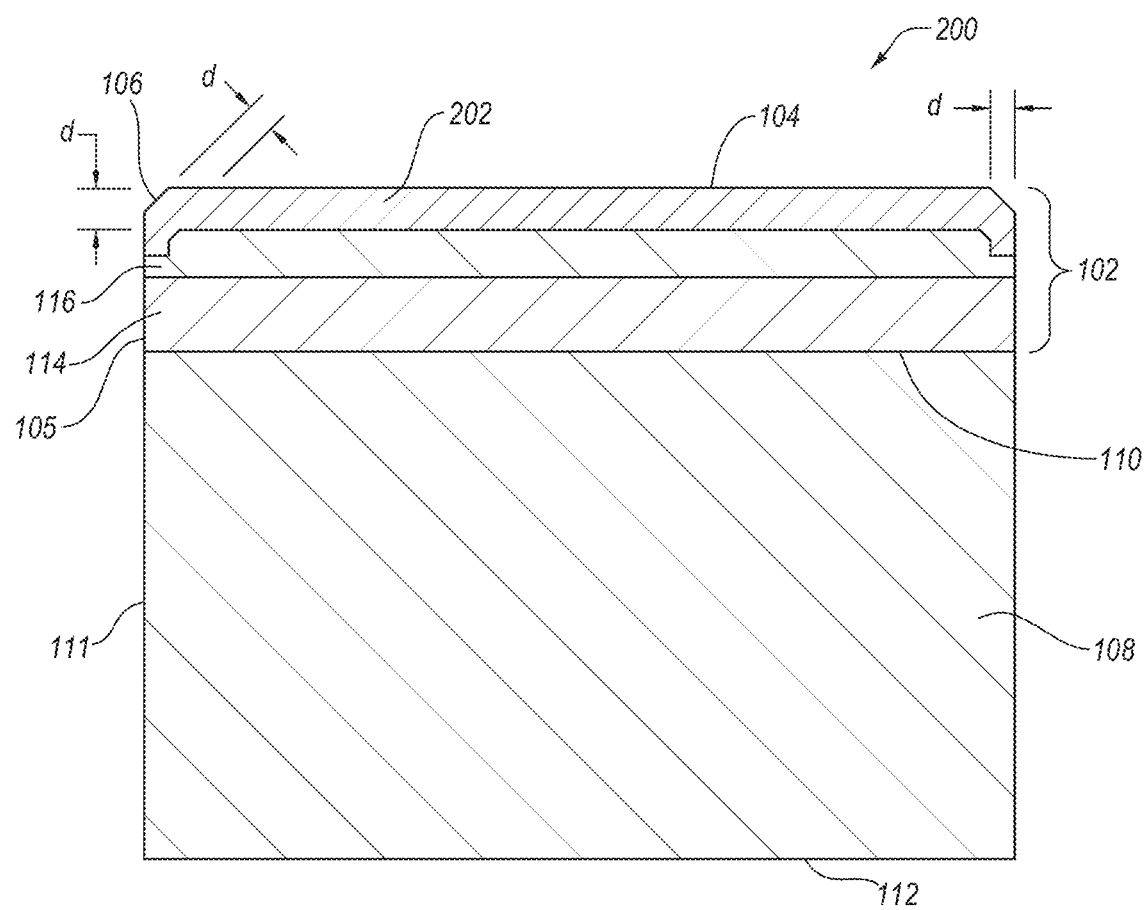
FIG. 6A is a cross-sectional side view of an exemplary leached PCD element according to at least one embodiment.
Figure 6B:
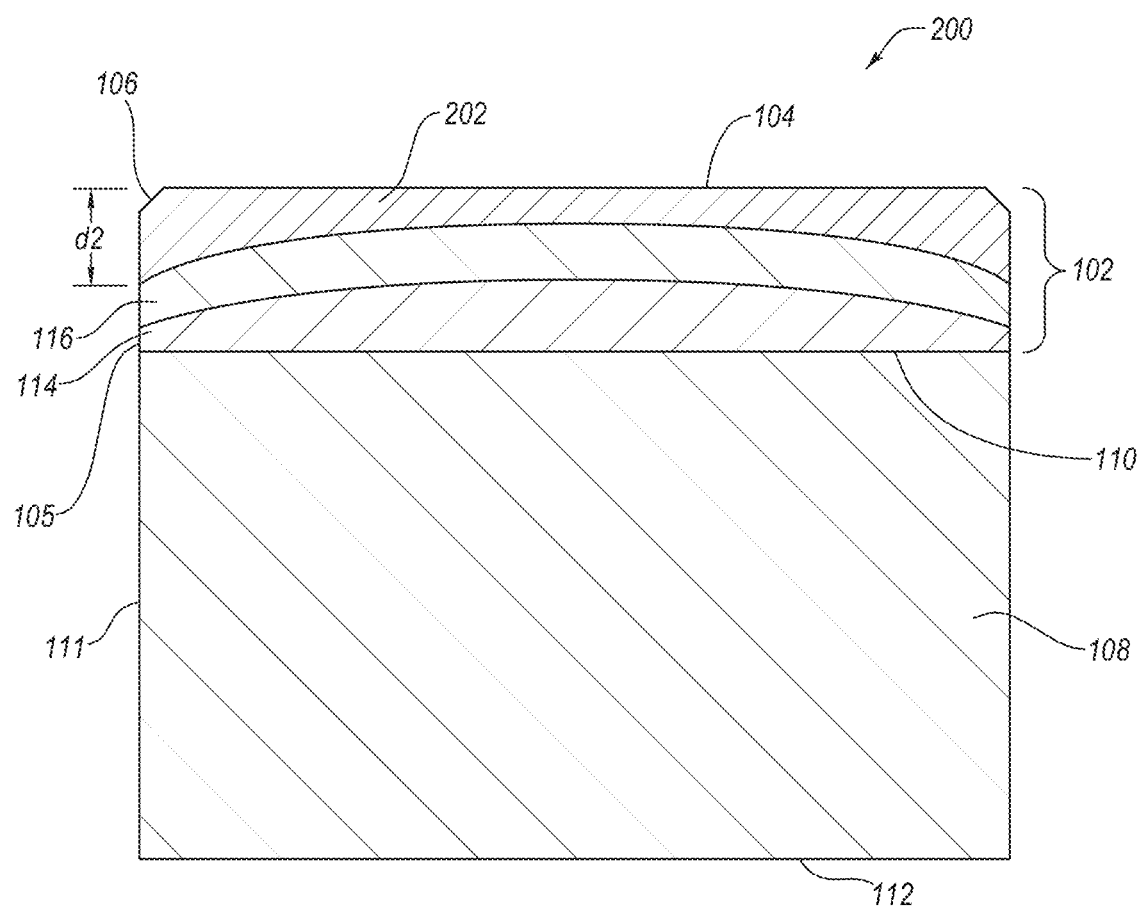
FIG. 6B is a cross-sectional side view of an exemplary leached PCD element according to at least one embodiment.

Referring to FIGS. 6A and 6B, following the HPHT sintering process, a PCD element 200 may be formed by at least partially leaching PCD table 102 (e.g., PCD tables 102 shown in FIGS. 2A-2D) to remove at least one interstitial material (e.g., a metal-solvent catalyst, a boron material, a copper material, a chromium material, a tungsten material, etc.) from a region thereof. PCD element 200 shown in FIG. 6A may represent PCD table 102 shown in FIG. 2A following leaching. In at least one embodiment, PCD table 102 may be partially immersed in and/or exposed to a leaching agent including at least one leaching solution (e.g., an acid-based solution) or gas to leach the at least one interstitial material from PCD table 102 to a selected depth "d" from at least one surface of the PCD table 102 to form a leached volume 202, as shown in FIG. 6A. Leached volume 202 may extend through at least a portion of second volume 116 and/or first volume 114. In at least one embodiment, the presence of interstitial boron, copper, and/or chromium materials in PCD table 102 of PCD elements 100 formed according to the disclosed methods may exhibit an increased leach rate in the presence of a leaching agent in comparison to conventional PCD elements.

Portions of PCD element 100 shown in FIG. 2A-2D may be masked and/or covered with an acid-resistant material to prevent certain areas from being leached, such as portions of first volume 114, second volume 116, and/or substrate 108. For example, PCD table 102 may be leached by immersion in an acid, such as hydrochloric acid, nitric acid (e.g. aqua regia, a solution of 90% nitric acid/10% de-ionized water by volume), phosphoric acid, acetic acid, hydrofluoric acid, any suitable acid, or any combination of the foregoing acids to form leached volume 202. As another example, leached volume 202 may be formed by immersing PCD table 102 in the acid for about less than 1 day to 7 days (e.g. about 3, 5, or 7 days) or for a few weeks (e.g. about 4 weeks) depending on the process employed.

The leached volume 202 may exhibit depth "d" as measured from one or more of working surface 104, at least one peripheral surface 105, or chamfer 106. In an embodiment, the leach depth "d" to which the leached volume 202 extends may be about 50 μm to about 1500 μm, such as about 50 μm to about 600 μm, about 200 μm to about 800 μm, about 600 μm to about 1200 μm, or greater than about 700 μm. In another embodiment, PCD table 102 may be leached so that the leach depth "d" may be approximately equal to a thickness of the PCD table 102. Leached volume 202 (or each of a plurality of leached volumes) may include a residual amount of the at least one interstitial material (e.g., a metal-solvent catalyst, a boron material, a copper material, a chromium material, and/or a tungsten material) in an amount of about 0.8 weight % to about 1.50 weight %, about 0.86 weight % to about 1.47 weight %, or about 0.90 weight % to about 1.2 weight %. Examples of suitable leached volume configurations, features, and embodiments, such as those disclosed in U.S. patent application Ser. No. 14/178,251, the disclosure of which is incorporated herein, in its entirety, by this reference, may be employed according to any embodiment described herein. Any and all leached volume configurations disclosed in U.S. patent application Ser. No. 14/178,251, and all others known in the art, may be utilized in conjunction with any embodiment described herein.

In some embodiments, leached volume 202 or at least a portion of leached volume 202 may be electrically conductive following leaching. For example, leached volume 202 may exhibit conductivity following leaching and removal and/or dissipation of a leaching agent. In at least one embodiment, leached volume 202 may exhibit an average electrical conductivity of at least about 500 S/m (Siemens/meter) (e.g., about 500 S/m, about 550 S/m, about 600 S/m, about 650 S/m, about 700 S/m, about 750 S/m, about 800 S/m, about 850 S/m, about 900 S/m, about 950 S/m, about 1000 S/m, about 1100 S/m, about 1200 S/m, about 1300 S/m, about 1400 S/m, about 1500 S/m, about 1600 S/m, about 1700 S/m, about 1800 S/m, about 1900 S/m, about 2000 S/m, 2100S/m, about 2200 S/m, about 2300 S/m, about 2400 S/m, about 2500 S/m, about 2600 S/m, about 2700 S/m, about 2800 S/m, about 2900 S/m, about 3000 S/m, about 3100 S/m, about 3200 S/m, about 3300 S/m, about 3400 S/m, about 3500 S/m, about 3600 S/m, about 3700 S/m, about 3800 S/m, about 3900 S/m, about 4000 S/m, about 4100 S/m, about 4200 S/m, about 4300 S/m, about 4400 S/m, about 4500 S/m, about 4600 S/m, about 4700 S/m, about 4800 S/m, about 4900 S/m, about 5000 S/m, greater than about 5000 S/m). In at least one embodiment, leached volume 202 may exhibit surface conductivity at working surface 104, chamfer 106, and/or peripheral surface 105 of at least about 1500 S/m (e.g., about 1500 S/m, about 1600 S/m, about 1700 S/m, about 1800 S/m, about 1900 S/m, about 2000 S/m, about 2100 S/m, about 2200 S/m, about 2300 S/m, about 2400 S/m, about 2500 S/m, about 2600 S/m, about 2700 S/m, about 2800 S/m, about 2900 S/m, about 3000 S/m, about 3100 S/m, about 3200 S/m, about 3300 S/m, about 3400 S/m, about 3500 S/m, about 3600 S/m, about 3700 S/m, about 3800 S/m, about 3900 S/m, about 4000 S/m, about 4100 S/m, about 4200 S/m, about 4300 S/m, about 4400 S/m, about 4500 S/m, about 4600 S/m, about 4700 S/m, about 4800 S/m, about 4900 S/m, about 5000 S/m, about 5100 S/m, about 5200 S/m, about 5300 S/m, about 5400 S/m, about 5500 S/m, about 5600 S/m, about 5700 S/m, about 5800 S/m, about 5900 S/m, about 6000 S/m, about 6100 S/m, about 6200 S/m, about 6300 S/m, about 6400 S/m, about 6500 S/m, about 6600 S/m, about 6700 S/m, about 6800 S/m, about 6900 S/m, about 7000 S/m, greater than about 7000 S/m).

Examples of suitable apparatuses, systems, and methods for measuring electrical conductivity of PCD materials, including PCD tables and/or portions thereof as disclosed herein, using electrical impedance tomography ("EIT") testing are described in U.S. Pat. Nos. 9,315,881 and 9,037,430, the disclosure of each of which are incorporated herein, in their entirety, by this reference. It should be noted that other measurement systems and techniques may be employed in addition to or instead of the described EIT testing systems.

Leached volume 202 may be free or substantially free of elemental cobalt at and/or adjacent to surface regions of leached volume 202, such as working surface 104, chamfer 106, and/or peripheral surface 105. In some embodiments, leached volume 202 may include non-elemental cobalt, such as cobalt present in an intermetallic compound. It is currently believed that electrical conductivity in leached volume 202 and/or at surface regions of leached volume 202 may be exhibited due to the presence of one or more intermetallic compounds in leached volume 202. For example, leached volume 202 may include an intermetallic compound that includes one or more of boron, titanium, cobalt, molybdenum, and tungsten. In at least one embodiment, the intermetallic compound may include a tungsten-cobalt compound, a titanium-cobalt compound, a cobalt-boron compound, a tungsten-cobalt-boron compound, and/or a titanium-cobalt-boron compound. In some embodiments, the intermetallic compound may be located at a surface of the leached region, such as at least a portion of working surface 104, chamfer 106, and/or peripheral surface 105. The electrical conductivity of leached volume 202 may facilitate further processing of leached volume 202. For example, leached volume 202 may have sufficient electrically conductivity to enable at least a portion of leached volume 202 to be machined to a selected shape and configuration through electrical discharge machining ("EDM") (e.g., wire EDM, plunge EDM, ram EDM, sink EDM, etc.).

FIG. 6B shows a PCD element 200 representing PCD table 102 shown in FIG. 2D following leaching according to at least one embodiment. In at least one embodiment, PCD table 102 may be partially immersed in and/or exposed to a leaching agent including at least one leaching solution (e.g., an acid-based solution) or gas to leach the at least one interstitial material from PCD table 102 to a selected maximum depth "d2" from working surface 104 of the PCD table 102 to form a leached volume 202, as shown in FIG. 6A. Leached volume 202 may extend through at least a portion of second volume 116 and/or first volume 114. In at least one embodiment, as shown in FIG. 6B, leached volume 202 may extend through a portion of second volume 116 such that an unleached portion of second volume 116 remains disposed between leached volume 202 and first volume 114. Second volume 116, which includes leached volume 202 and the unleached portion of second volume 116, may extend along any suitable portion of peripheral surface 105, including a minority or a majority of peripheral surface 105. According to at least one embodiment, second volume 116 (including leached volume 202 and the unleached portion of second volume 116) may extend from working surface 104 and/or chamfer 106 along a majority of peripheral surface 105. For example, second volume 116, including leached volume 202 and the unleached portion of second volume 116, may extend along greater than 50% of peripheral surface 105 (e.g., about 55%, about 60%, about 65%, about 70%, about 75%, about 80%, about 85%, about 90%, about 95%, about 100%).

In some embodiments, leached volume 202 and the unleached portion of second volume 116 may be any suitable shape, thickness, and/or configuration, without limitation. In some embodiments, for example, an interface region or boundary between leached volume 202 and the unleached portion of second volume 116 may follow or generally follow an interface region or boundary between first volume 114 and second volume 116. As shown in FIG. 6B, for example, the interface region or boundary between first volume 114 and second volume 116 may be arcuate or generally arcuate, and the interface region or boundary between leached volume 202 and the unleached portion of second volume 116 may be arcuate or generally arcuate, following or generally following the interface region or boundary between first volume 114 and second volume 116.

PCD elements manufactured as disclosed herein may exhibit increased durability and resistance to wear and failure during use in comparison to conventional PCD elements. For example, disclosed PCD elements, including leached and/or unleached PCD elements, may demonstrate increased abrasion resistance, exhibiting a distance to failure of at least about 400 in. (e.g., about 400 in., about 450 in., about 500 in., about 550 in., about 600 in., about 650 in., about 700 in., about 750 in., about 800 in., about 850 in., about 900 in., about 950 in., about 1000 in., greater than about 1000 in.) when subjected to mill testing (as described below with respect to Example 9). Disclosed PCD elements, including leached and/or unleached PCD elements, may also demonstrate increased abrasion resistance, exhibiting a diamond volume removed ("DVR") of about 100 $\mu$inch·inch$^2$ or less (e.g., about 100 $\mu$inch·inch$^2$, about 95 $\mu$inch·inch$^2$, about 85 $\mu$inch·inch$^2$, about 80 $\mu$inch·inch$^2$, about 75 $\mu$inch·inch$^2$, about 70 $\mu$inch·inch$^2$, about 65 $\mu$inch·inch$^2$, about 60 $\mu$inch·inch$^2$, about 55 $\mu$inch·inch$^2$, about 50 $\mu$inch·inch$^2$, about 45 $\mu$inch·inch$^2$, about 40 $\mu$inch·inch$^2$, about 35 $\mu$inch·inch$^2$, about 30 $\mu$inch·inch$^2$, or less than about 30 $\mu$inch·inch$^2$) when evaluated with vertical turret lathe ("VTL") testing (as described below with respect to Example 5).

In at least one embodiment, PCD elements disclosed herein, including leached and/or unleached PCD elements, may demonstrate increased strength in comparison to conventional PCD elements, exhibiting a first crack load limit (as described below with respect to Example 11) of at least about 6900 lb. (e.g., about 6900 lb., about 7000 lb., about 7100 lb., about 7200 lb., about 7300 lb., about 7400 lb., about 7500 lb., about 7600 lb., about 7700 lb., about 7800 lb., about 7900 lb., about 8000 lb., about 8100 lb., about 8200 lb., about 8300 lb., about 8400 lb., about 8500 lb., about 8600 lb., about 8700 lb., about 8800 lb., about 8900 lb., about 9000 lb., about 9500 lb., about 10,000 lb., greater than about 10,000 lb.). Disclosed PCD elements may also exhibit a $G_{ratio}$ (i.e., a ratio of the volume of a workpiece removed to the volume of PCD table 102 of PCD element 100 removed during VTL testing) of about $4.0 \times 10^6$ or greater (e.g., about $4.0 \times 10^6$, about $4.5 \times 10^6$, about $5.0 \times 10^6$, about $5.5 \times 10^6$, about $6.0 \times 10^6$, about $6.5 \times 10^6$, about $7.0 \times 10^6$, about $7.5 \times 10^6$, about $8.0 \times 10^6$, about $8.5 \times 10^6$, about $9.0 \times 10^6$, about $9.5 \times 10^6$, about $1.0 \times 10^7$, about $1.1 \times 10^7$, about $1.2 \times 10^7$, about $1.3 \times 10^7$, about $1.4 \times 10^7$, about $1.5 \times 10^7$, about $1.6 \times 10^7$, about $1.7 \times 10^7$, about $1.8 \times 10^7$, about $1.9 \times 10^7$, about $2.0 \times 10^7$, greater than about $2.0 \times 10^7$).

In some embodiments, PCD tables of PCD elements manufactured as disclosed herein may demonstrate certain magnetic saturation and magnetic coercivity in comparison to conventional PCD elements. For example, unleached PCD tables of disclosed PCD elements may exhibit magnetic saturation of about 10 Gauss*ccm/g or less (e.g., about 10 Gauss*ccm/g, about 9.5 Gauss*ccm/g, about 9 Gauss*ccm/g, about 8.5 Gauss*ccm/g, about 8 Gauss*ccm/g, about 7.5 Gauss*ccm/g, about 7 Gauss*ccm/g, about 6.5 Gauss*ccm/g, about 6 Gauss*ccm/g, less than about 6 Gauss*ccm/g). PCD table 102 of PCD element 100 may also exhibit magnetic coercivity of about 150 Oe or less (e.g., about 150 Oe, about 145 Oe, about 140 Oe, about 135 Oe, about 130 Oe, about 125 Oe, about 120 Oe, about 115 Oe, about 110 Oe, about 105 Oe, about 100 Oe, about 95 Oe, about 90 Oe, about 85 Oe, about 80 Oe, less than about 80 Oe). Examples of suitable apparatuses, systems, and methods for measuring magnetic saturation and magnetic coercivity of PCD materials, including PCD tables and/or portions thereof as disclosed herein, are described in U.S. Pat. Nos. 9,315,881 and 8,766,628, the disclosures of each of which are incorporated herein, in their entirety, by this reference. It should be noted that other measurement systems and techniques may be employed in addition to or instead of the described testing systems.

In various embodiments, PCD table 102 may additionally include one or more portions that are remote from working surface 104 that are not leached so that at least a portion of the interstitial regions thereof are still at least partially occupied by the at least one interstitial material (e.g., a metal-solvent catalyst, a boron material, a copper material, a chromium material, a tungsten material, and/or other materials disclosed herein). For example, as shown in FIGS. 6A and 6B, at least a portion of first volume 114 and/or second volume 116 may not be leached. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation.

FIGS. 7A-7E show shaped PCD elements, such as PCD elements utilized as attack inserts in drill bits, according to various embodiments. As illustrated in these figures, PCD element 700 may include a PCD table 702 affixed to or formed upon a substrate 708. PCD table 702 may be affixed to substrate 708 at an interfacial surface 710 of substrate 708, which may be substantially planar or non-planar (e.g., three-dimensionally domed, grooved, dimpled, hemispherical, conical, frustoconical, pyramidal, spherical, cubic, polyhedral, combinations thereof, or any other non-planar, three-dimensional shape; or cross-sectionally zig-zagged, stepped, arcuate, undulating, sinusoidal, combinations thereof, and/or any other non-planar cross-sectional configuration). PCD element 700 may include a rear surface 712, a substrate side surface 711 formed by substrate 708, and a peripheral surface 705 formed by PCD table 702. A rear surface 712 may be formed by substrate 708.

PCD element 700 may comprise any suitable size, shape, and/or geometry, without limitation. According to at least one embodiment, at least a portion of PCD element 700 may have a substantially cylindrical shape. For example, PCD element 700 may comprise a substantially cylindrical outer surface surrounding a central axis 729 of PCD element 700. Substrate side surface 711 and peripheral surface 705 of PCD table 702 may, for example, be substantially cylindrical and may have any suitable diameter(s) relative to central axis 729, without limitation. According to various embodiments, substrate side surface 711 and peripheral surface 705 may have substantially the same outer diameter relative to central axis 729. PCD element 700 may also comprise any other suitable shape (e.g., in cross-section or otherwise), including, for example, an oval, ellipsoid, triangular, square, rectangular, polygonal, and/or composite shape, and/or a combination of the foregoing, without limitation.

According to at least one embodiment, at least a portion of PCD element 700 may have a convex shape, such as a substantially conical shape, as shown in FIGS. 7A-7E. For example, working surface 704 of PCD table 702 may have a substantially conical outer surface surrounding central axis 729 of PCD element 700. Working surface 704 may also have any other suitable planar or nonplanar shape (e.g., in cross-section or otherwise), including, for example, a partial-ovoid, partial-ellipsoid, partial-spherical, triangular, square, rectangular, polygonal, and/or composite shape, and/or a combination of the foregoing, without limitation. In some embodiments, working surface 704 may be nonplanar and may have an apical region 729, (e.g., a central apical region). Apical region 729 may, for example, be arcuate or substantially arcuate (e.g., domed), as shown in FIGS. 7A-7E. Additionally or alternatively, apical region 729 may have any other suitable planar or non-planar shape (e.g., three-dimensionally domed, dimpled, hemispherical, conical, frustoconical, pyramidal, partial-ovoid, partial-ellipsoid, partial-spherical, cubic, polyhedral, combinations thereof, or any other non-planar, three-dimensional shape; or cross-sectionally zig-zagged, stepped, arcuate, undulating, sinusoidal, combinations thereof, or any other non-planar cross-sectional configuration).

Any suitable surface shape may also be formed at the intersection of peripheral surface 705 and working surface 704, including, without limitation, an arcuate surface (e.g., a radius, an ovoid shape, or any other rounded shape), a sharp edge, multiple chamfers/radii, a honed edge, and/or combinations of the foregoing. At least one edge may be formed at the intersection of peripheral surface 705 and working surface 704. For example, PCD element 700 may include one or more edges, such as edge 706 shown in FIG. 7A. According to various embodiments, PCD element 700 may also include a substrate chamfer 717 formed by substrate 708. For example, a substrate chamfer 717 comprising an angular and/or rounded edge may be formed by substrate 708 at the intersection of substrate side surface 711 and rear surface 712. Any other suitable surface shape may also be formed at the intersection of substrate side surface 711 and rear surface 712, including, without limitation, an arcuate surface (e.g., a radius, an ovoid shape, or any other rounded shape), a sharp edge, multiple chamfers/radii, a honed edge, and/or combinations of the foregoing.

As shown in FIGS. 7B-7E, PCD table 702 of PCD element 700 may have a first volume 714 adjacent to an interfacial surface 710 of substrate 708 and defining at least a portion of peripheral surface 705 of PCD table 702. Additionally, PCD table 702 may include a second volume 716 defining nonplanar working surface 704, edge 706, and/or a portion of peripheral surface 705.

Figure 7A:
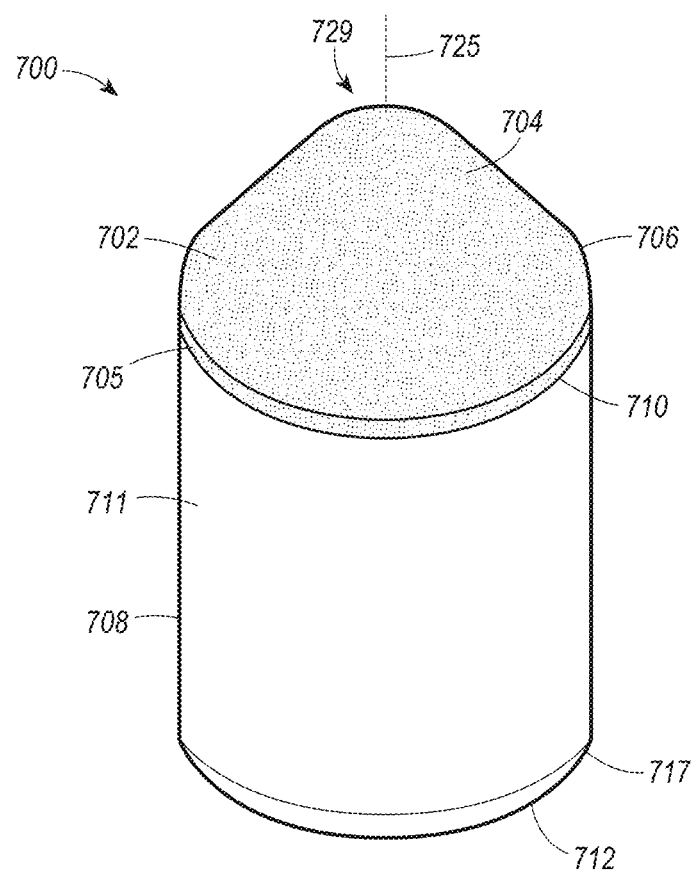
FIG. 7A is a perspective view of an exemplary PCD element according to at least one embodiment.

First volume 714 and second volume 716 may each include any suitable shape, thickness, and/or configuration, without limitation. In at least one embodiment, an interface region or boundary between first volume 714 and substrate 708 and/or an interface region or boundary between first volume 714 and second volume 716 may be planar, concave, convex, grooved, dimpled, textured, arcuate, angular, and/or another selected non-planar geometry, without limitation. An interface region or boundary between first volume 714 and substrate 708 at interfacial surface 710 may be any suitable shape, without limitation. For example, interfacial surface 710 of substrate 708 may be substantially planar or non-planar (e.g., three-dimensionally domed, dimpled, hemispherical, conical, frustoconical, pyramidal, partial-ovoid, partial-ellipsoid, partial-spherical, cubic, polyhedral, combinations thereof, or any other non-planar, three-dimensional shape; or cross-sectionally zig-zagged, stepped, arcuate, undulating, sinusoidal, combinations thereof, and/or any other non-planar cross-sectional configuration). In some embodiments, interfacial surface 710 of substrate 708 may be a convex, arcuate surface that is surrounded by first volume 714, as shown in FIG. 7A.

An interface region or boundary between first volume 714 and second volume 716 may be any suitable shape, without limitation. For example, interface region or boundary between first volume 714 and second volume 716 may be substantially planar or non-planar (e.g., three-dimensionally domed, dimpled, grooved, hemispherical, conical, frustoconical, pyramidal, partial-ovoid, partial-ellipsoid, partial-spherical, cubic, polyhedral, combinations thereof, or any other non-planar, three-dimensional shape; or cross-sectionally zig-zagged, stepped, arcuate, undulating, sinusoidal, combinations thereof, and/or any other non-planar cross-sectional configuration). In some embodiments, as shown in FIG. 7A, an interface region or boundary between first volume 714 and second volume 716 of PCD table 702 may be arcuate or generally arcuate. In at least one embodiment, second volume 716 may at least partially surround first volume 714. In some embodiments, an interface region or boundary between first volume 714 and second volume 716 may follow or generally follow at least a portion of interfacial surface 710 of substrate 708 and/or working surface 704 of PCD table 702. In at least one embodiment, an interface region or boundary between first volume 714 and second volume 716 may arc along a path that does not follow interfacial surface 710 of substrate 708 or working surface 704 of PCD table 702.

Figure 7C:
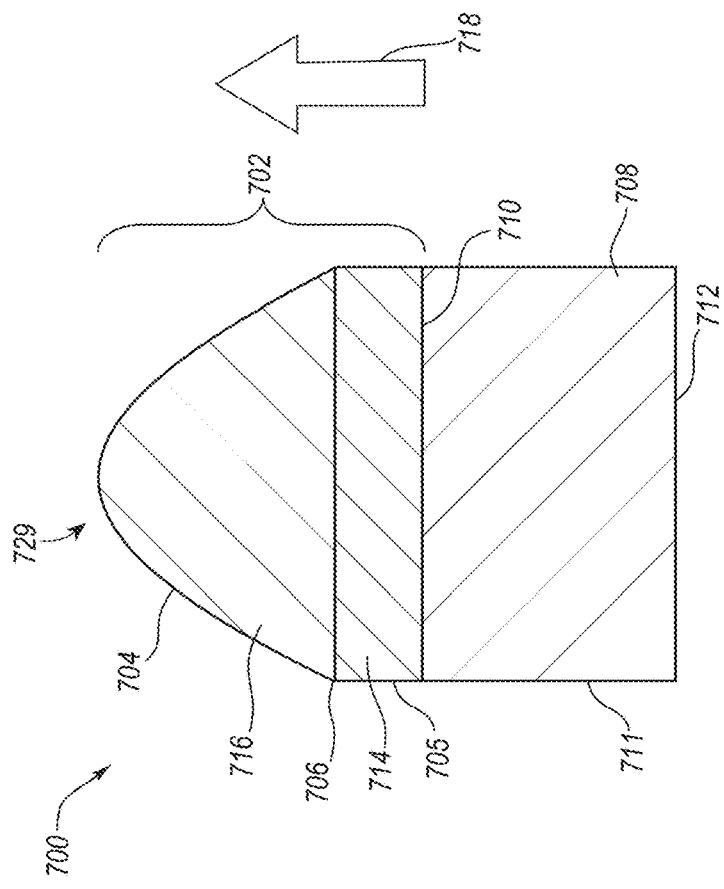
FIG. 7C is a cross-sectional side view of the exemplary PCD element according to at least one embodiment.
Figure 7B:
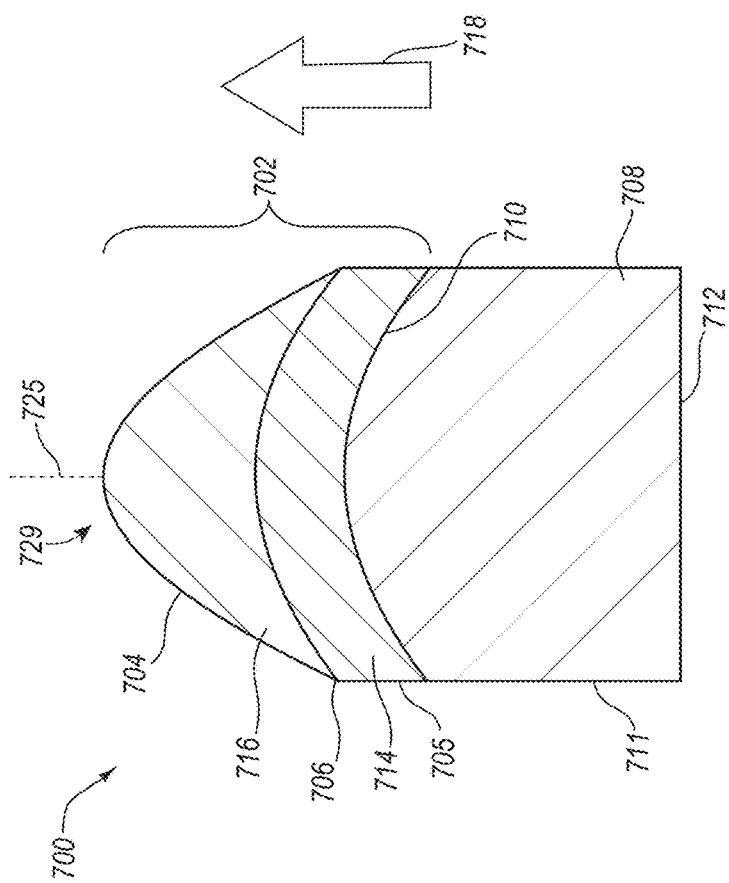
FIG. 7B is a cross-sectional side view of the exemplary PCD element according to at least one embodiment.

Second volume 716 may extend along any suitable portion of peripheral surface 705, including a minority or a majority of peripheral surface 705. In some embodiments, as shown in FIGS. 7B and 7C, second volume 716 may not extend along peripheral surface 705. For example, second volume 716 may extend to an interface region or boundary with first volume 714 that intersects or substantially intersects edge 706 and/or a portion of working surface 704. According to at least one embodiment, second volume 716 may extend from working surface 704 and/or edge 706 along a portion of peripheral surface 705. For example, second volume 716 may extend along majority of peripheral surface 705. For example, second volume 716 may extend along greater than 50% of peripheral surface 705 (e.g., about 55%, about 60%, about 65%, about 70%, about 75%, about 80%, about 85%, about 90%, about 95%, about 100%).

According to at least one embodiment, first volume 714 of PCD table 702 may include an interstitial material including a group 13 (group IIIA) element (e.g., boron, aluminum, gallium, indium, and/or thallium) and second volume 716 of PCD table 702 may include the interstitial material at a different concentration than first volume 714. For example, second volume 716 of PCD table 702 may include interstitial material at a higher or lower concentration than first volume 714. In some embodiments, the interstitial material may include a boride material, such as, for example, a cobalt boride material and/or a titanium boride material. In one embodiment, the interstitial material may include a boron carbide material. According to various embodiments, the concentration of the interstitial material including the group 13 element in first volume 714 may decrease along a direction from substrate 708 toward second volume 716. For example, the concentration of the interstitial material including the group 13 element in first volume 714 may decrease along a direction 718, which is substantially perpendicular to working surface 704 and/or interfacial surface 710 and/or substantially parallel to peripheral surface 705, from substrate 708 to second volume 716. The concentration of the interstitial material including the group 13 element in second volume 716 may decrease along a direction from first volume 714 toward working surface 704. For example, the concentration of the interstitial material including the group 13 element in second volume 716 may decrease along direction 718 from first volume 714 to working surface 704.

The interstitial material including the group 13 element may be distributed in first volume 714 and/or second volume 716 during a HPHT sintering process for forming PCD table 702. In at least one embodiment, at least a portion of PCD table 702 may include an interstitial tungsten material, such as tungsten (e.g., tungsten carbide) that is swept from substrate 708 during HPHT sintering. According to at least one embodiment, at least a portion of PCD table 702 may include tungsten present in a compound, such as a thermally stable compound and/or a compound having a relatively lower thermal expansion coefficient, that differs from tungsten compounds in substrate 708. In some embodiments, second volume 716 may include the interstitial tungsten material at a lower concentration than first volume 714. The concentration of the interstitial tungsten material in first volume 714 may decrease along direction 718 from substrate 708 to second volume 716, and the concentration of the interstitial tungsten material in second volume 716 may decrease along direction 718 from first volume 714 to working surface 704.

In certain embodiments, PCD table 702 may include a metal material that includes one or more transition metal elements. For example, PCD table 702 may include at least one interstitial transition metal material, including at least one transition metal from groups 3-12 of the modern IUPAC periodic table (groups IIIB, IVB, VB, VIB, VIIB, VIIIB, IB, and/or IIB of the CAS periodic table) (e.g., scandium, yttrium, lanthanum, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, and/or mercury). For example, PCD table 702 may include at least one group 4 (group IVB) element (e.g., titanium, zirconium, and/or hafnium), and/or at least one group 6 (group VIB) element (e.g., chromium, molybdenum, and/or tungsten), and/or at least one group 8, at least one group 9, and/or at least one group 10 (group VIII) element (e.g., iron, ruthenium, osmium, cobalt, rhodium, iridium, nickel, palladium, and/or platinum), and/or at least one group 11 (group IB) element (e.g., copper, silver, and/or gold). In at least one embodiment, PCD table may include an interstitial transition metal material, such as an interstitial copper, chromium, titanium, molybdenum, and/or tungsten material, in addition to or instead of an interstitial material including at least one group 13 (group IIIA) element (e.g., boron, aluminum, gallium, indium, and/or thallium). Second volume 716 may include the interstitial transition metal material at a different concentration than first volume 714. In some embodiments, the concentration of the interstitial transition metal material in first volume 714 may decrease along direction 718 from substrate 708 to second volume 716, and the concentration of the interstitial transition metal material in second volume 716 may decrease along direction 718 from first volume 714 to working surface 704. While a concentration of an interstitial transition metal material in PCD table 702 may generally decrease along direction 718 from substrate 708 to working surface 704, first volume 714 and/or second volume 716 of PCD table 702 may include one or more regions or pockets of increasing concentration of the interstitial transition metal material along direction 718. In at least one embodiment, concentrations of an interstitial transition metal material in at least a portion of PCD table 702 may generally increase along direction 718 from substrate 708 to working surface 704.

In some embodiments, an interstitial material in first volume 714 and/or second volume 716 of PCD table 702 may include a tungsten-cobalt compound, a titanium-cobalt compound, a cobalt-boron compound, a tungsten-cobalt-boron compound, and/or a titanium-cobalt-boron compound. For example, first volume 714 and/or second volume 716 may include a cobalt-titanium intermetallic, cobalt boride, cobalt tungsten boride, and/or khamrabaevite. In at least one embodiment, the interstitial material in first volume 714 and/or second volume 716 may include, for example, BCo, $BCo_2$, $B_2Co_3$, $Co_2B$, $Co_{23}B_6$, $Co_3Ti$, $TiCo_2$, $CoW_2B_2$, $Co_{21}W_2B_6$, WC, and/or TiC. According to some embodiments, first volume 714 and second volume 716 of PCD table 702 may include different average diamond grain sizes.

As shown in FIG. 7C, an interface region or boundary between first volume 714 and interfacial surface 710 of substrate 708 may be planar or generally planar. Additionally or alternatively, an interface region or boundary between first volume 714 and second volume 716 may be planar or generally planar and may be positioned vertically at, near, and/or along peripheral surface 705, edge 706, or working surface 704 of PCD table 702.

Figure 7E:
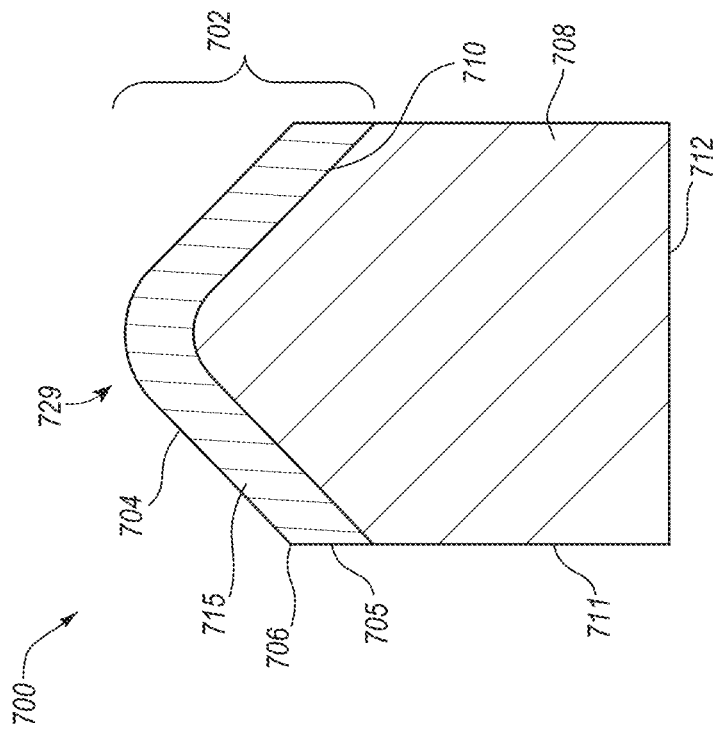
FIG. 7E is a cross-sectional side view of the exemplary PCD element according to at least one embodiment.
Figure 7D:
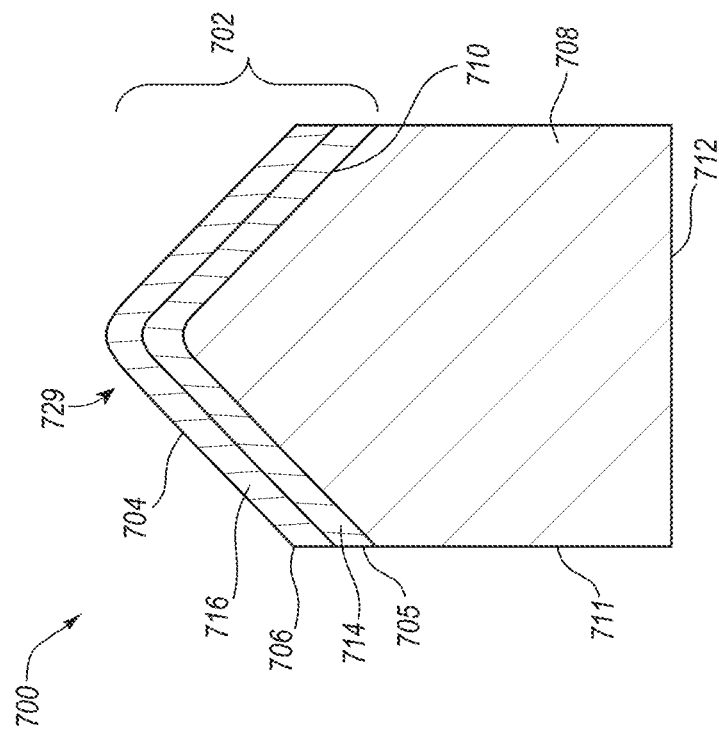
FIG. 7D is a cross-sectional side view of the exemplary PCD element according to at least one embodiment.

As shown in FIG. 7D, an interface region or boundary between first volume 714 and interfacial surface 710 of substrate 708 may follow or generally follow at least a portion of working surface 704 of PCD table 704 or vice versa. Interfacial surface 710 of substrate 708 may, for example, be a conical, frustoconical, substantially conical, or substantially frustoconical surface. Additionally or alternatively, an interface region or boundary between first volume 714 and second volume 716 may follow or generally follow at least a portion of working surface 704 of PCD table 704 and/or interfacial surface 710 of substrate 708. The interface region or boundary between first volume 714 and second volume 716 may be positioned vertically at, near, and/or along peripheral surface 705, edge 706, or working surface 704 of PCD table 702.

As shown in FIG. 7E, PCD table 704 may include a single volume 715 formed from, e.g., a monolithic volume and/or substantially uniform composition of diamond particles. Volume 715 of PCD table 704 may be adjacent to substrate 708 at an interface region or boundary between volume 715 and interfacial surface 710 of substrate 708. Volume 715 of PCD table 702 may have any suitable shape, such as a shape corresponding to any of the shapes of PCD table 702 shown in, for example, FIGS. 7A-7D. In some embodiments, as shown in FIG. 7E, an interface region or boundary between volume 715 and interfacial surface 710 of substrate 708 may follow or generally follow at least a portion of working surface 704 of PCD table 704. Interfacial surface 710 of substrate 708 may, for example, be a conical, frustoconical, substantially frustoconical, or substantially conical surface. According to at least one example, volume 715 of PCD table 704 may form peripheral surface 705 of PCD table 704.

Figure 8B:
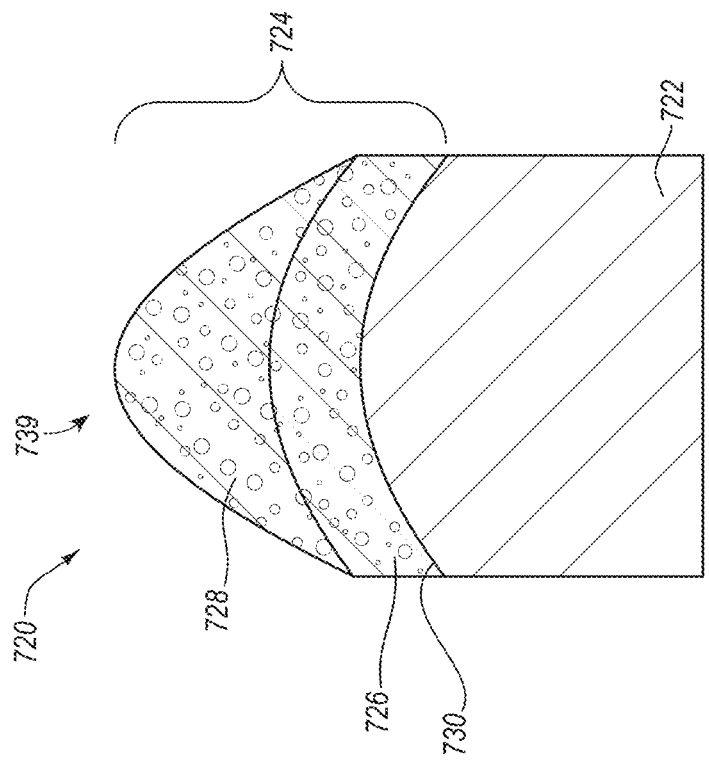
FIG. 8B is a cross-sectional side view of an exemplary PCD precursor assembly for fabricating a superabrasive element according to at least one embodiment.
Figure 8A:
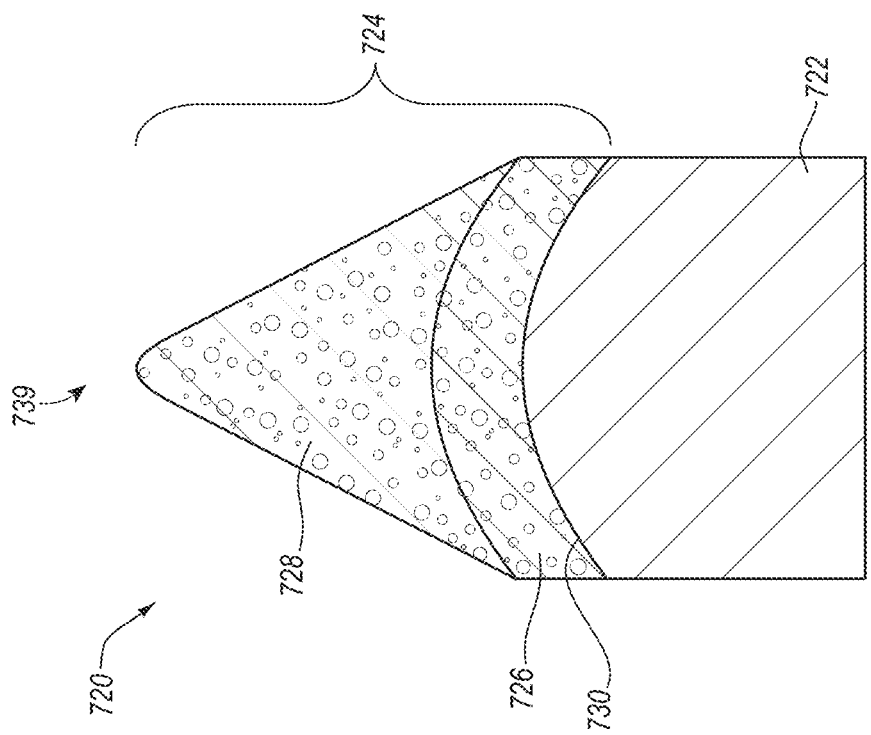
FIG. 8A is a cross-sectional side view of an exemplary PCD precursor assembly for fabricating a superabrasive element according to at least one embodiment.

FIGS. 8A-8F are cross-sectional side views of PCD precursor assemblies 720 according to various embodiments. FIG. 8A illustrates a PCD precursor assembly 120 for forming, for example, PCD element 100 shown in FIG. 7B. As shown in FIG. 8A, PCD precursor assembly 720 may include a substrate 722 and a diamond particulate volume 724 adjacent to an upper surface 730 of substrate 722. As described herein, PCD precursor assembly 720 may be subjected to a sintering process, such as a HPHT sintering process, to form a PCD element (e.g., PCD element 700 including PCD table 702 bonded to substrate 708 as illustrated in FIGS. 7A-7E).

In various embodiments, diamond particulate volume 724 may include a first volume 726 adjacent to substrate 722 and a second volume 728 adjacent to first volume 726 such that first volume 726 is disposed between second volume 728 and substrate 722. Second volume 728 may form an upper surface 732 that is disposed away from first volume 726. In at least one embodiment, first volume 726 may include a mixture of diamond particles and one or more other materials. For example, first volume 726 may include at least one group 13 element (e.g., boron, aluminum, gallium, indium, and/or thallium), and/or at least one group 4 (group IVB) element (e.g., titanium, zirconium, and/or hafnium), and/or at least one group 6 (group VIB) element (e.g., chromium, molybdenum, and/or tungsten), and/or at least one group 8, at least one group 9, and/or at least one group 10 (group VIII) element (e.g., iron, ruthenium, osmium, cobalt, rhodium, iridium, nickel, palladium, and/or platinum), and/or at least one group 11 (group IB) element (e.g., copper, silver, and/or gold). In some embodiments, first volume 726 may include a boron and/or titanium material mixed with the diamond particles. The boron and/or titanium material may include, for example, a boride compound, such as a cobalt boride, titanium boride, and/or any other suitable boride compound. Additional examples of suitable boride materials may include, without limitation, zirconium boride, aluminum boride, hafnium boride, vanadium boride, boron carbide, niobium boride, tantalum boride, chromium boride, molybdenum boride, tungsten boride, iron boride, cobalt boride, and/or nickel boride compounds. In some embodiments, first volume 726 may include a boron material including a boron carbide compound mixed with the diamond particles. In some embodiments, first volume 726 may include phosphorous and/or sulfur and/or one or more compounds including phosphorous and/or sulfur.

First volume 726 may include the boron and/or titanium compound, and/or any other materials or compounds disclosed herein, at any suitable concentration prior to sintering, such as a concentration of approximately 20% or less by weight. In at least one embodiment, first volume 726 may include the boron and/or titanium compound at a concentration of approximately 10% or less by weight (e.g., approximately 0.05% to approximately 10% by weight, approximately 0.1% to approximately 8% by weight, approximately 0.5% to approximately 5% by weight, approximately 1% to approximately 3% by weight, approximately 1.5% to approximately 2.5% by weight, or approximately 2% by weight).

In at least one embodiment, second volume 728 may be free or substantially free of, and/or may include a lower concentration of, one or more of the materials and/or compounds present in first volume 726. For example, second volume 728 may be free or substantially free of, and/or may include a lower concentration of, at least one group 13 element (e.g., boron, aluminum, gallium, indium, and/or thallium), and/or at least one group 4 (group IVB) element (e.g., titanium, zirconium, and/or hafnium), and/or at least one group 6 (group VIB) element (e.g., chromium, molybdenum, and/or tungsten), and/or at least one group 8, at least one group 9, and/or at least one group 10 (group VIII) element (e.g., iron, ruthenium, osmium, cobalt, rhodium, iridium, nickel, palladium, and/or platinum), and/or at least one group 11 (group IB) element (e.g., copper, silver, and/or gold), and/or at least one group 13 element (e.g., boron, aluminum, gallium, indium, and/or thallium), and/or sulfur and/or phosphorous. In some embodiments, second volume 728 may be free or substantially free of the boron material and/or titanium material, and/or any other materials or compounds disclosed herein, prior to sintering. For example, second volume 728 may include a volume of virgin diamond (i.e., green diamond) particles that does not include the boron material and/or titanium material. In some embodiments, second volume 728 may include the boron material and/or titanium material, and/or any other materials or compounds disclosed herein, at a lower concentration than first volume 726 prior to sintering.

In some embodiments, first volume 726 may include a material that includes one or more transition metal elements. For example, first volume 726 may include a transition metal material including at least one group 4 (group IVB) element (e.g., titanium, zirconium, and/or hafnium), and/or at least one group 6 (group VIB) element (e.g., chromium, molybdenum, and/or tungsten), and/or at least one group 8, at least one group 9, and/or at least one group 10 (group VIII) element (e.g., iron, ruthenium, osmium, cobalt, rhodium, iridium, nickel, palladium, and/or platinum), and/or at least one group 11 (group IB) element (e.g., copper, silver, and/or gold). In some embodiments, first volume 126 may include a copper, chromium, molybdenum, and/or tungsten material, in addition to or instead of at least one group 13 (group IIIA) element (e.g., boron, aluminum, gallium, indium, and/or thallium) and/or at least one group 4 (group IVB) element (e.g., titanium, zirconium, and/or hafnium). For example, first volume 726 may include a copper and/or tungsten compound at any suitable concentration prior to sintering, such as a concentration of approximately 30% or less by weight. In at least one embodiment, first volume 726 may include the copper and/or tungsten compound at a concentration of approximately 20% or less by weight (e.g., approximately 1% to approximately 20% by weight, approximately 5% to approximately 15% by weight, approximately 7% to approximately 13% by weight, approximately 8% to approximately 12% by weight, approximately 9% to approximately 11% by weight, or approximately 10% by weight).

In some embodiments, first volume 726 may include a chromium compound and/or a molybdenum compound at any suitable concentration prior to sintering, such as a concentration of approximately 30% or less by weight. In at least one embodiment, first volume 726 may include the chromium compound and/or a molybdenum compound at a concentration of approximately 20% or less by weight (e.g., approximately 1% to approximately 20% by weight, approximately 2% to approximately 15% by weight, approximately 5% to approximately 10% by weight, approximately 6% to approximately 9% by weight, approximately 7% to approximately 8% by weight, or approximately 7.5% by weight). Second volume 728 may be free or substantially free of a copper, chromium, molybdenum, and/or tungsten material, and/or any other materials or compounds disclosed herein, prior to sintering. For example, second volume 728 may include a volume of virgin diamond particles that does not include a copper, chromium, molybdenum, and/or tungsten material. In some embodiments, second volume 728 may include a copper, chromium, molybdenum, and/or tungsten material at a lower concentration than first volume 726 prior to sintering.

In some embodiments, first volume 726 may be free or substantially free of, and/or may include a lower concentration of, one or more of materials and/or compounds present in second volume 728. For example, first volume 726 may include a volume of virgin diamond (i.e., green diamond) particles that does not include boron and/or titanium. According to at least one embodiment, first volume 726 may include boron and/or titanium, and/or any other materials or compounds disclosed herein, at a lower concentration than second volume 728 prior to sintering. For example, second volume 728 may include a mixture of diamond particles and one or more other materials at a higher concentration (e.g., any of the concentrations discussed above in reference to first volume 726) than first volume 726, including at least one group 13 element (e.g., boron, aluminum, gallium, indium, and/or thallium), and/or at least one group 4 (group IVB) element (e.g., titanium, zirconium, and/or hafnium), and/or at least one group 6 (group VIB) element (e.g., chromium, molybdenum, and/or tungsten), and/or at least one group 8, at least one group 9, and/or at least one group 10 (group VIII) element (e.g., iron, ruthenium, osmium, cobalt, rhodium, iridium, nickel, palladium, and/or platinum), and/or at least one group 11 (group IB) element (e.g., copper, silver, and/or gold).

In some embodiments, diamond particulate volume 724 may include one or more additional volumes, or layers, in addition to first volume 726 and second volume 728. In some embodiments, such additional volumes may be substantially free of boron and/or titanium prior to leaching and/or may include boron and/or titanium at any suitable concentration, such as a concentration that differs from first volume 726 and second volume 728. First volume 726 and second volume 728 may each include any suitable shape, thickness, and/or configuration, without limitation. In some embodiments, for example, an interface between first volume 726 and substrate 722 and/or an interface between first volume 726 and second volume 728 may be planar, concave, convex, grooved, dimpled, textured, or another selected non-planar geometry, without limitation.

According to at least one embodiment, at least a portion of diamond particulate volume 724 may have a convex shape, such as a substantially conical shape, as shown in FIGS. 8A-8E. For example, upper surface 732 of diamond particulate volume 724 may have a substantially conical outer surface. Upper surface 732 may also have any other suitable planar or nonplanar shape (e.g., in cross-section or otherwise), including, for example, a partial-ovoid, partial-ellipsoid, partial-spherical, triangular, square, rectangular, polygonal, and/or composite shape, and/or a combination of the foregoing, without limitation. In some embodiments, upper surface 732 may be nonplanar and may have an apical region 739, such as a central apical region. Apical region 739 may, for example, be angular or arcuate (e.g., domed), as shown in FIGS. 8A-8E. Additionally or alternatively, apical region 739 may have any other suitable planar or non-planar shape (e.g., three-dimensionally domed, dimpled, hemispherical, conical, frustoconical, pyramidal, partial-ovoid, partial-ellipsoid, partial-spherical, cubic, polyhedral, combinations thereof, or any other non-planar, three-dimensional shape; or cross-sectionally zig-zagged, stepped, arcuate, undulating, sinusoidal, combinations thereof, or any other non-planar cross-sectional configuration). In some embodiments, a shape of upper surface 732 of diamond particulate volume 724 may differ from that of a corresponding working surface 704 of the resulting formed PCD table 704. For example, a sintered PCD diamond volume from diamond particulate volume 724 may be shaped by, for example, grinding or laser machining to form a different shaped surface. In at least one embodiment, upper surface 732 may have an angular or pointed shape (e.g., a conical shape) at apical region 739 as shown, for example, in FIGS. 8A and 8C-8E. Following sintering, the resulting PCD volume may be formed by removing PCD material to produce working surface 704 having a substantially conical shape with a rounded and/or domed apical region 729, as shown, for example, in FIGS. 7A-7E.

First volume 726 and second volume 728 of diamond particulate volume 724 may each include any suitable shape, thickness, and/or configuration, without limitation. In at least one embodiment, an interface region or boundary between first volume 726 and substrate 722 and/or an interface region or boundary between first volume 726 and second volume 728 may be planar, concave, convex, grooved, dimpled, textured, arcuate, angular, and/or another selected non-planar geometry, without limitation. An interface region or boundary between first volume 726 and substrate 722 at upper surface 730 of substrate 722 may be any suitable shape, without limitation. For example, upper surface 730 of substrate 722 may be substantially planar or non-planar (e.g., three-dimensionally domed, dimpled, hemispherical, conical, frustoconical, pyramidal, partial-ovoid, partial-ellipsoid, partial-spherical, cubic, polyhedral, combinations thereof, or any other non-planar, three-dimensional shape; or cross-sectionally zig-zagged, stepped, grooved, arcuate, undulating, sinusoidal, combinations thereof, and/or any other non-planar cross-sectional configuration). In some embodiments, upper surface 730 of substrate 722 may be a convex, arcuate surface that is surrounded by first volume 726, as shown in FIG. 8A.

An interface region or boundary between first volume 726 and second volume 728 of diamond particulate volume 724 may be any suitable shape, without limitation. For example, an interface region or boundary between first volume 726 and second volume 728 may be substantially planar or non-planar (e.g., three-dimensionally domed, grooved, dimpled, hemispherical, conical, frustoconical, pyramidal, partial-ovoid, partial-ellipsoid, partial-spherical, cubic, polyhedral, combinations thereof, or any other non-planar, three-dimensional shape; or cross-sectionally zig-zagged, stepped, arcuate, undulating, sinusoidal, combinations thereof, and/or any other non-planar cross-sectional configuration). In some embodiments, as shown in FIG. 8A, an interface region or boundary between first volume 726 and second volume 728 of diamond particulate volume 724 may be arcuate or generally arcuate. In at least one embodiment, second volume 728 may at least partially surround first volume 726. In some embodiments, an interface region or boundary between first volume 726 and second volume 728 may follow or generally follow at least a portion of upper surface 730 of substrate 722 and/or upper surface 732 of diamond particulate volume 724. In at least one embodiment, an interface region or boundary between first volume 726 and second volume 728 may arc along a path that does not follow upper surface 730 of substrate 722 or upper surface 732 of diamond particulate volume 724.

In some embodiments, a catalyst (e.g., any of the metal-solvent catalysts and/or carbonate catalysts disclosed herein) may be provided in particulate form mixed with diamond particles in first volume 726 and/or second volume 728, as a thin foil or plate placed adjacent to first volume 726 and/or second volume 728, from a cemented carbide substrate 722 including a metal-solvent catalyst (e.g., iron, nickel, cobalt, or alloys thereof), or combinations of the foregoing.

FIG. 8B illustrates a PCD precursor assembly 720 for forming, for example, PCD element 700 shown in FIG. 7B. As shown in FIG. 3B, diamond particulate volume 724 may include a first volume 726 adjacent to and at least partially surrounding upper surface 730 of substrate 722 and a second volume 728 adjacent to first volume 726. In some embodiments, as shown in FIGS. 8A-8B, upper surface 732 of diamond particulate volume 724 may have an arcuate (e.g., domed) apical region 739.

Figure 8D:
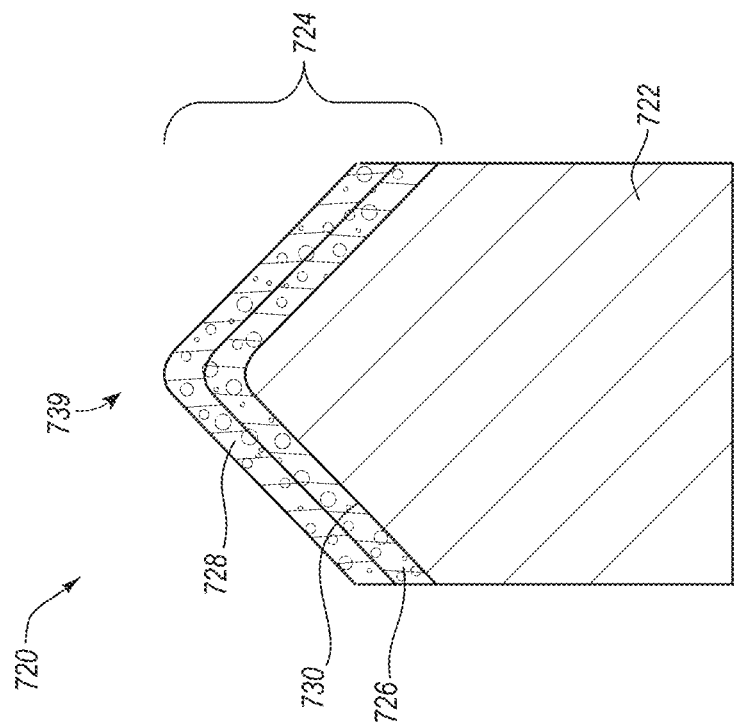
FIG. 8D is a cross-sectional side view of an exemplary PCD precursor assembly for fabricating a superabrasive element according to at least one embodiment.
Figure 8C:
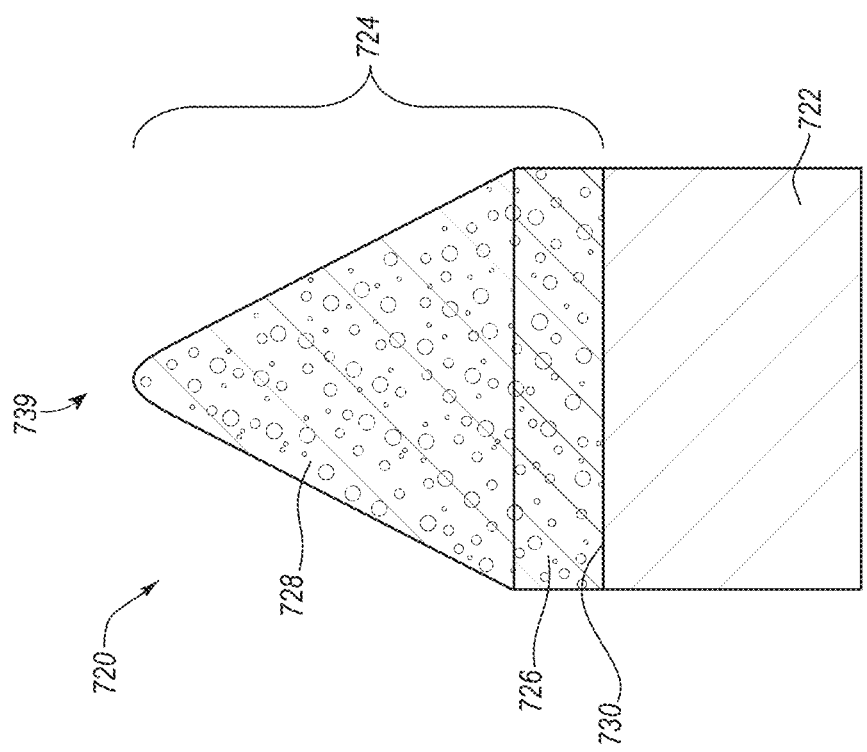
FIG. 8C is a cross-sectional side view of an exemplary PCD precursor assembly for fabricating a superabrasive element according to at least one embodiment.

FIG. 8C illustrates a PCD precursor assembly 720 for forming, for example, PCD element 700 shown in FIG. 7C. As shown in FIG. 8C, diamond particulate volume 724 may include a first volume 726 adjacent to upper surface 730 of substrate 722 and a second volume 728 adjacent to first volume 726. In some embodiments, as shown in FIG. 8C, an interface region or boundary between first volume 726 and upper surface 730 of substrate 722 may be planar or generally planar. Additionally or alternatively, an interface region or boundary between first volume 724 and second volume 726 may be planar or generally planar.

FIG. 8D illustrates a PCD precursor assembly 720 for forming, for example, PCD element 700 shown in FIG. 7D. As shown in FIG. 8D, diamond particulate volume 724 may include a first volume 726 adjacent to and at least partially surrounding upper surface 730 of substrate 722 and a second volume 728 adjacent to first volume 726. In some embodiments, as shown in FIG. 8D, an interface region or boundary between first volume 726 and upper surface 730 of substrate 722 may follow or generally follow at least a portion of upper surface 732 of diamond particulate volume 724. Upper surface 730 of substrate 722 may, for example, be a conical, frustoconical, substantially conical, or substantially frustoconical surface. Additionally or alternatively, an interface region or boundary between first volume 726 and second volume 728 may follow or generally follow at least a portion of upper surface 732 of diamond particulate volume 724 and/or upper surface 730 of substrate 722.

Figure 8F:
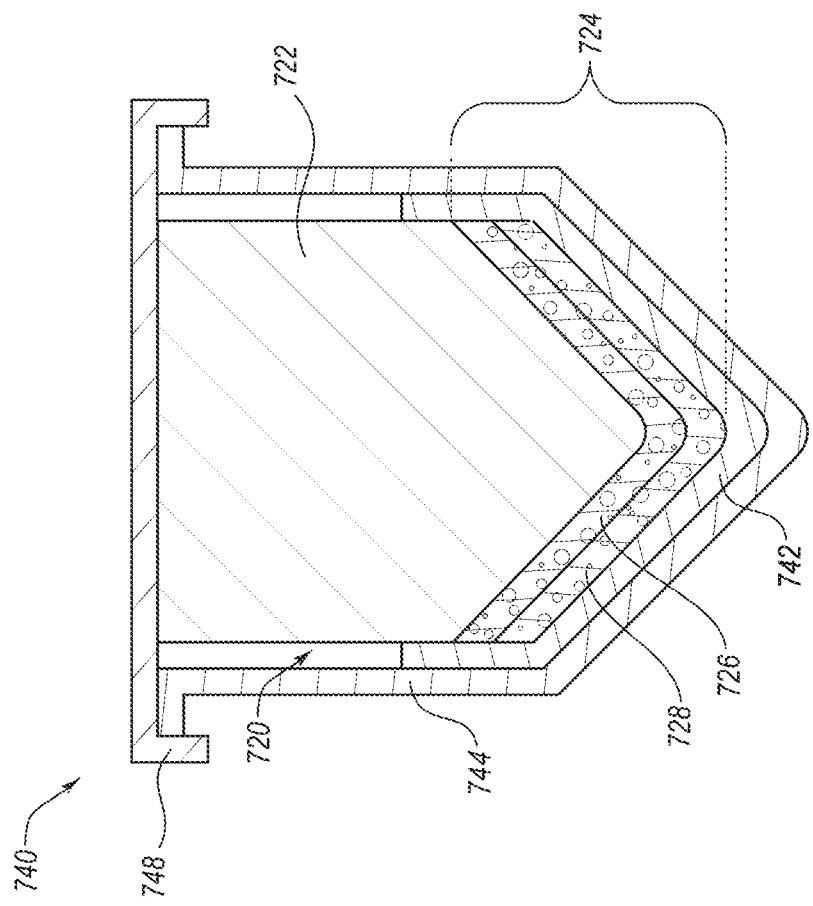
FIG. 8F is a cross-sectional side view of an exemplary PCD sintering assembly for fabricating a superabrasive element according to at least one embodiment.
Figure 8E:
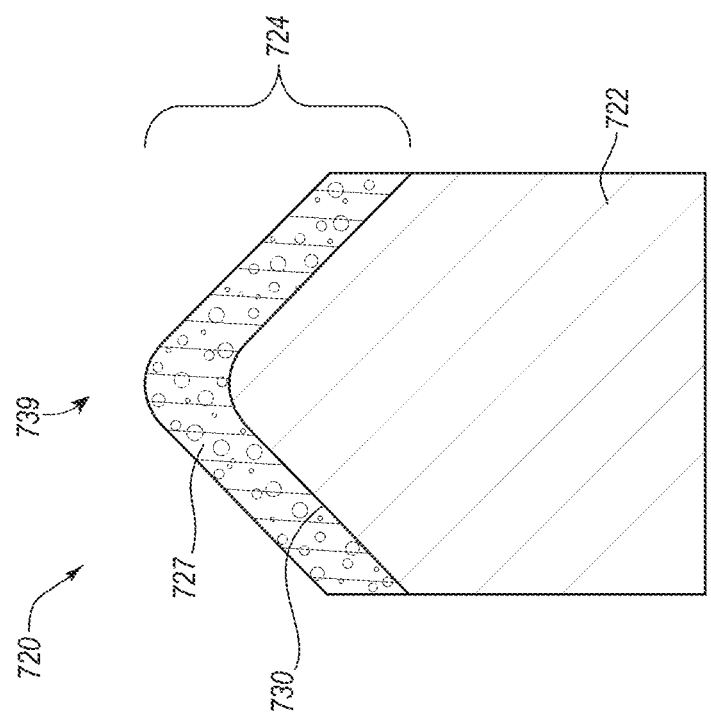
FIG. 8E is a cross-sectional side view of an exemplary PCD precursor assembly for fabricating a superabrasive element according to at least one embodiment.

FIG. 8E illustrates a PCD precursor assembly 720 for forming, for example, PCD element 700 shown in FIG. 7E. As shown in FIG. 8E, diamond particulate volume 727 be a monolithic diamond particulate volume disposed adjacent to substrate 722 at an interface region or boundary between diamond particulate volume 727 and upper surface 730 of substrate 722. Diamond particulate volume 727 may have any suitable shape, such as a shape corresponding to any of the shapes of diamond particulate volume 724 shown in, for example, FIGS. 8A-8D. In some embodiments, as shown in FIG. 8E, an interface region or boundary between diamond particulate volume 727 and upper surface 730 of substrate 722 may follow or generally follow at least a portion of upper surface 704 of PCD table 704. Upper surface 730 of substrate 722 may, for example, be a conical, frustoconical, substantially conical, or substantially frustoconical surface.

FIG. 8F is a cross-sectional view of a PCD sintering assembly 740, or cell assembly, according to at least one embodiment. Diamond particulate volume 724 and substrate 722 may be placed in a pressure transmitting medium to form PDC precursor assembly 720. For example, the pressure transmitting medium may include a refractory metal can, graphite structure, pyrophyllite, other pressure transmitting structures, or combinations thereof. As shown in FIG. 8F, PCD sintering assembly 740 may include substrate 722 and diamond particulate volume 724 disposed within a pressure transmitting medium that includes an inner sintering can 742 and an outer sintering can 744. PCD sintering assembly 740 may be loaded into a sintering apparatus and subjected to a sintering process, such as a HPHT sintering process according to any of the embodiments described herein, to form a PCD element (e.g., PCD element 100 including PCD table 102 bonded to substrate 108 as illustrated in FIGS. 1 and 2).

As shown in FIG. 8F, a PCD precursor assembly, such as PCD precursor assembly 720 illustrated in FIG. 8D, may be disposed within inner sintering can 742 such that second volume 728 of diamond particulate volume 724 is disposed adjacent to an inner surface of inner sintering can 742. A surface of inner sintering can 742 adjacent to at least a portion of upper surface 732 of second volume 728 may have a concave surface shape, such as a substantially conical surface shape, and/or any other suitable planar or nonplanar shape (e.g., in cross-section or otherwise), including, for example, a partial-ovoid, partial-ellipsoid, partial-spherical, triangular, square, rectangular, polygonal, and/or composite shape, and/or a combination of the foregoing, without limitation.

According to at least one embodiment, second volume 728 may first be loaded into inner sintering can 742. First volume 726 may then be loaded into inner sintering can 742 adjacent to second volume 728 such that second volume 728 is disposed between first volume 726 and inner sintering can 742. Substrate 722 may then be positioned at least partially in inner sintering can 742 so that first volume 726 and second volume 728 of diamond particulate volume 724 are disposed between substrate 722 and inner sintering can 742.

First volume 726 and second volume 728 of diamond particulate volume 724 may substantially conform to the inner shape of inner sintering can 742. Substrate 722 may be configured to closely fit within inner sintering can 742 so that diamond particulate volume 724 is generally held in place during sintering and so that portions of diamond particulate volume 724 are limited or prevented from migrating between substrate 722 and inner sintering can 742 during sintering. Inner sintering can 742 may have an inner surface facing diamond particulate volume 724 and substrate 722 that has a generally cylindrical shape or any other selected shape or configuration, without limitation.

Inner sintering can 742 and at least a portion of substrate 722 and/or diamond particulate volume 724 may then be loaded into outer sintering can 744 so that substrate 722, diamond particulate volume 724, and inner sintering can 742 are substantially or completely surrounded by outer sintering can 744. An end sintering can 748 may then be secured over an open end of outer sintering can 744 to enclose PCD precursor assembly 720 and inner sintering can 742 within outer sintering can 744 and end sintering can 748. Inner sintering can 742, outer sintering can 744, and end sintering can 748 may comprise any suitable material or alloy for enclosing PCD precursor assembly 720 and transmitting pressure and heat during sintering. For example, inner sintering can 742 and/or outer sintering can 744 may comprise, without limitation, a refractory material such as tantalum, niobium, molybdenum, tungsten, rhenium, chromium, vanadium, hafnium, and/or zirconium, and/or one or more oxides, carbides, carbon allotropes (e.g., graphite), phyllosilicate minerals (e.g., pyrophyllite), composites, and/or combinations of the foregoing. Although PCD sintering assembly 740 is illustrated in FIG. 8F as including an inner sintering can 742, an outer sintering can 744, and an end sintering can 748, any other suitable can structure or other sintering enclosure may be utilized to enclose PCD precursor assembly 720.

Figure 9:
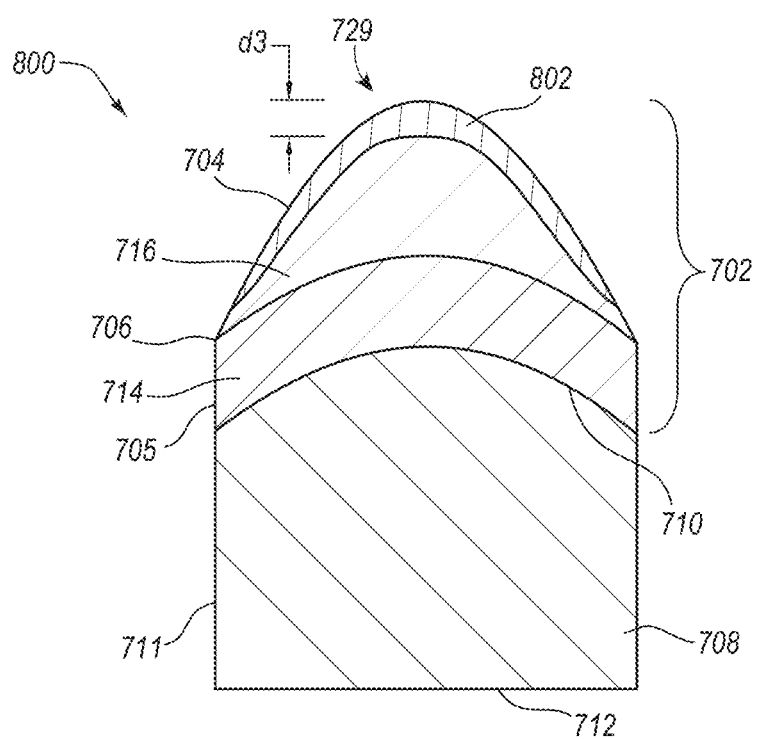
FIG. 9 is a cross-sectional side view of an exemplary leached PCD element according to at least one embodiment.

FIG. 9 shows an exemplary PCD element 800 representing PCD table 702 shown in FIG. 7B following leaching according to at least one embodiment. In at least one embodiment, PCD table 702 may be partially immersed in and/or exposed to a leaching agent including at least one leaching solution (e.g., an acid-based solution) or gas, according to any of the embodiments described herein, to leach the at least one interstitial material from PCD table 702 to a selected depth "d3" from working surface 704 of the PCD table 702 to form a leached volume 802, as shown in FIG. 9. For example, leached volume 802 may extend to depth d3 from an uppermost portion of apical region 729 of working surface 704. Leached volume 802 may extend through at least a portion of second volume 716 and/or first volume 714. In at least one embodiment, as shown in FIG. 9, leached volume 802 may extend through a portion of second volume 716 such that an unleached portion of second volume 716 remains disposed between leached volume 802 and first volume 714. Second volume 716, which includes leached volume 802 and the unleached portion of second volume 716, may extend along any suitable portion of peripheral surface 705, including a minority or a majority of peripheral surface 705. In some embodiments, at least a portion of PCD table 702, including at least a portion of first volume 714 and/or second volume 716, may be shaped by, for example, laser shaping and/or any other suitable technique (e.g., grinding, etc.) either before or after leaching. Examples of suitable laser shaping techniques for processing PCD materials, such as those disclosed in U.S. Pat. No. 9,062,505 and U.S. Pat. App. No. 62/456,785, the disclosure of each of which is incorporated herein, in its entirety, by this reference, may be employed according to any embodiment described herein.

In some embodiments, leached volume 802 and the unleached portion of second volume 716 may be any suitable shape, thickness, and/or configuration, without limitation. In at least one embodiment, as shown in FIG. 9, an interface region or boundary between leached volume 802 and the unleached portion of second volume 716 may follow or generally follow at least a portion of working surface 704. In some embodiments, an interface region or boundary between leached volume 802 and the unleached portion of second volume 716 may follow or generally follow an interface region or boundary between first volume 714 and second volume 716 and/or may follow or generally follow interfacial surface 710 of substrate 708.

WORKING EXAMPLES

The following working examples provide further detail in connection with the specific embodiments described above. Working examples 1-3, 5, 7, 9, 11-14, 16, 18, 20, 22, and 26-28, which were fabricated according to specific embodiments of the invention, are respectively compared to standard working examples 4, 6, 8, 10, 15, 17, 19, 21, 23, 29, and 30 which were fabricated according to conventional methods and materials.

Working Example 1

PDCs were each formed according to the following process. A first volume including a mixture of diamond particles and 2 weight % titanium boride was disposed on a cobalt-cemented tungsten carbide substrate. A second volume including diamond particles that was substantially free of titanium boride and other non-diamond materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least about 7.7 GPa to form a PDC comprising a PCD table integrally formed and bonded to the cobalt-cemented tungsten carbide substrate. The PCD table was then leached for about 168 hours in an acid based leaching solution. The resulting measured leach depth for working example 1 was an average of about 623 µm for the samples, which was greater than the measured average leach depth of about 479 µm for the samples of standard working example 4.

Figure 10:
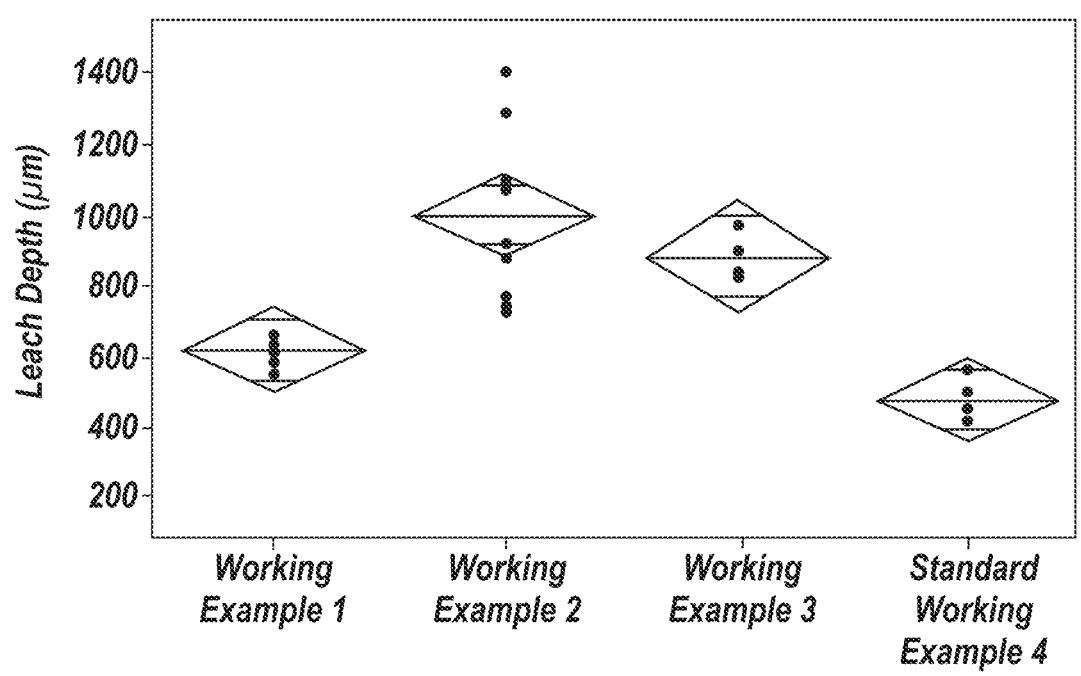
FIG. 10 is a graph of relative leach depth data for a given time for PDCs according to various working examples.

FIG. 10 shows the leach depth test results for the PDCs tested, including PDCs of working examples 1-3 and standard working example 4. As shown in this figure, the PDCs of working examples 1-3 each demonstrated greater average leach depths over standard working example 4.

Working Example 2

PDCs were formed according to the process described above for working example 1 except the first volume included a mixture of diamond particles and 2 weight % boron carbide and no titanium boride. A second volume including diamond particles that was substantially free of boron carbide and other non-diamond materials was disposed adjacent to the first volume such that the first volume was positioned between the second volume and the cobalt-cemented tungsten carbide substrate. PCD tables of working example 2 were leached in the same manner as working example 1. The resulting measured leach depth for working example 2 was an average of about 1001 µm for the samples, which was greater than the average leach depth of about 479 µm for the samples of standard working example 4.

Working Example 3

PDCs were formed according to the process described above for working example 1 except the first volume included a mixture of diamond particles and 10 weight % copper and no titanium boride. A second volume including diamond particles that was substantially free of copper and other non-diamond materials was disposed adjacent to the first volume such that the first volume was positioned between the second volume and the cobalt-cemented tungsten carbide substrate. PCD tables of working example 3 were leached in the same manner as working example 1. The resulting measured leach depth for working example 3 was an average of about 889 µm for the samples, which was greater than the average leach depth of about 479 µm for the samples of standard working example 4.

Standard Working Example 4

Standard working example 4 was used as a standard against which working examples 1-3 were compared. PDCs for standard working example 4 were formed according to the process described above for working example 1 except the PCD table for each of the PDCs was formed from a single volume, which included diamond particles and was substantially free of titanium boride, boron carbide, copper, and other non-diamond materials. PCD tables of standard working example 4 were leached in the same manner as working example 1. The resulting measured leach depth for standard working example 4 was an average of about 479 µm for the samples of standard working example 4.

Working Example 5

PDCs were each formed according to the following process. A first volume including a mixture of diamond particles and 2 weight % titanium boride was disposed on a cobalt-cemented tungsten carbide substrate. A second volume including diamond particles that was substantially free of titanium boride and other materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least 7.7 GPa to form a PDC comprising a PCD table integrally formed and bonded to the cobalt-cemented tungsten carbide substrate. The PCD table was not leached following HPHT sintering.

The spalling resistance of the PDCs of working example 5 was evaluated using a VTL test by measuring the volume of PDC removed and the volume of Barre granite workpiece removed while the workpiece was cooled with water. The VTL testing was conducted with a depth of cut of about 1.3 mm, an infeed of about 7.6 mm/revolution, and a fixture speed of about 118 revolutions per minutes (RPM). During testing, the PDCs were cooled with about 5 gallons/minute of water. The PDCs were mounted in a cutting tool holder at a back rake angle of about 20°. The measured volume of Barre granite workpiece removed for the samples of working example 5 and standard working example 6 was an average of about 470 in$^3$ at 50 passes. The DVR was determined by measuring the volume of the polycrystalline diamond removed.

The average DVR measured for the samples of working example 5 was about 73 µinch·inch$^2$ and exhibited greater average spalling resistance compared to the samples of standard working example 6, which had an average DVR of about 129 µinch·inch$^2$. The samples of working example 5 showed higher $G_{ratios}$ than the samples of standard working example 6. The $G_{ratio}$ is a ratio of the volume of the workpiece removed to the volume of PDC removed during testing. The samples of working example 5 exhibited a mean $G_{ratio}$ of about $6.5\times10^6$, with an upper 95% $G_{ratio}$ of about $9.8\times10^6$ and a lower 95% $G_{ratio}$ of about $4.7\times10^6$. In comparison, the samples of standard working example 6 exhibited a mean $G_{ratio}$ of about $3.5\times10^6$, with an upper 95% $G_{ratio}$ of about $4.3\times10^6$ and a lower 95% $G_{ratio}$ of about $2.9\times10^6$.

Figure 11:
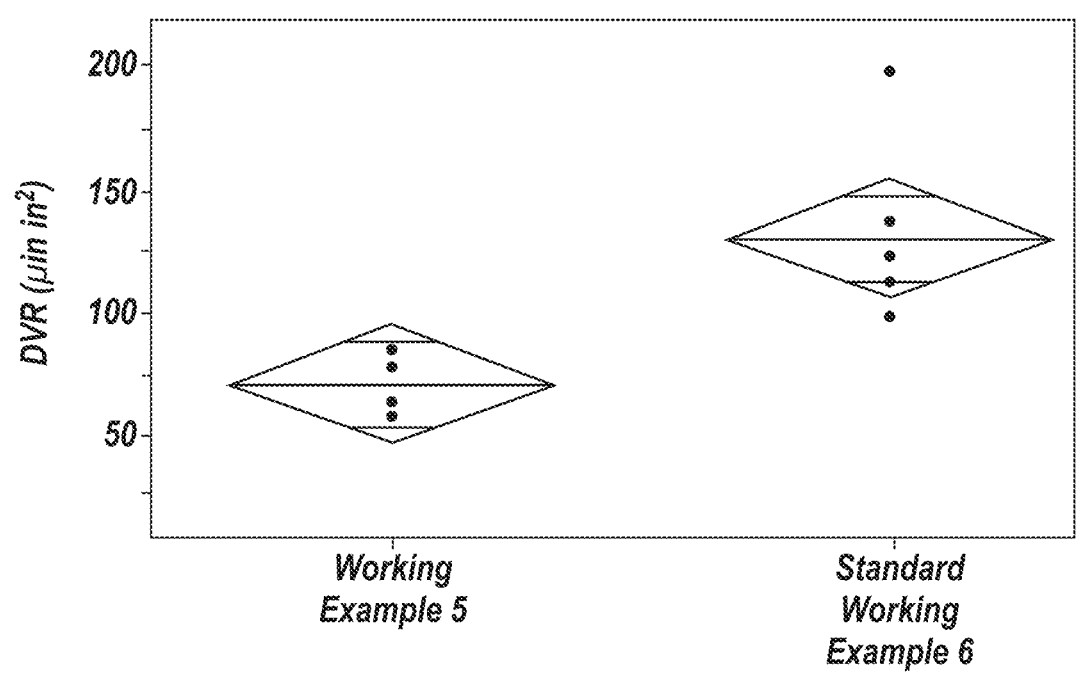
FIG. 11 is a graph of wear resistance test data for PDCs according to various working examples.

FIG. 11 shows the VTL test results for the PDCs of working example 5 and standard working example 6. As shown in this figure, the PDCs of working example 5 demonstrated higher average spalling resistance over the PDCs of standard working example 6.

Standard Working Example 6

Standard working example 6 was used as a standard against which working example 5 was compared. PDCs for standard working example 6 were formed according to the process described above for working example 5 except the PCD table for each of the PDCs was formed from a single volume, which included diamond particles and was substantially free of titanium boride and other non-diamond materials, disposed on a cobalt-cemented tungsten carbide substrate. Standard working example 6 PDCs were VTL tested in the same manner as working example 5.

Working Example 7

PDCs were each formed according to the following process. A first volume including a mixture of diamond particles and 7.5 weight % chromium was disposed on a cobalt-cemented tungsten carbide substrate. A second volume including diamond particles that was substantially free of chromium and other non-diamond materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least 7.7 GPa to form a PDC comprising a PCD table integrally formed and bonded to the cobalt-cemented tungsten carbide substrate. The PCD table was not leached following HPHT sintering.

The abrasion resistance of the PDCs of working example 7 was evaluated by VTL testing. The testing was conducted with a depth of cut of about 0.254 mm, an infeed of about 6.35 mm/revolution, and a fixture speed of about 101 RPM. During testing, the PDCs were cooled with about 5 gallons/minute of water. The PDCs were mounted in a cutting tool holder at a back rake angle of about 20°. The measured volume of Barre granite workpiece removed for the samples of working example 7 and standard working example 8 was an average of about 2350 in$^3$ at 250 passes. The DVR was determined by measuring the volume of the polycrystalline diamond removed.

The average DVR measured for the samples of working example 7 was about 89 µinch·inch$^2$ and exhibited greater average abrasion resistance compared to the samples of standard working example 8, which had an average DVR of about 270 µinch·inch$^2$. The samples of working example 7 showed higher $G_{ratios}$ than the samples of standard working example 8. The samples of working example 7 exhibited a mean $G_{ratio}$ of about $1.1\times10^7$, with an upper 95% $G_{ratio}$ of about $1.3\times10^7$ and a lower 95% $G_{ratio}$ of about $8.5\times10^6$. In comparison, the samples of standard working example 8 exhibited a mean $G_{ratio}$ of about $3.5\times10^6$, with an upper 95% $G_{ratio}$ of about $3.8\times10^6$ and a lower 95% $G_{ratio}$ of about $3.2\times10^6$.

Figure 12:
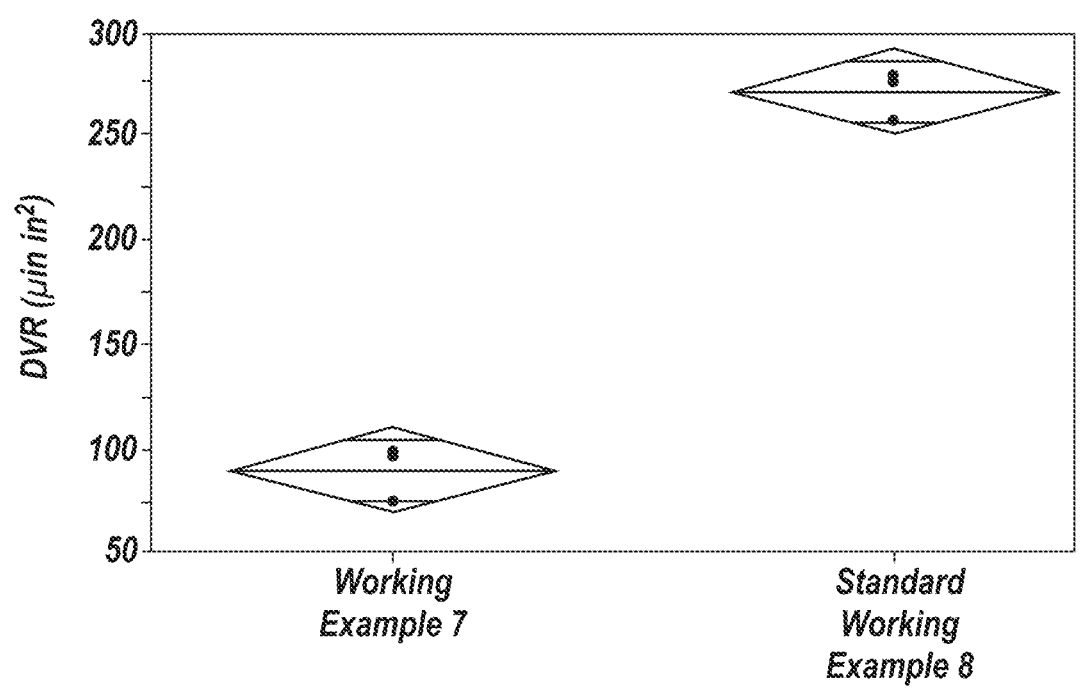
FIG. 12 is a graph of wear resistance test data for PDCs according to various working examples.

FIG. 12 shows the VTL test results for the PDCs of working example 7 and standard working example 8. As shown in this figure, the PDCs of working example 7 demonstrated higher average abrasion resistance over the PDCs of standard working example 8.

Standard Working Example 8

Standard working example 8 was used as a standard against which working example 7 was compared. PDCs for standard working example 8 were formed according to the process described above for working example 7 except the PCD table for each of the PDCs was formed from a single volume, which included diamond particles and that was substantially free of titanium boride and other non-diamond materials, disposed on a cobalt-cemented tungsten carbide substrate. Standard working example 8 PDCs were VTL tested in the same manner as working example 7.

Working Example 9

PDCs were each formed according to the following process. A first volume including a mixture of diamond particles and 2 weight % boron carbide was disposed on a cobalt-cemented tungsten carbide substrate. A second volume including diamond particles that was substantially free of boron carbide and other non-diamond materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least 7.7 GPa to form a PDC comprising a PCD table integrally formed and bonded to the cobalt-cemented tungsten carbide substrate. The PCD table was leached for about 168 hours in an acid based leaching solution.

The abrasion resistance of the PDCs of working example 9 was evaluated by mill testing using a Barre granite workpiece having a size of about 25 inches by about 19 inches. The mill testing was conducted with at a depth of cut of about 0.03 inches, an infeed of about 20 inches/minute, and a fixture speed of about 3000 RPM. During the mill testing, the PDCs were mounted in a cutting tool holder at a back rake angle of about 20°, with the with back sides of the substrates each thermally insulated by an alumina disc and side portions of the substrates each thermally insulated by a plurality of zirconia pins. Test cuts were made in a zig-zag type pattern across the width of the workpiece with angled moves of about 90°, with a time between cutting passes of about 3-5 seconds and no more than about 10 seconds. The PDCs were separated by an index distance of about 3 inches from the workpiece between cutting passes. Failure of the PDCs was determined by observation of "burnout" (i.e., visual observation of sparks, visual observation of a black mark on the workpiece, detection of a sharp increase in measured temperature at the PDCs, and/or detection of a change in force measurements at the PDCs). Distance to failure was calculated for each of the PDCs by multiplying the width of the workpiece by the number of complete passes and adding the distance of the last pass of the PDC (i.e., the distance the PDC moved across the workpiece before burnout was observed). The average measured distance to failure for the samples of working example 9 was about 580 in., which was significantly greater than the average measured distance to failure of about 250 in. for the samples of standard working example 10.

Figure 13:
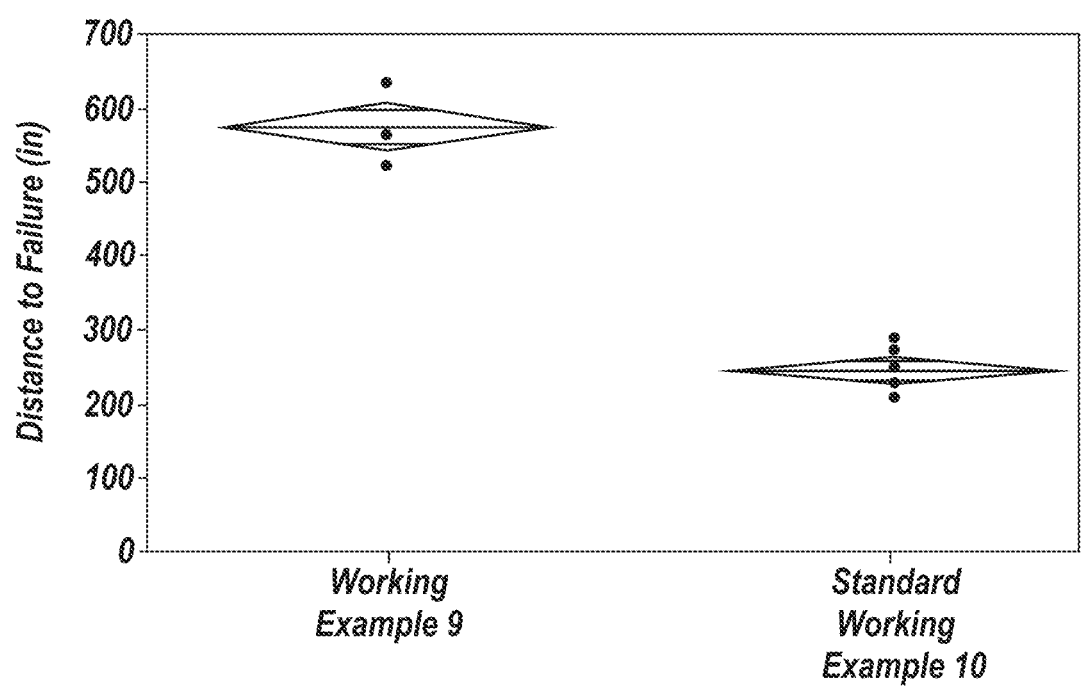
FIG. 13 is a graph of mill test data for PDCs according to various working examples.

FIG. 13 shows the mill test results for the PDCs of working example 9 and standard working example 9. As shown in this figure, the PDCs of working example 9 demonstrated higher average distance to failure over the PDCs of standard working example 10.

Standard Working Example 10

Standard working example 10 was used as a standard against which working example 9 was compared. PDCs for standard working example 10 were formed according to the process described above for working example 9 except the PCD table for each of the PDCs was formed from a single volume, which included diamond particles and was substantially free of boron carbide and other non-diamond materials, disposed on a cobalt-cemented tungsten carbide substrate. Standard working example 10 PDCs were mill tested in the same manner as working example 9.

Working Example 11

PDCs were each formed according to the following process. A first volume including a mixture of diamond particles and 2 weight % titanium boride was disposed on a cobalt-cemented tungsten carbide substrate. A second volume including diamond particles that was substantially free of titanium boride and other non-diamond materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least 7.7 GPa to form a PDC comprising a PCD table integrally formed and bonded to the cobalt-cemented tungsten carbide substrate. The PCD table was not leached following HPHT sintering.

Figure 14:
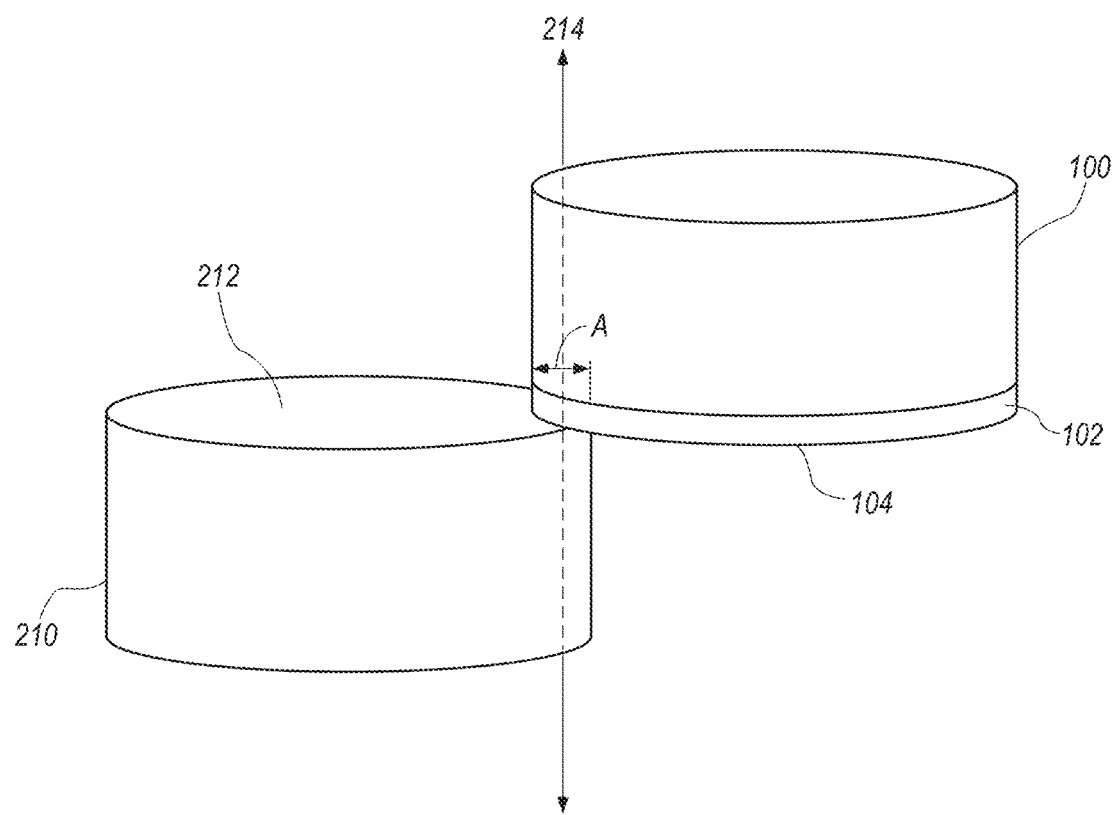
FIG. 14 is a perspective view illustrating a PDC loaded against a testing substrate during first crack testing.

The first crack load limit for the PDCs of working example 11 was evaluated by first crack testing. The first crack load limit of each PDC sample was evaluated using a load frame (MTS LANDMARK 500 kilo-newton servo-hydraulic load frame) by loading the working surface of the PDC against a testing surface of a tungsten carbide testing substrate, the working surface of the PDC having substantially the same diameter and shape as the testing surface of the testing substrate. FIG. 14 illustrates an exemplary PCD element 100 loaded against a testing substrate 210. As shown in FIG. 14, working surface 104 of PCD table 102 of PCD element 100 was loaded against a testing surface 212 of testing substrate 210 along an axis of loading 214. Working surface 104 of PCD element 100 overlapped testing surface 212 of testing substrate 210 so as to define an area of overlap A.

During first crack testing, the PDC overlapped the testing substrate by about 0.100 in. (area of overlap A), measured from an outer radial periphery of the PDC and the testing substrate. The PDC sample was loaded against the testing substrate with a displacement of 0.01 in./min. until a first crack was detected (the first crack was detected by a reduction in load of at least 0.25% after the load exceeded 4,000 lbs.). Samples were each interface sonoscanned prior to testing to screen out PDCs with initial damage, and the samples were each surface sonoscanned and/or dyed following first crack testing to confirm PDC failure.

The first crack load limit measured for the samples of working example 11 was about 8378 lb. and exhibited greater structural load resistance compared to the samples of standard working example 15, which had a measured first crack load of about 6815 lb.

Table 1 shows the first crack load test results for the PDCs tested, including PDCs of working examples 11-14 and standard working example 15. As shown in Table 1, the PDCs of working examples 11-14 demonstrated greater average first crack load results in comparison to standard working example 15.

TABLE 1

| Example | Average First Crack Load (lb.) |
| --- | --- |
| Working Example 11 (2% Titanium Boride) | 8378 |
| Working Example 12 (10% Copper) | 7466 |
| Working Example 13 (2% Boron Carbide) | 7053 |
| Working Example 14 (7.5% Chromium) | 6934 |
| Standard Working Example 15 | 6815 |

Working Example 12

PDCs were formed according to the process described above for working example 11 except the first volume included a mixture of diamond particles and 10 weight % copper and no titanium boride. A second volume including diamond particles that was substantially free of copper and other non-diamond materials was disposed adjacent to the first volume such that the first volume was positioned between the second volume and the cobalt-cemented tungsten carbide substrate.

The first crack load limit for the PDCs of working example 12 was evaluated in the same manner as working example 11. The first crack load measured for the samples of working example 12 was about 7466 lb. and exhibited greater structural load resistance compared to the samples of standard working example 15, which had a measured first crack load of about 6815 lb.

Working Example 13

PDCs were formed according to the process described above for working example 11 except the first volume included a mixture of diamond particles and 2 weight % boron carbide and no titanium boride. A second volume including diamond particles that was substantially free of boron carbide and other non-diamond materials was disposed adjacent to the first volume such that the first volume was positioned between the second volume and the cobalt-cemented tungsten carbide substrate.

The first crack load limit for the PDCs of working example 13 was evaluated in the same manner as working example 11. The first crack load measured for the samples of working example 13 was about 7053 lb. and exhibited greater structural load resistance compared to the samples of standard working example 15, which had a measured first crack load of about 6815 lb.

Working Example 14

PDCs were formed according to the process described above for working example 11 except the first volume included a mixture of diamond particles and 7.5 weight % chromium and no titanium boride. A second volume including diamond particles that was substantially free of chromium and other non-diamond materials was disposed adjacent to the first volume such that the first volume was positioned between the second volume and the cobalt-cemented tungsten carbide substrate.

The first crack load limit for the PDCs of working example 14 was evaluated in the same manner as working example 11. The first crack load measured for the samples of working example 14 was about 6934 lb. and exhibited greater structural load resistance compared to the samples of standard working example 15, which had a measured first crack load of about 6815 lb.

Standard Working Example 15

Standard working example 15 was used as a standard against which working examples 11-14 were compared. PDCs for standard working example 15 were formed according to the process described above for working example 11 except the PCD table for each of the PDCs was formed from a single volume, which included diamond particles and was substantially free of titanium boride, boron carbide, copper, chromium, and other non-diamond materials, disposed on a cobalt-cemented tungsten carbide substrate.

Working Example 16

A PDC was formed according to the following process. A first volume including a mixture of diamond particles and 2 weight % titanium boride was disposed on a cobalt-cemented tungsten carbide substrate. A second volume including diamond particles that was substantially free of titanium boride and other non-diamond materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least 7.7 GPa to form a PDC comprising a PCD table integrally formed and bonded to the cobalt-cemented tungsten carbide substrate. The PCD table was not leached following HPHT sintering.

Figure 15:
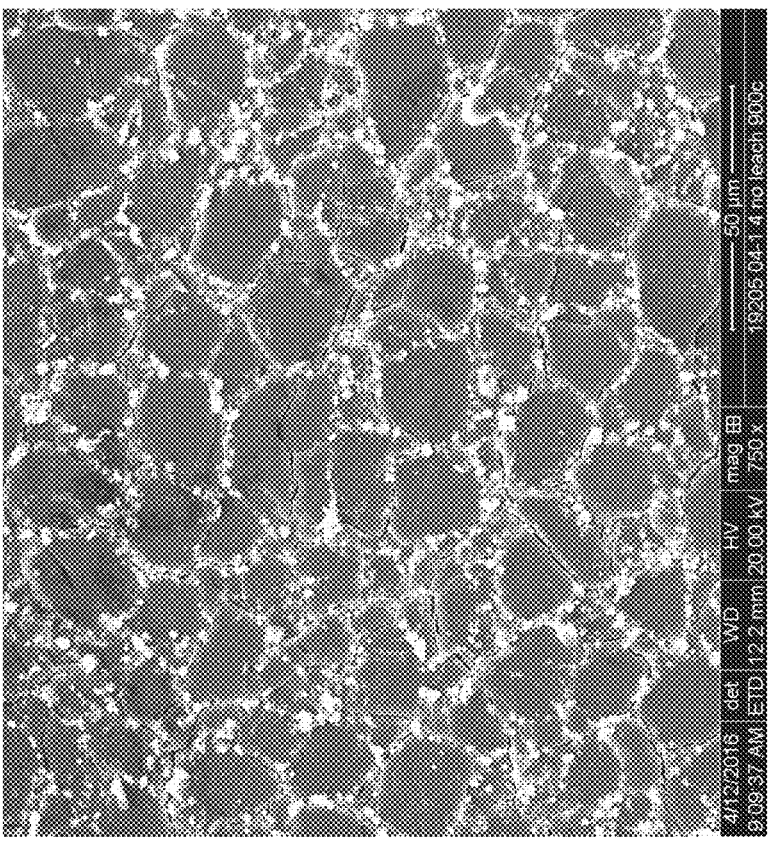
FIG. 15 shows photomicrographs of exemplary PCD tables subjected to high temperatures according to at least one embodiment.
Figure 15:
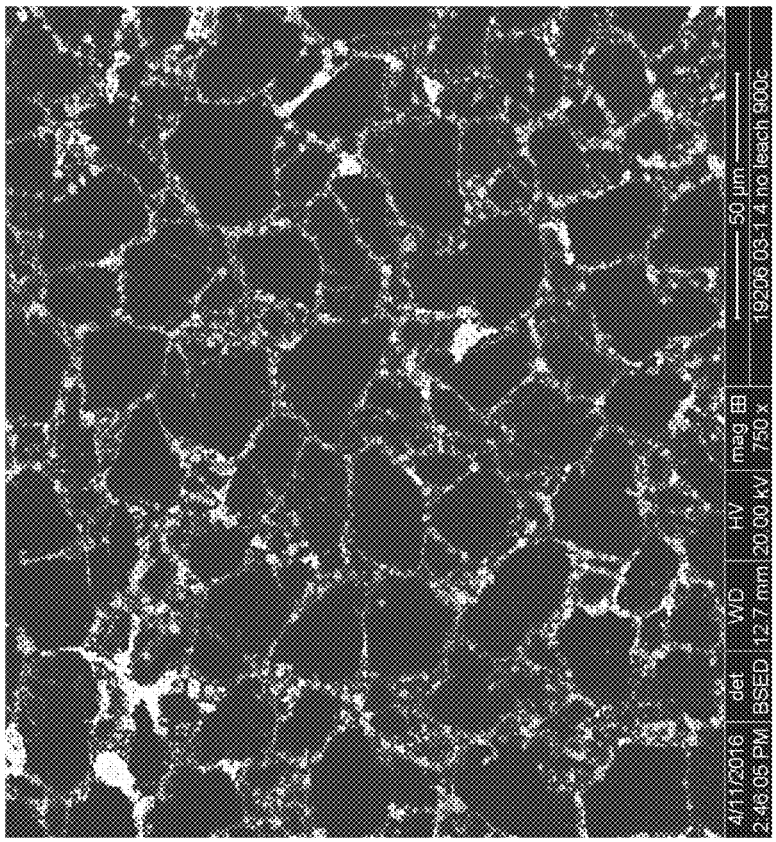

Following the HPHT sintering process and subsequent cooling, the PDC of working example 16 was then heated to about 900° C. Scanning electron micrographs, at 750× magnification, of a portion of the PCD table of the PDC of working example 16 and standard working example 17 following heating are shown in FIG. 15. The PCD table of the PDC of working example 16 exhibited less cracking than the PCD table of the PDC of standard working example 17.

Standard Working Example 17

Standard working example 17 was used as a standard against which working example 16 was compared. The PDC for standard working example 17 was formed according to the process described above for working example 16 except the PCD table was formed from a single volume, which included diamond particles and was substantially free of titanium boride and other non-diamond materials, disposed on a cobalt-cemented tungsten carbide substrate. The PCD table was not leached following HPHT sintering. The standard working example 17 PDC was tested in the same manner as working example 16.

Working Example 18

A PDC was formed according to the following process. A first volume including a mixture of diamond particles and 2 weight % titanium boride was disposed on a cobalt-cemented tungsten carbide substrate. A second volume including diamond particles that was substantially free of titanium boride and other non-diamond materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least 7.7 GPa to form a PDC comprising a PCD table integrally formed and bonded to the cobalt-cemented tungsten carbide substrate. The PCD table was leached for about 168 hours in an acid based leaching solution.

The PDC of working example 18 was evaluated with a chipping spalling test using a Barre granite workpiece having a size of about 25 inches by about 19 inches. The mill testing was conducted with at a depth of cut of about 0.03 inches, an infeed of about 20 inches/minute, and a fixture speed of about 3000 revolutions per minutes (RPM). During the mill testing, the PDCs were mounted in a cutting tool holder at a back rake angle of about 20°, with the with back sides of the substrates each thermally insulated by an alumina disc and side portions of the substrates each thermally insulated by a plurality of zirconia pins. Test cuts were made in a zig-zag type pattern across the width of the workpiece with angled moves of about 90°, with a time between cutting passes of about 3-5 seconds and no more than about 10 seconds. The PDCs were separated by an index distance of about 3 inches from the workpiece between cutting passes. Spalling of the PDCs was determined by observation of burnout.

Figure 16:
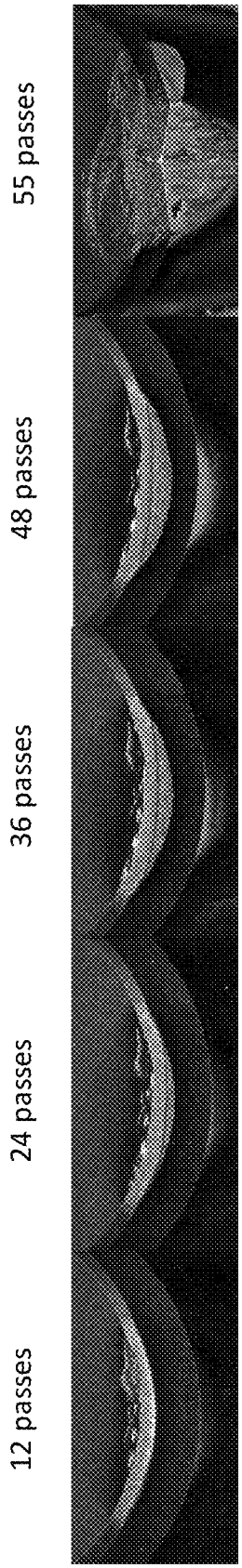
FIG. 16 shows photographs of exemplary PCD tables subjected to chipping spalling testing according to at least one embodiment.
Figure 16:
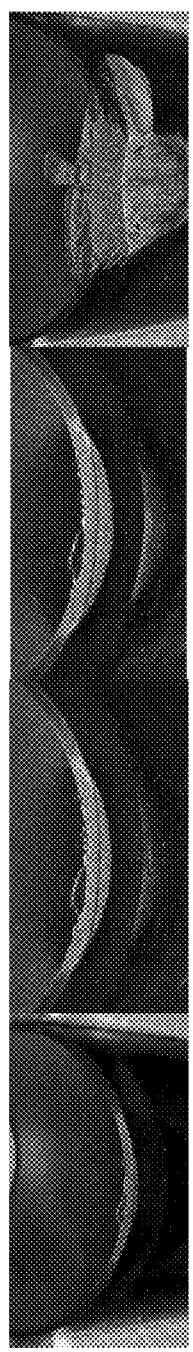

As shown in the photographs of working example 18 and standard working example 19 shown in FIG. 16, the PDC of working example 18 reached 55 passes before exhibiting chipping or spalling. Accordingly, working example 18 demonstrated improved resistance to chipping and spalling in comparison to standard working example 19, which exhibited chipping and/or spalling at 40 passes.

Standard Working Example 19

Standard working example 19 was used as a standard against which working example 18 was compared. The PDC for standard working example 19 was formed according to the process described above for working example 18 except the PCD table, which was formed from a single volume that included diamond particles and that was substantially free of titanium boride and other non-diamond materials, was disposed on a cobalt-cemented tungsten carbide substrate. The standard working example 19 PDC was leached in the same manner as working example 18.

Working Example 20

PDCs were each formed according to the following process. A first volume including a mixture of diamond particles and 2 weight % titanium boride was disposed on a cobalt-cemented tungsten carbide substrate. A second volume including diamond particles that was substantially free of titanium boride and other non-diamond materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least 7.7 GPa to form a PDC comprising a PCD table integrally formed and bonded to the cobalt-cemented tungsten carbide substrate. The PCD table was then leached for about 168 hours in an acid based leaching solution.

The PCD tables of each of the PDC samples were then removed from the substrates and the PCD tables were each subjected to magnetic coercivity testing using a KOERZIMAT CS 1.096 instrument that is commercially available from Foerster Instruments of Pittsburgh, Pa. The specific magnetic saturation of each PCD table was measured in accordance with ASTM B886-03 (2008) and the coercivity of each PCD table was measured using ASTM B887-03 (2008) el using the KOERZIMAT CS 1.096 instrument.

The measured coercivity for the samples of working example 20 was an average of 120.52 Oe. Based on the respective measured coercivity and weight of each of the samples, the samples of working example 20 were determined to have an average magnetic saturation value of 8.02 Gauss*ccm/g.

Standard Working Example 21

Standard working example 21 was used as a standard against which working example 20 was compared. PDCs were formed according to the process described above for working example 20 except the PCD table was formed from a single volume, which included diamond particles and was substantially free of titanium boride and other non-diamond materials, disposed on a cobalt-cemented tungsten carbide substrate. The PCD table was then leached for about 168 hours in an acid based leaching solution. The PCD tables of each of the PDC samples were removed from the substrates and the PCD tables were subjected to magnetic coercivity testing in the same manner as working example 20.

The samples of standard working example 21 were determined to have an average measured coercivity of 159.87 Oe and an average magnetic saturation value of 11.15 Gauss*ccm/g. Accordingly, the PCD tables of working example 20 were determined to have a lower average measured coercivity than the PCD tables of standard working example 21. Additionally, the PCD tables of working example 20 were determined to have a higher average measured magnetic saturation value and a lower average calculated cobalt concentration than the PCD tables of standard working example 21.

Working Example 22

PDCs were formed and leached according to the process described above for working example 20. The PCD tables of the PDCs of working example 22 were evaluated by EIT testing to measure conductivities of the PCD tables at various depths. Table 2 shows the average measured conductivities for the PCD tables of working example 22.

TABLE 2

| | Conductivity (S/m) |
|---|---|
| Average Conductivity | 1345 |
| Average Surface Conductivity | 2286 |
| Average Minimum Conductivity | 327 |
| Average 98$^{th}$ Percentile Conductivity | 5992 |

Standard Working Example 23

Standard working example 23 was used as a standard against which working example 22 was compared. PDCs were formed and leached according to the process described above for working example 20 except the PCD table was formed from a single volume, which included diamond particles and was substantially free of titanium boride and other non-diamond materials, disposed on a cobalt-cemented tungsten carbide substrate. The PCD tables of the PDCs of standard working example 23 were evaluated by conductivity testing in the same manner as the PCD tables of working example 22. Table 3 shows the average measured conductivities for the PCD tables of working example 22.

TABLE 3

| | Conductivity (S/m) |
|---|---|
| Average Conductivity | 491 |
| Average Surface Conductivity | 1504 |
| Average Minimum Conductivity | 67 |
| Average 98$^{th}$ Percentile Conductivity | 2920 |

As shown in Tables 2 and 3, the PCD tables of working example 22 demonstrated greater average conductivities in comparison to standard working example 23.

Working Example 24

A PDC was formed according to the following process. A first volume including a mixture of diamond particles and 10 weight % copper was disposed on a cobalt-cemented tungsten carbide substrate. A second volume including diamond particles that was substantially free of titanium boride and other non-diamond materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least about 7.7 GPa to form a PDC comprising a PCD table integrally formed and bonded to the cobalt-cemented tungsten carbide substrate. Concentrations of elements within portions of the PCD table were determined by energy dispersive X-ray spectroscopy ("EDX") of a bisected portion of the PCD table.

Table 4 shows concentrations by weight of carbon, cobalt, copper, and tungsten in selected portions of the PCD table, including a lower region of the PCD table near an interface between the PCD table and the cobalt-cemented tungsten carbide substrate, a middle region of the PCD table located between the lower region and a working surface of the PCD table, and an upper region of the PCD table near the working surface.

TABLE 4

|  | C (wt %) | Co (wt %) | Cu (wt %) | W (wt %) |
| --- | --- | --- | --- | --- |
| Upper Region | 88.52 | 0.42 | 7.46 | 0.67 |
| Middle Region | 88.35 | 4.24 | 3.75 | 1.08 |
| Lower Region | 85.78 | 6.29 | 4.14 | 1.75 |

As shown in table 4, the concentrations of cobalt and tungsten decreased in a direction from the substrate toward the working surface of the PCD table. The concentration of copper decreased from the lower region to the middle region and increased from the middle region to the upper region, which had the highest concentration of copper.

Working Example 25

A PDC was formed according to the following process. A first volume including a mixture of diamond particles and 2 weight % titanium boride was disposed on a cobalt-cemented tungsten carbide substrate. A second volume including diamond particles that was substantially free of titanium boride and other non-diamond materials was disposed adjacent to the first volume such that the first volume was positioned between the second volume and the cobalt-cemented tungsten carbide substrate. The first and second volumes of diamond particles and the cobalt-cemented tungsten carbide substrate were HPHT processed in a high-pressure cubic press at a temperature of at least about 1400° C. and a cell pressure of at least about 7.7 GPa to form a PDC comprising a PCD table integrally formed and bonded to the cobalt-cemented tungsten carbide substrate. Concentrations of elements within portions of the PCD table were determined by EDX of a bisected portion of the PCD table.

Table 5 shows concentrations by weight of carbon, cobalt, titanium, and tungsten in selected portions of the PCD table, including a lower region of the PCD table near an interface between the PCD table and the cobalt-cemented tungsten carbide substrate and an upper region of the PCD table near the working surface.

TABLE 5

|  | C (wt %) | Co (wt %) | Ti (wt %) | W (wt %) |
| --- | --- | --- | --- | --- |
| Upper Region | 89.58 | 7.52 | 0.12 | 1.49 |
| Lower Region | 88.99 | 5.36 | 0.70 | 3.25 |

As shown in table 5, the concentration of titanium and tungsten decreased between the substrate and the working surface of the PCD table. The concentration of cobalt, on the other hand, increased between the substrate and the working surface.

Working Example 26

PDCs were each formed according to the following process. A first volume of diamond particles including a mixture of diamond particles and 2 weight % titanium boride was disposed abutting a convex, arcuate surface of a cobalt-cemented tungsten carbide substrate, and a second volume of diamond particles including diamond particles and cobalt and substantially free of titanium boride was disposed adjacent to the first volume such that the first volume was positioned between the second volume and the cobalt-cemented tungsten carbide substrate. The first and second volumes of diamond particles were disposed within a concave sintering can having a conical inner surface abutting the second volume of diamond particles. The first and second volumes of diamond particles and the cobalt-cemented tungsten carbide substrate were HPHT processed in a high-pressure cubic press at a temperature of at least about 1400° C. and a cell pressure of at least about 7.7 GPa to form a PDC comprising a PCD table having a conical working surface and integrally formed and bonded to the cobalt-cemented tungsten carbide substrate. The working surface of the PCD table was shaped by grinding to form a substantially conical working surface having a rounded central, apical region. The thermal stability of the PDCs of working example 26 was evaluated by failure temperature testing to identify temperatures at which each of the PDCs initially experienced failure. The resulting measured failure temperature for working example 26 was an average of about 870° C. for the samples, which was greater than the measured average failure temperatures of about 834° C. and 826° C. for the samples of standard working example 29 and standard working example 30, respectively.

Figure 17:
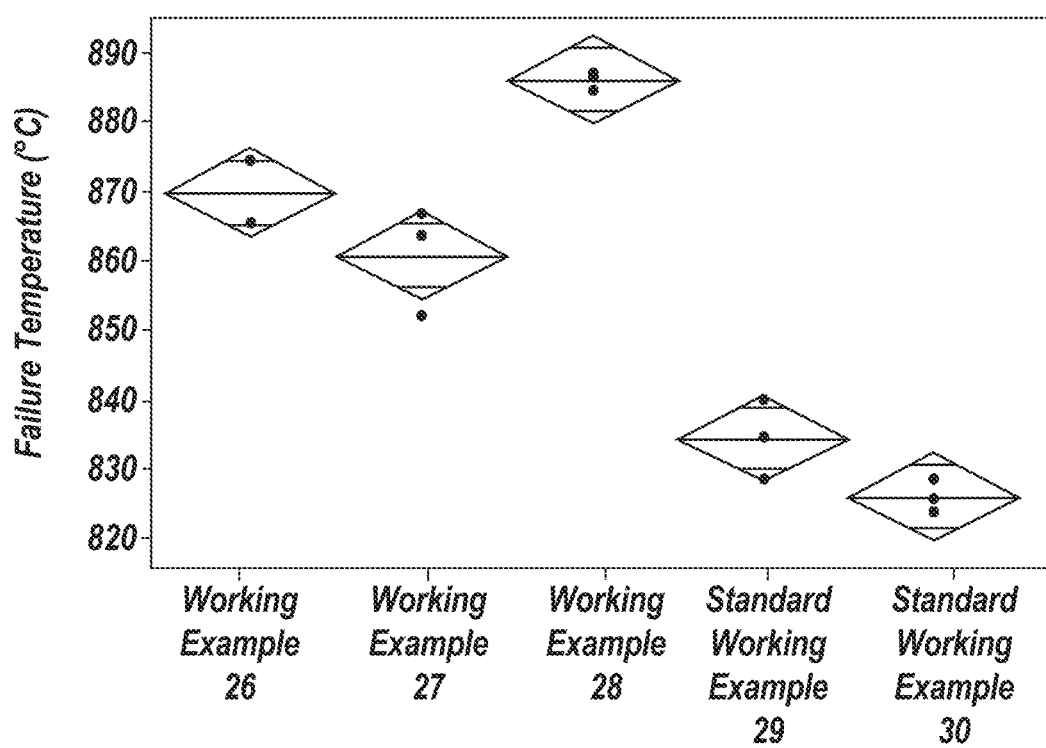
FIG. 17 is a graph of failure temperature test data for PDCs according to various working examples.

FIG. 17 shows the failure temperature test results for the PDCs tested, including PDCs of working examples 26-28 and standard working examples 29 and 30. As shown in this figure, the PDCs of working examples 26-28 each demonstrated greater average failure temperatures over standard working examples 29 and 30.

Working Example 27

PDCs were formed according to the process described above for working example 26 except the first volume of diamond particles included a mixture of diamond particles and 5 weight % titanium boride. PCD tables of working example 27 were evaluated by failure temperature testing in the same manner as working example 26. The resulting measured failure temperature for working example 27 was an average of about 861° C. for the samples, which was greater than the measured average failure temperatures of about 834° C. and 826° C. for the samples of standard working example 29 and standard working example 30, respectively.

Working Example 28

PDCs were formed according to the process described above for working example 26 except the second volume was substantially free of cobalt. PCD tables of working example 28 were evaluated by failure temperature testing in the same manner as working example 26. The resulting measured failure temperature for working example 28 was an average of about 886° C. for the samples, which was greater than the measured average failure temperatures of about 834° C. and 826° C. for the samples of standard working example 29 and standard working example 30, respectively.

Standard Working Example 29

Standard working example 29 was used as a standard against which working examples 26-28 were compared. PDCs for standard working example 29 were formed according to the process described above for working example 26 except the first volume of diamond particles was substantially free of titanium boride. PCD tables of standard working example 29 were evaluated by failure temperature testing in the same manner as working example 26. The resulting measured failure temperature for standard working example 29 was an average of about 834° C.

Standard Working Example 30

Standard working example 30 was used as a standard against which working examples 26-28 were compared. PDCs for standard working example 30 were formed according to the process described above for working example 26 except only a single volume of diamond particles, rather than a first volume of diamond particles and a second volume of diamond particles, was disposed abutting a convex, arcuate surface of a cobalt-cemented tungsten carbide substrate. The volume of diamond particles used to form the PDCs for standard working example 30 was substantially equal in volume to the combined first and second volumes of diamond particles used to form the PDCs for working examples 26-28. Additionally, the volume of diamond particles used to form the PDCs for standard working example 30 included diamond particles and cobalt and was substantially free of titanium boride. PCD tables of standard working example 30 were evaluated by failure temperature testing in the same manner as working example 26. The resulting measured failure temperature for standard working example 30 was an average of about 826° C.

Figure 18:
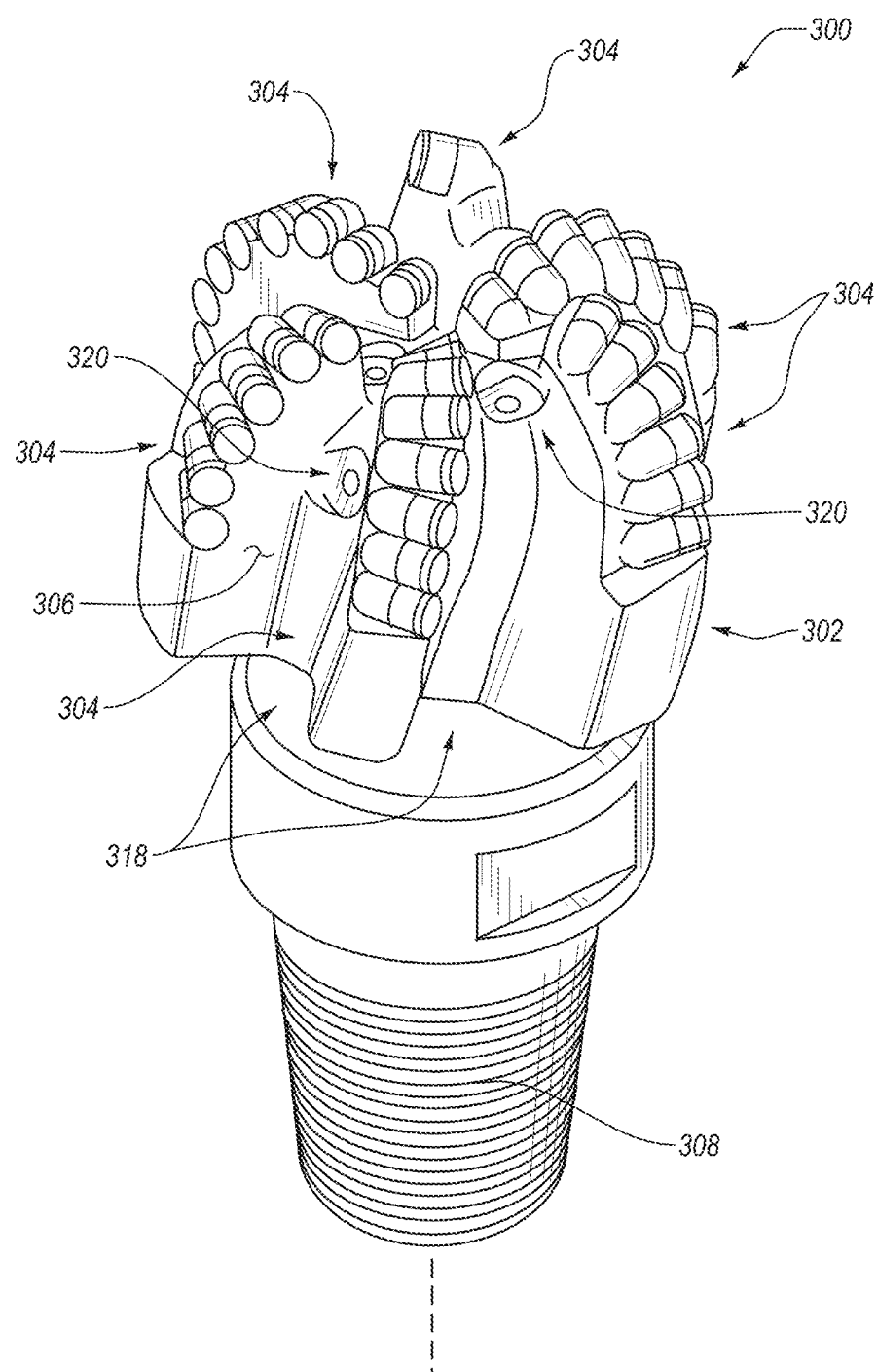
FIG. 18 is a perspective view of a rotary drill bit according to at least one embodiment.
Figure 19:
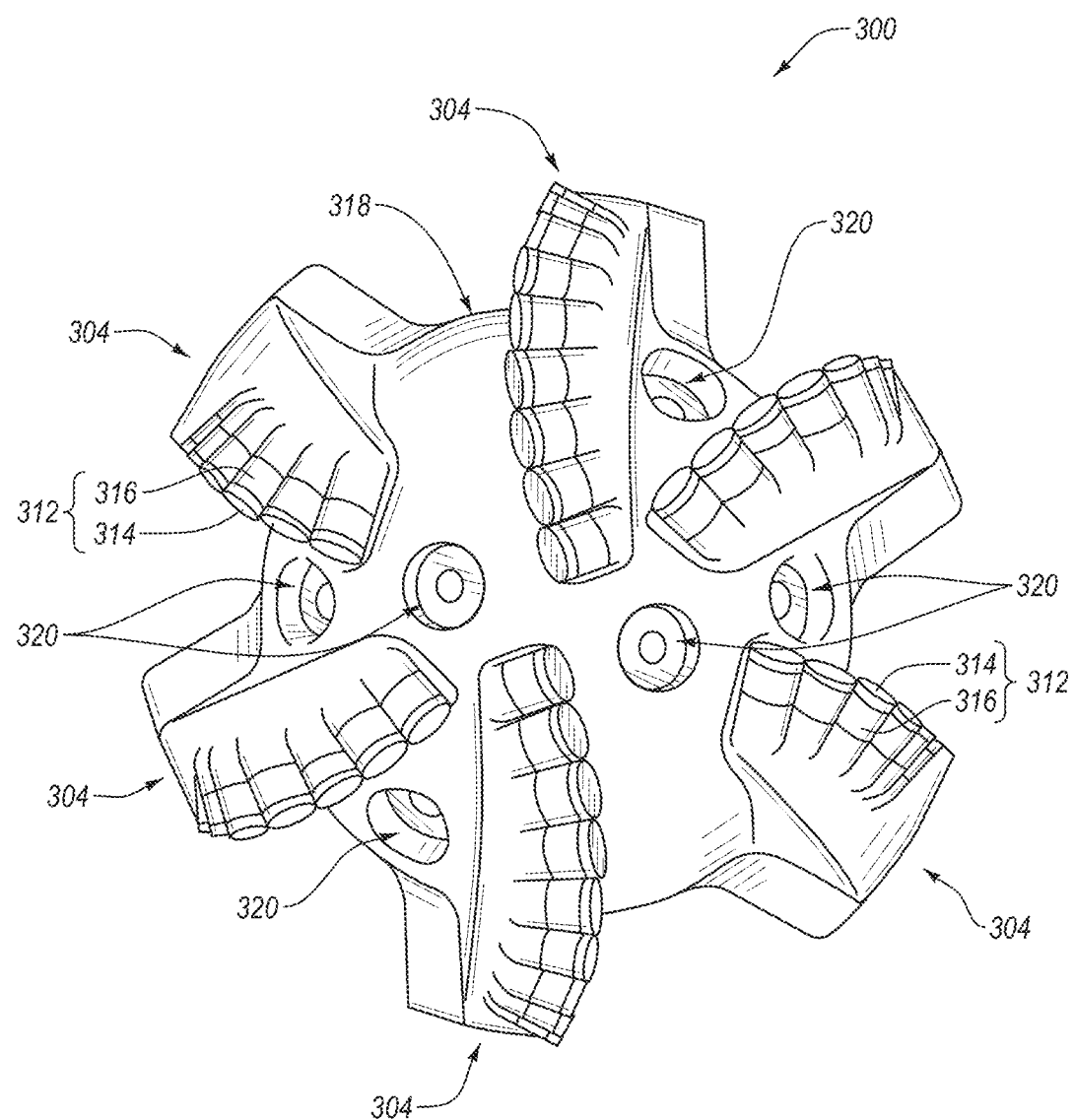
FIG. 19 is a top elevation view of the rotary drill bit shown in FIG. 13.

FIG. 18 is an isometric view and FIG. 19 is a top elevation view of an embodiment of a rotary drill bit 300 for use in subterranean drilling applications, such as oil and gas exploration. The rotary drill bit 300 includes at least one PCD element and/or PDC configured according to any of the previously described PCD element embodiments. Rotary drill bit 300 comprises a bit body 302 that includes radially and longitudinally extending blades 304 with leading faces 306, and a threaded pin connection 308 for connecting bit body 302 to a drilling string. Bit body 302 defines a leading end structure for drilling into a subterranean formation by rotation about a longitudinal axis and application of weight-on-bit. At least one PDC cutting element, configured according to any of the previously described PCD element embodiments (e.g., PCD element 100 shown in FIGS. 1 and 2) may be affixed to bit body 302. With reference to FIG. 19, a plurality of PCD elements 312 are secured to blades 304. For example, each PCD element 312 may include a PCD table 314 bonded to a substrate 316. More generally, PCD elements 312 may comprise any PCD element/PDC disclosed herein, without limitation. In addition, if desired, in some embodiments, a number of PCD elements 312 may be conventional in construction. Also, circumferentially adjacent blades 304 may define so-called junk slots 318 therebetween, as known in the art. Additionally, rotary drill bit 300 may include a plurality of nozzle cavities 320 for communicating drilling fluid from the interior of rotary drill bit 300 to PCD elements 312.

Figure 20:
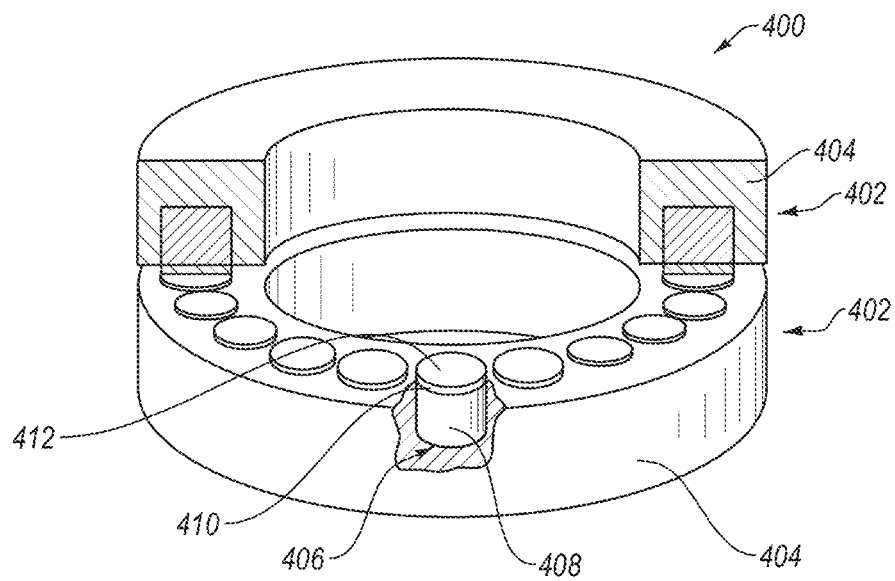
FIG. 20 is a partial cut-away perspective view of an exemplary thrust bearing apparatus according to at least one embodiment.

FIG. 20 is an isometric cut-away view of an embodiment of a thrust-bearing apparatus 400, which may utilize any of the disclosed PCD element embodiments as bearing elements. Thrust-bearing apparatus 400 includes respective thrust-bearing assemblies 402. Each thrust-bearing assembly 402 includes an annular support ring 404 that may be fabricated from a material, such as carbon steel, stainless steel, or another suitable material. Each support ring 404 includes a plurality of recesses (not labeled) that receives a corresponding bearing element 406. Each bearing element 406 may be mounted to a corresponding support ring 404 within a corresponding recess by brazing, press-fitting, using fasteners, or another suitable mounting technique. One or more, or all of bearing elements 406 may be configured according to any of the disclosed PCD element embodiments. For example, each bearing element 406 may include a substrate 408 and a PCD table 410, with PCD table 410 including a bearing surface 412.

In use, bearing surfaces 412 of one of thrust-bearing assemblies 402 bears against the opposing bearing surfaces 412 of the other one of thrust-bearing assemblies 402. For example, one of thrust-bearing assemblies 402 may be operably coupled to a shaft to rotate therewith and may be termed a "rotor." The other one of thrust-bearing assemblies 402 may be held stationary and may be termed a "stator."

Figure 21:
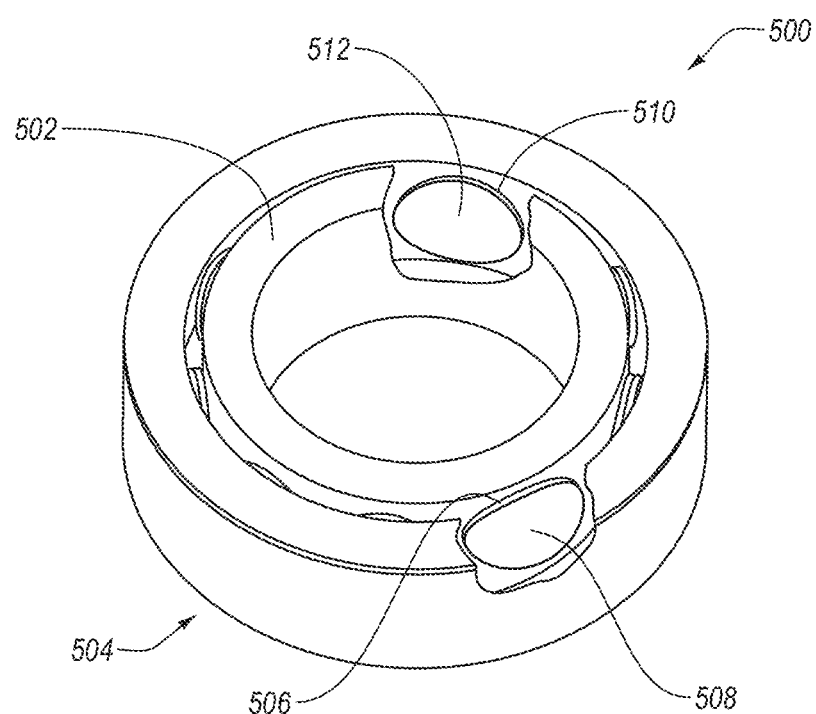
FIG. 21 is a partial cut-away perspective view of an exemplary radial bearing apparatus according to at least one embodiment.

FIG. 21 is an isometric cut-away view of an embodiment of a radial bearing apparatus 500, which may utilize any of the disclosed PDC embodiments as bearing elements. The radial bearing apparatus 500 includes an inner race 502 positioned generally within an outer race 504. Outer race 504 includes a plurality of bearing elements 510 affixed thereto that have respective bearing surfaces 512. Inner race 502 also includes a plurality of bearing elements 506 affixed thereto that have respective bearing surfaces 508. One or more, or all of bearing elements 506 and 510 may be configured according to any of the PDC embodiments disclosed herein. Inner race 502 is positioned generally within outer race 504 and, thus, inner race 502 and outer race 504 may be configured so that bearing surfaces 508 and 512 may at least partially contact one another and move relative to each other as inner race 502 and outer race 504 rotate relative to each other during use.

Radial-bearing apparatus 500 may be employed in a variety of mechanical applications. For example, so-called "roller cone" rotary drill bits may benefit from a radial-bearing apparatus disclosed herein. More specifically, inner race 502 may be mounted to a spindle of a roller cone and outer race 504 may be mounted to an inner bore formed within a cone such that outer race 504 and inner race 502 may be assembled to form a radial-bearing apparatus.

Other examples of articles of manufacture that may incorporate PCD elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

Figure 22:
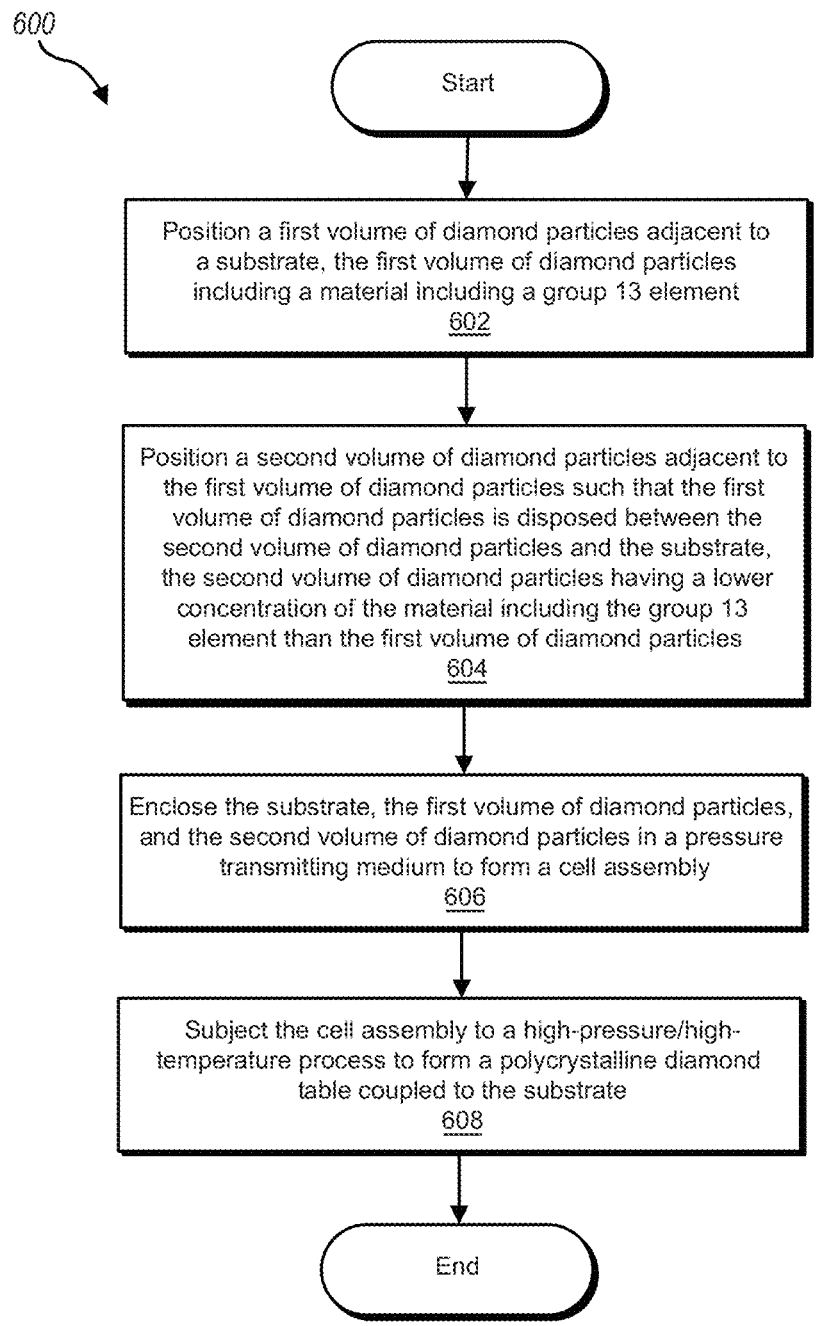
FIG. 22 is a flow diagram of an exemplary method of processing a polycrystalline diamond element according to at least one embodiment.

FIG. 22 illustrates an exemplary method 600 for fabricating a polycrystalline diamond element according to at least one embodiment. As shown in FIG. 22, a first volume of diamond particles may be positioned adjacent to a substrate, the first volume of diamond particles including a material including a group 13 element (process 602). For example, a first volume 126 that includes a material that includes a group 13 element (e.g., boron, aluminum, gallium, indium, thallium) mixed with diamond particles may be positioned adjacent to a substrate 122, as illustrated in FIGS. 3A-3E (see also FIGS. 8A-8E). The material that includes the group 13 element may include, for example, a boron material, such as a boride material (e.g., cobalt boride, titanium boride, and/or any other suitable boride compound).

A second volume of diamond particles may be positioned adjacent to the first volume of diamond particles such that the first volume of diamond particles is disposed between the second volume of diamond particles and the substrate, the second volume of diamond particles having a lower concentration of material including the group 13 element than the first volume of diamond particles (process 604). For example, as illustrated in FIGS. 3A-3D (see also, FIGS. 8A-8E), a second volume 128 that is free or substantially free of the material including the group 13 element may be positioned adjacent to first volume 126 such that first volume 126 is disposed between second volume 128 and substrate 122.

The substrate, the first volume of diamond particles, and the second volume of diamond particles may be enclosed in a pressure transmitting medium to form a cell assembly (process 606). For example, diamond particulate volume 124, which includes first volume 126 and second volume 128, and substrate 122 may be placed in a pressure transmitting medium to form a PDC sintering assembly 140 (i.e., a cell assembly). As shown in FIG. 4 (see also FIG. 8F), PCD sintering assembly 140 may include substrate 122 and diamond particulate volume 124 disposed within a pressure transmitting medium that includes an inner sintering can 142 and an outer sintering can 144.

The cell assembly may be subjected to a high-pressure/high-temperature process to form a polycrystalline diamond table coupled to the substrate (process 608). For example, PCD sintering assembly 140 shown in FIG. 4 may be loaded into a sintering apparatus and subjected to a sintering process, such as a HPHT sintering process, to form a PCD element (e.g., PCD element 100 including PCD table 102 bonded to substrate 108 as illustrated in FIGS. 1 and 2). In some embodiments, following formation of the polycrystalline diamond table, at least a portion of the polycrystalline diamond table may be exposed to a leaching agent. For example, at least a portion of PCD table 102 shown in FIGS. 1 and 2 may be exposed to a leaching agent, such as an acid-based leaching solution, to form a leached PCD element 200 as shown in FIG. 6A (see also FIG. 9).

Figure 23:
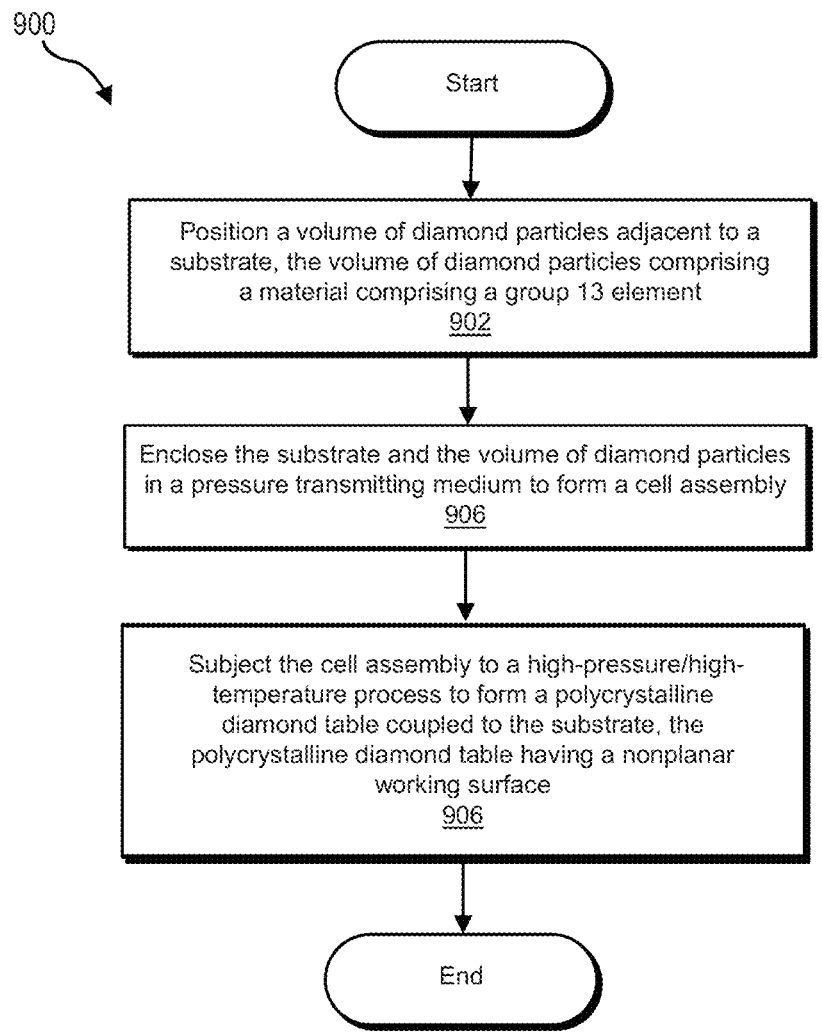
FIG. 23 is a flow diagram of an exemplary method of processing a polycrystalline diamond element according to at least one embodiment.

FIG. 23 illustrates an exemplary method 900 for fabricating a polycrystalline diamond element according to at least one embodiment. As shown in FIG. 23, a volume of diamond particles may be positioned adjacent to a substrate, the volume of diamond particles including a material including a group 13 element (process 902). For example, diamond particulate volume 727 that includes a material that includes a group 13 element mixed with diamond particles may be positioned adjacent to a substrate 722, as illustrated in FIG. 8E (see also FIG. 3E).

The substrate and the volume of diamond particles may be enclosed in a pressure transmitting medium to form a cell assembly (process 904). For example, diamond particulate volume 727 and substrate 722 may be placed in a pressure transmitting medium to form a PDC sintering assembly 740 (i.e., a cell assembly). As shown in FIG. 8F (see also FIG. 4), PCD sintering assembly 740 may include substrate 722 and diamond particulate volume 724 disposed within a pressure transmitting medium that includes an inner sintering can 742, an outer sintering can 744, and an end sintering can 748.

The cell assembly may be subjected to a high-pressure/high-temperature process to form a polycrystalline diamond table coupled to the substrate, the polycrystalline diamond table having a nonplanar working surface (process 906). For example, PCD sintering assembly 740 shown in FIG. 8F may be loaded into a sintering apparatus and subjected to a sintering process, such as a HPHT sintering process, to form a PCD element (e.g., PCD element 700 including PCD table 702 bonded to substrate 708 as illustrated in FIG. 7E).

Figure 24:
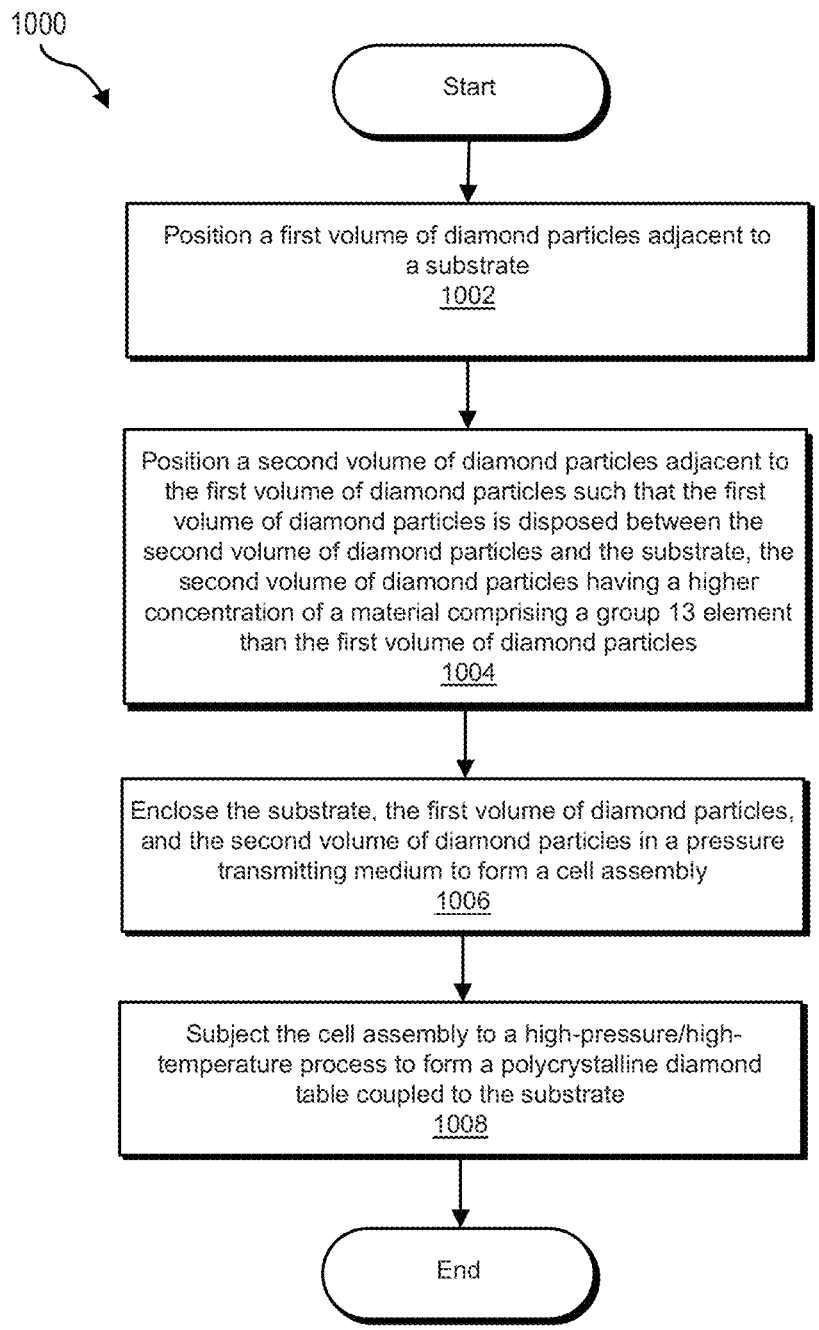
FIG. 24 is a flow diagram of an exemplary method of processing a polycrystalline diamond element according to at least one embodiment.

FIG. 24 illustrates an exemplary method 1000 for fabricating a polycrystalline diamond element according to at least one embodiment. As shown in FIG. 24, a first volume of diamond particles may be positioned adjacent to a substrate (process 1002). For example, a first volume 126 of diamond particles may be positioned adjacent to a substrate 122, as illustrated in FIGS. 3A-3E (see also FIGS. 8A-8E).

A second volume of diamond particles may be positioned adjacent to the first volume of diamond particles such that the first volume of diamond particles is disposed between the second volume of diamond particles and the substrate, the second volume of diamond particles having a higher concentration of a material comprising a group 13 element than the first volume of diamond particles (process 1004). For example, as illustrated in FIGS. 3A-3D (see also, FIGS. 8A-8E), a second volume 128 that includes a higher concentration of a material including a group 13 element (e.g., boron, aluminum, gallium, indium, thallium) than first volume 126 may be positioned adjacent to first volume 126 such that first volume 126 is disposed between second volume 128 and substrate 122.

The substrate, the first volume of diamond particles, and the second volume of diamond particles may be enclosed in a pressure transmitting medium to form a cell assembly (process 1006). For example, diamond particulate volume 124, which includes first volume 126 and second volume 128, and substrate 122 may be placed in a pressure transmitting medium to form a PDC sintering assembly 140 (i.e., a cell assembly). As shown in FIG. 4 (see also FIG. 8F), PCD sintering assembly 140 may include substrate 122 and diamond particulate volume 124 disposed within a pressure transmitting medium that includes an inner sintering can 142 and an outer sintering can 144.

The cell assembly may be subjected to a high-pressure/high-temperature process to form a polycrystalline diamond table coupled to the substrate (process 1008). For example, PCD sintering assembly 140 shown in FIG. 4 may be loaded into a sintering apparatus and subjected to a sintering process, such as a HPHT sintering process, to form a PCD element (e.g., PCD element 100 including PCD table 102 bonded to substrate 108 as illustrated in FIGS. 1 and 2).

While various aspects and embodiments have been disclosed herein, other aspects and embodiments are contemplated. The various aspects and embodiments disclosed herein are for purposes of illustration and are not intended to be limiting. Unless otherwise noted, the terms "a" or "an," as used in the specification and claims, are to be construed as meaning "at least one of." In addition, for ease of use, the words "including" and "having," and variants thereof (e.g., "includes" and "has") as used in the specification and claims, are interchangeable with and have the same meaning as the word "comprising" and variants thereof (e.g., "comprise" and "comprises").

What is claimed is:

1. A method of fabricating a polycrystalline diamond element, the method comprising:
    positioning a first volume of diamond particles adjacent to a substrate, the first volume of diamond particles including a material comprising a group 13 element;
    positioning a second volume of diamond particles adjacent to the first volume of diamond particles such that the first volume of diamond particles is disposed between the second volume of diamond particles and the substrate, the second volume of diamond particles having a lower concentration of the material comprising the group 13 element than the first volume of diamond particles;
    enclosing the substrate, the first volume of diamond particles, and the second volume of diamond particles in a pressure transmitting medium to form a cell assembly; and
    subjecting the cell assembly to a high-pressure/high-temperature process to form a polycrystalline diamond table coupled to the substrate.

2. The method of claim 1, further comprising selecting the second volume of diamond particles to be substantially free of the group 13 element.

3. The method of claim 1, further comprising selecting the group 13 element to comprise at least one of boron, aluminum, gallium, indium, or thallium.

4. The method of claim 1, further comprising selecting the first volume of diamond particles to include a compound comprising the group 13 element at a concentration of approximately 10% or less by weight.

5. The method of claim 1, further comprising exposing at least a portion of the polycrystalline diamond table to a leaching agent.

6. The method of claim 5, further comprising leaching at least a sintered portion of the second volume of diamond particles.

7. The method of claim 1, further comprising defining a working surface of the polycrystalline diamond element with the second volume of diamond particles.

8. The method of claim 1, further comprising defining a generally arcuate boundary between at least a portion of the first volume of diamond particles and the second volume of diamond particles.

9. The method of claim 1, further comprising positioning a third volume of diamond particles substantially free of the group 13 element between at least a portion of the first volume of diamond particles and the second volume of diamond particles.

10. A method of fabricating a polycrystalline diamond element, the method comprising:
    placing diamond particles in a diamond particulate volume into a pressure transmitting medium, the diamond particulate volume comprising:
        a first volume of the diamond particles including a material comprising a group 13 element; and
        a second volume of the diamond particles having a lower concentration of the material comprising the group 13 element than the first volume of the diamond particles;
    positioning the second volume of the diamond particles to define at least a portion of a working surface of the polycrystalline diamond element;
    enclosing the diamond particles in the diamond particulate volume in the pressure transmitting medium to define a cell assembly;
    subjecting the cell assembly to a high-pressure/high-temperature process to define a polycrystalline diamond table; and
    leaching at least a portion of the polycrystalline diamond table.

11. The method of claim 10, wherein leaching the at least a portion of the polycrystalline diamond table comprises leaching at least a sintered portion the second volume of the diamond particles.

12. The method of claim 10, further comprising defining a non-linear boundary between the first volume of diamond particles and the second volume of diamond particles.

13. The method of claim 10, further comprising positioning the diamond particles in the diamond particulate volume in the pressure transmitting medium adjacent to a substrate.

14. A method of fabricating a polycrystalline diamond element, the method comprising:
    placing diamond particles in diamond particulate volume into a pressure transmitting medium, the diamond particulate volume comprising:
        a first volume of the diamond particles including a material comprising a group 13 element; and
        a second volume of the diamond particles having a lower concentration of the material comprising the group 13 element than the first volume of the diamond particles;
    positioning the diamond particles in the diamond particulate volume in the pressure transmitting medium adjacent to a substrate;
    positioning the first volume of the diamond particles between the second volume of diamond particles and the substrate;
    enclosing the diamond particles in the diamond particulate volume in the pressure transmitting medium to define a cell assembly;
    subjecting the cell assembly to a high-pressure/high-temperature process to define a polycrystalline diamond table; and
    leaching at least a portion of the polycrystalline diamond table.

15. The method of claim 10, further comprising defining an arcuate boundary between volumes of the diamond particulate volume.

16. The method of claim 15, further comprising defining the arcuate boundary between a leached portion of the polycrystalline diamond table and a substantially unleached portion of the polycrystalline diamond table.

17. The method of claim 16, further comprising defining the arcuate boundary within the sintered second volume of diamond particles.

18. A method of fabricating a polycrystalline diamond element, the method comprising:
    placing a diamond particulate volume into a pressure transmitting medium, the diamond particulate volume comprising:
        a first volume of diamond particles including an interstitial material; and a second volume of diamond particles having a lower concentration of the interstitial material than the first volume of diamond particles, the second volume of the diamond particles positioned to define at least a portion of a working surface of the polycrystalline diamond element;

enclosing the first volume of diamond particles and the second volume of diamond particles in the pressure transmitting medium to define a cell assembly;

subjecting the cell assembly to a high-pressure/high-temperature process to define a polycrystalline diamond table;

leaching at least a portion of the polycrystalline diamond table to define a leached portion of the polycrystalline diamond table and a substantially unleached portion of the polycrystalline diamond table; and defining a non-linear boundary between at least one of:
the leached portion and the substantially unleached portion of the polycrystalline diamond table;
the first volume of diamond particles and the second volume of diamond particles of the diamond particulate volume.

19. The method of claim 18, further comprising selecting the interstitial material to comprise a group 13 element.

20. The method of claim 19, further comprising defining an arcuate boundary between the first volume of the diamond particles and the second volume of the diamond particles.

* * * * *